US012075175B1

(12) United States Patent
Berkovich et al.

(10) Patent No.: US 12,075,175 B1
(45) Date of Patent: Aug. 27, 2024

(54) PROGRAMMABLE SMART SENSOR WITH ADAPTIVE READOUT

(71) Applicant: Meta Platforms Technologies, LLC, Menlo Park, CA (US)

(72) Inventors: Andrew Samuel Berkovich, Bellevue, WA (US); Shlomo Alkalay, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/469,258

(22) Filed: Sep. 8, 2021

Related U.S. Application Data

(60) Provisional application No. 63/084,955, filed on Sep. 29, 2020, provisional application No. 63/075,636, filed on Sep. 8, 2020.

(51) Int. Cl.
*H04N 25/75* (2023.01)
(52) U.S. Cl.
CPC .................................. *H04N 25/75* (2023.01)
(58) Field of Classification Search
CPC ........ H04N 25/75; H04N 5/378; H04N 25/78; H04N 23/681; H04N 5/23251; H04N 23/6811; H04N 5/23254; H04N 25/443; H04N 5/3454
See application file for complete search history.

(56) References Cited

U.S. PATENT DOCUMENTS 4,121,896 A 10/1978 Shepherd

| 6,384,905 | B1 | 5/2002 | Barrows |
| 6,853,579 | B1 | 2/2005 | Chou |
| 7,359,275 | B1 | 4/2008 | Wu |

(Continued)

FOREIGN PATENT DOCUMENTS

| CN | 102665049 A | 9/2012 |
| CN | 103207716 A | 7/2013 |

(Continued)

OTHER PUBLICATIONS

Amir M.F., et al., "3-D Stacked Image Sensor With Deep Neural Network Computation," IEEE Sensors Journal, IEEE Service Center, New York, NY, US, May 15, 2018, vol. 18 (10), pp. 4187-4199, XP011681876.

(Continued)

*Primary Examiner* — Nicholas G Giles
(74) *Attorney, Agent, or Firm* — Kilpatrick Townsend & Stockton LLP

(57) ABSTRACT

In some examples, a sensor apparatus comprises: an array of pixel cells configured to generate a charge in response to light and convert the charge to output a voltage of an array of voltages, one or more an analog-to-digital converter (ADC) configured the convert the array of voltages to first pixel data comprising one or more pixel values, and an on-sensor controller configured to receive the first digital pixel data from the ADC, determine first pixel values and second pixel values, generate second digital pixel data comprising the first pixel values and not the second pixel values, and send the second digital pixel data off-sensor. The on-sensor controller may generate a control signal to alter the rate of charge generation by the array of pixel cells. The digital image data may be generated using a compressed map of pixels.

20 Claims, 32 Drawing Sheets

(56) References Cited

U.S. PATENT DOCUMENTS

| | | |
|---|---|---|
| 7,362,355 B1 | 4/2008 | Yang et al. |
| 7,659,925 B2 | 2/2010 | Krymski |
| 7,920,409 B1 | 4/2011 | Clark et al. |
| 7,956,914 B2 | 6/2011 | Xu |
| 7,969,759 B1 | 6/2011 | Thummalapally et al. |
| 8,134,623 B2 | 3/2012 | Purcell et al. |
| 8,441,535 B2 | 5/2013 | Morin |
| 8,675,110 B2 | 3/2014 | Hirai et al. |
| 8,779,346 B2 | 7/2014 | Fowler et al. |
| 9,094,629 B2 | 7/2015 | Ishibashi |
| 9,210,330 B2 | 12/2015 | Seo |
| 9,282,264 B2 | 3/2016 | Park et al. |
| 9,363,454 B2 | 6/2016 | Ito et al. |
| 9,560,296 B2 | 1/2017 | Hseih et al. |
| 9,646,681 B1 | 5/2017 | Jung et al. |
| 9,723,233 B2 | 8/2017 | Grauer et al. |
| 9,743,024 B2 | 8/2017 | Tyrrell et al. |
| 9,826,175 B2 | 11/2017 | Isobe |
| 9,832,370 B2 | 11/2017 | Cho et al. |
| 9,912,885 B2 | 3/2018 | Isobe |
| 9,955,091 B1 | 4/2018 | Dai et al. |
| 10,007,350 B1 | 6/2018 | Holz et al. |
| 10,090,342 B1 | 10/2018 | Gambino et al. |
| 10,096,631 B2 | 10/2018 | Ishizu |
| 10,154,221 B2 | 12/2018 | Ogino et al. |
| 10,157,951 B2 | 12/2018 | Kim et al. |
| 10,274,730 B2 | 4/2019 | Jepsen et al. |
| 10,321,081 B2 | 6/2019 | Watanabe et al. |
| 10,345,447 B1 | 7/2019 | Hicks |
| 10,484,628 B2 | 11/2019 | Zhang et al. |
| 10,515,284 B2 | 12/2019 | Gousev et al. |
| 10,594,974 B2 | 3/2020 | Ivarsson et al. |
| 10,607,413 B1 | 3/2020 | Marcolina et al. |
| 10,715,824 B2 | 7/2020 | Tall et al. |
| 10,726,627 B2 | 7/2020 | Liu |
| 10,867,655 B1 | 12/2020 | Harms et al. |
| 10,897,586 B2 | 1/2021 | Liu et al. |
| 10,915,995 B2 | 2/2021 | Moloney |
| 10,939,062 B2 | 3/2021 | Ogawa et al. |
| 10,970,619 B1 | 4/2021 | Xiao et al. |
| 10,984,235 B2 | 4/2021 | Gousev et al. |
| 10,999,539 B2 | 5/2021 | Wendel et al. |
| 11,057,581 B2 | 7/2021 | Liu |
| 11,126,497 B2 | 9/2021 | Oh et al. |
| 11,204,835 B2 | 12/2021 | Lu et al. |
| 11,568,609 B1 | 1/2023 | Liu et al. |
| 11,630,724 B2 | 4/2023 | Shin et al. |
| 11,825,228 B2 | 11/2023 | Berkovich et al. |
| 11,888,002 B2 | 1/2024 | Berkovich et al. |
| 11,910,114 B2 | 2/2024 | Berkovich |
| 2002/0113886 A1 | 8/2002 | Hynecek |
| 2003/0005231 A1 | 1/2003 | Ooi et al. |
| 2003/0020100 A1 | 1/2003 | Guidash |
| 2005/0057389 A1 | 3/2005 | Krymski |
| 2005/0058773 A1 | 3/2005 | Hasei et al. |
| 2005/0073874 A1 | 4/2005 | Chan et al. |
| 2005/0237380 A1 | 10/2005 | Kakii et al. |
| 2006/0224792 A1 | 10/2006 | Ooi |
| 2007/0076109 A1 | 4/2007 | Krymski |
| 2007/0222881 A1 | 9/2007 | Mentzer |
| 2008/0007731 A1 | 1/2008 | Botchway et al. |
| 2008/0055736 A1 | 3/2008 | Tsuji et al. |
| 2008/0226170 A1 | 9/2008 | Sonoda |
| 2009/0033588 A1 | 2/2009 | Kajita et al. |
| 2009/0245637 A1 | 10/2009 | Barman et al. |
| 2010/0182468 A1 | 7/2010 | Posch et al. |
| 2010/0194956 A1 | 8/2010 | Yuan et al. |
| 2010/0197821 A1 | 8/2010 | Jeong et al. |
| 2010/0197876 A1 | 8/2010 | Lyu et al. |
| 2010/0245600 A1 | 9/2010 | Chang et al. |
| 2010/0276572 A1 | 11/2010 | Iwabuchi et al. |
| 2011/0055461 A1 | 3/2011 | Steiner et al. |
| 2011/0075470 A1 | 3/2011 | Liaw |
| 2011/0155892 A1 | 6/2011 | Neter et al. |
| 2011/0254986 A1 | 10/2011 | Nishimura et al. |
| 2011/0267362 A1 | 11/2011 | Handschy et al. |
| 2012/0002459 A1 | 1/2012 | Rimondi et al. |
| 2012/0002460 A1 | 1/2012 | Rimondi et al. |
| 2012/0044399 A1 | 2/2012 | Hirai et al. |
| 2012/0086082 A1 | 4/2012 | Malinge et al. |
| 2012/0105475 A1 | 5/2012 | Tseng |
| 2012/0105668 A1 | 5/2012 | Velarde et al. |
| 2012/0113119 A1 | 5/2012 | Massie |
| 2012/0133807 A1 | 5/2012 | Wu et al. |
| 2012/0161088 A1 | 6/2012 | Choi et al. |
| 2012/0198312 A1 | 8/2012 | Kankani et al. |
| 2012/0200499 A1 | 8/2012 | Osterhout et al. |
| 2012/0212465 A1 | 8/2012 | White et al. |
| 2012/0240007 A1 | 9/2012 | Barndt et al. |
| 2012/0262616 A1 | 10/2012 | Sa et al. |
| 2013/0056809 A1 | 3/2013 | Mao et al. |
| 2013/0057742 A1 | 3/2013 | Nakamura et al. |
| 2013/0068929 A1 | 3/2013 | Solhusvik et al. |
| 2013/0069787 A1 | 3/2013 | Petrou |
| 2013/0120642 A1 | 5/2013 | Kim |
| 2013/0141619 A1 | 6/2013 | Lim et al. |
| 2013/0185609 A1 | 7/2013 | Park et al. |
| 2013/0187027 A1 | 7/2013 | Qiao et al. |
| 2013/0198577 A1 | 8/2013 | Oh et al. |
| 2013/0207219 A1 | 8/2013 | Ahn |
| 2013/0215290 A1 | 8/2013 | Solhusvik et al. |
| 2013/0293753 A1 | 11/2013 | Keelan et al. |
| 2013/0299674 A1 | 11/2013 | Fowler et al. |
| 2013/0300009 A1 | 11/2013 | Oganesian et al. |
| 2013/0314591 A1 | 11/2013 | Eromaki |
| 2013/0326116 A1 | 12/2013 | Goss et al. |
| 2014/0042299 A1 | 2/2014 | Wan et al. |
| 2014/0055635 A1 | 2/2014 | Seo |
| 2014/0063250 A1 | 3/2014 | Park |
| 2014/0170345 A1 | 6/2014 | Aoshima et al. |
| 2014/0247382 A1 | 9/2014 | Moldovan et al. |
| 2014/0368687 A1 | 12/2014 | Yu et al. |
| 2015/0050479 A1 | 2/2015 | Nakamura et al. |
| 2015/0050480 A1 | 2/2015 | Suzuki et al. |
| 2015/0085134 A1 | 3/2015 | Novotny et al. |
| 2015/0158259 A1 | 6/2015 | Yamamoto et al. |
| 2015/0189209 A1 | 7/2015 | Yang et al. |
| 2015/0201142 A1 | 7/2015 | Smith et al. |
| 2015/0222827 A1 | 8/2015 | Isobe |
| 2015/0229859 A1 | 8/2015 | Guidash et al. |
| 2015/0279884 A1 | 10/2015 | Kusumoto |
| 2015/0309311 A1 | 10/2015 | Cho |
| 2015/0309316 A1 | 10/2015 | Osterhout et al. |
| 2015/0312502 A1 | 10/2015 | Borremans |
| 2015/0358571 A1 | 12/2015 | Dominguez Castro et al. |
| 2015/0381911 A1 | 12/2015 | Shen et al. |
| 2016/0011422 A1 | 1/2016 | Thurber et al. |
| 2016/0018645 A1 | 1/2016 | Haddick et al. |
| 2016/0021302 A1* | 1/2016 | Cho ............... H04N 25/443 348/349 |
| 2016/0028974 A1 | 1/2016 | Guidash et al. |
| 2016/0032074 A1 | 2/2016 | Aizenberg et al. |
| 2016/0048964 A1 | 2/2016 | Kruglick |
| 2016/0078614 A1 | 3/2016 | Ryu et al. |
| 2016/0088253 A1 | 3/2016 | Tezuka |
| 2016/0100115 A1 | 4/2016 | Kusano |
| 2016/0105656 A1 | 4/2016 | Lin et al. |
| 2016/0117829 A1 | 4/2016 | Yoon et al. |
| 2016/0165160 A1 | 6/2016 | Hseih et al. |
| 2016/0210785 A1 | 7/2016 | Balachandreswaran et al. |
| 2016/0256039 A1 | 9/2016 | Fukunaga |
| 2016/0295148 A1 | 10/2016 | Lin et al. |
| 2016/0344965 A1 | 11/2016 | Grauer et al. |
| 2016/0360127 A1 | 12/2016 | Dierickx et al. |
| 2017/0039906 A1 | 2/2017 | Jepsen |
| 2017/0041571 A1 | 2/2017 | Tyrrell et al. |
| 2017/0117310 A1 | 4/2017 | Tatani et al. |
| 2017/0154909 A1 | 6/2017 | Ishizu |
| 2017/0161579 A1 | 6/2017 | Gousev et al. |
| 2017/0228345 A1 | 8/2017 | Gupta et al. |
| 2017/0248789 A1 | 8/2017 | Yokoyama |
| 2017/0270664 A1 | 9/2017 | Hoogi et al. |
| 2017/0272768 A1 | 9/2017 | Tall et al. |
| 2017/0280031 A1 | 9/2017 | Price et al. |

(56) References Cited

U.S. PATENT DOCUMENTS

| | | |
|---|---|---|
| 2017/0293799 A1 | 10/2017 | Skogo et al. |
| 2017/0307887 A1 | 10/2017 | Stenberg et al. |
| 2017/0310910 A1 | 10/2017 | Smith et al. |
| 2017/0338262 A1 | 11/2017 | Hirata |
| 2017/0339327 A1 | 11/2017 | Koshkin et al. |
| 2018/0027174 A1 | 1/2018 | Sengoku |
| 2018/0115725 A1 | 4/2018 | Zhang et al. |
| 2018/0136471 A1 | 5/2018 | Miller et al. |
| 2018/0143701 A1 | 5/2018 | Suh et al. |
| 2018/0167575 A1 | 6/2018 | Watanabe et al. |
| 2018/0176545 A1 | 6/2018 | Aflaki Beni |
| 2018/0204867 A1 | 7/2018 | Kim et al. |
| 2018/0211582 A1 | 7/2018 | Sakariya et al. |
| 2018/0224658 A1 | 8/2018 | Teller |
| 2018/0239108 A1 | 8/2018 | Ishii et al. |
| 2018/0241953 A1 | 8/2018 | Johnson |
| 2018/0252857 A1 | 9/2018 | Glik et al. |
| 2018/0270436 A1 | 9/2018 | Ivarsson et al. |
| 2018/0276841 A1 | 9/2018 | Krishnaswamy et al. |
| 2018/0284594 A1 | 10/2018 | Gao |
| 2018/0288344 A1 | 10/2018 | Chu et al. |
| 2019/0019023 A1 | 1/2019 | Konttori et al. |
| 2019/0027454 A1 | 1/2019 | Chen et al. |
| 2019/0035154 A1 | 1/2019 | Liu |
| 2019/0046044 A1 | 2/2019 | Tzvieli et al. |
| 2019/0098232 A1 | 3/2019 | Mori et al. |
| 2019/0110039 A1 | 4/2019 | Linde et al. |
| 2019/0123088 A1 | 4/2019 | Kwon |
| 2019/0149751 A1 | 5/2019 | Wise |
| 2019/0172227 A1 | 6/2019 | Kasahara |
| 2019/0191116 A1 | 6/2019 | Madurawe |
| 2019/0199946 A1 | 6/2019 | Wendel et al. |
| 2019/0204527 A1 | 7/2019 | Nakajima |
| 2019/0246036 A1 | 8/2019 | Wu et al. |
| 2019/0253650 A1 | 8/2019 | Kim |
| 2019/0307313 A1 | 10/2019 | Wade |
| 2019/0331914 A1 | 10/2019 | Lee et al. |
| 2019/0361250 A1 | 11/2019 | Lanman et al. |
| 2019/0363118 A1 | 11/2019 | Berkovich et al. |
| 2020/0035661 A1 | 1/2020 | Yu et al. |
| 2020/0053299 A1 | 2/2020 | Zhang et al. |
| 2020/0098096 A1 | 3/2020 | Moloney |
| 2020/0193206 A1 | 6/2020 | Turkelson et al. |
| 2020/0195828 A1 | 6/2020 | Reyserhove et al. |
| 2020/0195875 A1 | 6/2020 | Berkovich et al. |
| 2020/0228740 A1 | 7/2020 | Otaka |
| 2020/0273784 A1 | 8/2020 | Mallik et al. |
| 2020/0280689 A1 | 9/2020 | Takahashi et al. |
| 2021/0026796 A1 | 1/2021 | Graif et al. |
| 2021/0044742 A1 | 2/2021 | Berkovich et al. |
| 2021/0075982 A1 | 3/2021 | Wojciechowski et al. |
| 2021/0084249 A1 | 3/2021 | Nakazawa et al. |
| 2021/0110187 A1 | 4/2021 | Pillai et al. |
| 2021/0118847 A1 | 4/2021 | Chuang et al. |
| 2021/0142086 A1 | 5/2021 | Berkovich et al. |
| 2021/0144326 A1 | 5/2021 | Sato et al. |
| 2021/0152758 A1 | 5/2021 | Muraoka |
| 2021/0185199 A1 | 6/2021 | Schneider, Jr. et al. |
| 2021/0185264 A1 | 6/2021 | Wong et al. |
| 2021/0227159 A1 | 7/2021 | Sambonsugi |
| 2021/0264679 A1 | 8/2021 | Liu et al. |
| 2021/0281794 A1 | 9/2021 | Yoda |
| 2021/0283871 A1 | 9/2021 | Lee et al. |
| 2021/0289156 A1 | 9/2021 | Hanzawa et al. |
| 2021/0306586 A1* | 9/2021 | Yamamoto ............ G06N 3/045 |
| 2021/0337148 A1 | 10/2021 | Powell |
| 2021/0368124 A1 | 11/2021 | Berkovich et al. |
| 2021/0377496 A1 | 12/2021 | Kim et al. |
| 2021/0409625 A1 | 12/2021 | Zhu et al. |
| 2022/0021833 A1 | 1/2022 | Berkovich |
| 2022/0076726 A1 | 3/2022 | Hulton et al. |
| 2023/0239582 A1 | 7/2023 | Berkovich et al. |

FOREIGN PATENT DOCUMENTS

| | | |
|---|---|---|
| CN | 103907133 A | 7/2014 |
| CN | 104204904 A | 12/2014 |
| CN | 106233188 A | 12/2016 |
| CN | 106255978 A | 12/2016 |
| CN | 106791504 A | 5/2017 |
| CN | 107005641 A | 8/2017 |
| CN | 108139799 A | 6/2018 |
| CN | 109298528 A | 2/2019 |
| DE | 102015122055 A1 | 6/2017 |
| EP | 0775591 A2 | 5/1997 |
| EP | 1603170 A1 | 12/2005 |
| EP | 1746820 A1 | 1/2007 |
| EP | 1788802 A1 | 5/2007 |
| EP | 2037505 A1 | 3/2009 |
| EP | 2228846 A1 | 9/2010 |
| EP | 2330173 A2 | 6/2011 |
| EP | 2357679 A2 | 8/2011 |
| EP | 2804074 A2 | 11/2014 |
| EP | 3229457 A1 | 10/2017 |
| EP | 3833005 A1 | 6/2021 |
| JP | 2003319262 A | 11/2003 |
| JP | 2005129139 A | 5/2005 |
| JP | 2006113139 A | 4/2006 |
| JP | 2006348085 A | 12/2006 |
| JP | 2008270500 A | 11/2008 |
| JP | 2013043383 A | 3/2013 |
| JP | 2014531820 A | 11/2014 |
| JP | 2017060155 A | 3/2017 |
| KR | 20110100974 A | 9/2011 |
| WO | 2006022077 A1 | 3/2006 |
| WO | 2014055391 A2 | 4/2014 |
| WO | 2016042734 A1 | 3/2016 |
| WO | 2016088840 A1 | 6/2016 |
| WO | 2016095057 A1 | 6/2016 |
| WO | 2017003477 A1 | 1/2017 |
| WO | 2017013806 A1 | 1/2017 |
| WO | 2017047010 A1 | 3/2017 |
| WO | 2018231962 A1 | 12/2018 |
| WO | 2019018084 A1 | 1/2019 |
| WO | 2019111528 A1 | 6/2019 |
| WO | 2019145578 A1 | 8/2019 |
| WO | 2019178060 A1 | 9/2019 |
| WO | 2019244142 A2 | 12/2019 |
| WO | 2020077283 A1 | 4/2020 |

OTHER PUBLICATIONS

Cho K., et al., "A Low Power Dual CDS for a Column-Parallel CMOS Image Sensor," Journal of Semiconductor Technology and Science, Dec. 30, 2012, vol. 12 (4), pp. 388-396.

Chuxi L., et al., "A Memristor-Based Processing-in-Memory Architecture for Deep Convolutional Neural Networks Approximate Computation," Journal of Computer Research and Development, Jun. 30, 2017, vol. 54 (6), pp. 1367-1380.

Corrected Notice of Allowability mailed Apr. 9, 2021 for U.S. Appl. No. 16/255,528, filed Jan. 23, 2019, 5 Pages.

Extended European Search Report for European Application No. 18179846.3, mailed Dec. 7, 2018, 10 Pages.

Extended European Search Report for European Application No. 18179851.3, mailed Dec. 7, 2018, 8 Pages.

Extended European Search Report for European Application No. 19743908.6, mailed Sep. 30, 2020, 9 Pages.

Final Office Action mailed Oct. 18, 2021 for U.S. Appl. No. 16/716,050, filed Dec. 16, 2019, 18 Pages.

Final Office Action mailed Oct. 21, 2021 for U.S. Appl. No. 16/421,441, filed May 23, 2019, 23 Pages.

Final Office Action mailed Jan. 27, 2021 for U.S. Appl. No. 16/255,528, filed Jan. 23, 2019, 31 Pages.

Final Office Action mailed Jul. 28, 2021 for U.S. Appl. No. 17/083,920, filed Oct. 29, 2020, 19 Pages.

International Search Report and Written Opinion for International Application No. PCT/US2018/039350, mailed Nov. 15, 2018, 11 Pages.

(56) References Cited

OTHER PUBLICATIONS

International Search Report and Written Opinion for International Application No. PCT/US2018/039352, mailed Oct. 26, 2018, 8 Pages.
International Search Report and Written Opinion for International Application No. PCT/US2018/039431, mailed Nov. 7, 2018, 12 Pages.
International Search Report and Written Opinion for International Application No. PCT/US2019/034007, mailed Oct. 28, 2019, 18 Pages.
International Search Report and Written Opinion for International Application No. PCT/US2019/066805, mailed Mar. 6, 2020, 9 Pages.
International Search Report and Written Opinion for International Application No. PCT/US2019/066831, mailed Feb. 27, 2020, 11 Pages.
International Search Report and Written Opinion for International Application No. PCT/US2020/044807, mailed Sep. 30, 2020, 12 Pages.
International Search Report and Written Opinion for International Application No. PCT/US2020/058097, mailed Feb. 12, 2021, 09 Pages.
International Search Report and Written Opinion for International Application No. PCT/US2020/059636, mailed Feb. 11, 2021, 18 Pages.
International Search Report and Written Opinion for International Application No. PCT/US2021/031201, mailed Aug. 2, 2021, 13 Pages.
International Search Report and Written Opinion for International Application No. PCT/US2021/033321, mailed Sep. 6, 2021, 11 pages.
Millet L., et al., "A 5500-Frames/s 85-GOPS/W 3-D Stacked BSI Vision Chip Based on Parallel In-Focal-Plane Acquisition and Processing," IEEE Journal of Solid-State Circuits, USA, Apr. 1, 2019, vol. 54 (4), pp. 1096-1105, XP011716786.
Non-Final Office Action mailed Jan. 1, 2021 for U.S. Appl. No. 16/715,792, filed Dec. 16, 2019, 15 Pages.
Non-Final Office Action mailed Sep. 2, 2021 for U.S. Appl. No. 16/910,844, filed Jun. 24, 2020, 7 Pages.
Non-Final Office Action mailed May 7, 2021 for U.S. Appl. No. 16/421,441, filed May 23, 2019, 17 Pages.
Non-Final Office Action mailed Jul. 10, 2020 for U.S. Appl. No. 16/255,528, filed Jan. 23, 2019, 27 Pages.
Non-Final Office Action mailed May 14, 2021 for U.S. Appl. No. 16/716,050, filed Dec. 16, 2019, 16 Pages.
Non-Final Office Action mailed Apr. 21, 2021 for U.S. Appl. No. 17/083,920, filed Oct. 29, 2020, 17 Pages.
Non-Final Office Action mailed Oct. 21, 2021 for U.S. Appl. No. 17/083,920, filed Oct. 29, 2020, 19 Pages.
Non-Final Office Action mailed Nov. 23, 2018 for U.S. Appl. No. 15/847,517, filed Dec. 19, 2017, 21 Pages.
Non-Final Office Action mailed Jul. 25, 2019 for U.S. Appl. No. 15/909,162, filed Mar. 1, 2018, 20 Pages.
Notice of Allowance mailed Apr. 1, 2021 for U.S. Appl. No. 16/255,528, filed Jan. 23, 2019, 7 Pages.
Notice of Allowance mailed Apr. 16, 2021 for U.S. Appl. No. 16/715,792, filed Dec. 16, 2019, 10 Pages.
Notice of Allowance mailed Mar. 18, 2020 for U.S. Appl. No. 15/909,162, filed Mar. 1, 2018, 9 Pages.
Notice of Allowance mailed Dec. 22, 2021 for U.S. Appl. No. 16/910,844, filed Jun. 24, 2020, 7 pages.
Notice of Allowance mailed Nov. 24, 2021 for U.S. Appl. No. 16/910,844, filed Jun. 24, 2020, 8 pages.
Notice of Allowance mailed Aug. 25, 2021 for U.S. Appl. No. 16/715,792, filed Dec. 16, 2019, 9 Pages.
Office Action mailed Jul. 3, 2020 for Chinese Application No. 201810821296, filed Jul. 24, 2018, 17 Pages.
Office Action mailed Mar. 9, 2021 for Chinese Application No. 201810821296, filed Jul. 24, 2018, 10 Pages.
Office Action mailed Jun. 28, 2020 for Chinese Application No. 201810821296, filed Jul. 24, 2018, 2 Pages.
Partial European Search Report for European Application No. 18179838.0, mailed Dec. 5, 2018, 13 Pages.
Restriction Requirement mailed Feb. 2, 2021 for U.S. Appl. No. 16/716,050, filed Dec. 16, 2019, 7 Pages.
Sebastian A., et al., "Memory Devices and Applications for In-memory Computing," Nature Nanotechnology, Nature Publication Group, Inc, London, Mar. 30, 2020, vol. 15 (7), pp. 529-544, XP037194929.
Shi C., et al., "A 1000fps Vision Chip Based on a Dynamically Reconfigurable Hybrid Architecture Comprising a PE Array and Self-Organizing Map Neural Network," International Solid-State Circuits Conference, Session 7, Image Sensors, Feb. 10, 2014, pp. 128-130, XP055826878.
Office Action mailed Apr. 5, 2022 for European Patent Application No. 19731047.7, filed May 24, 2019, 7 pages.
Invitation to Pay Additional Fees and Where Applicable, Protest Fee for International Application No. PCT/US2021/041775, Oct. 8, 2021, 12 pages.
Notice of Allowance mailed Jun. 17, 2022 for U.S. Appl. No. 16/715,792, filed Dec. 16, 2019, 2 pages.
Notice of Allowance mailed Jun. 2, 2022 for U.S. Appl. No. 16/716,050, filed Dec. 16, 2019, 13 pages.
Notice of Allowance mailed May 23, 2022 for U.S. Appl. No. 17/324,803, filed May 19, 2021, 9 pages.
Notice of Allowance mailed Jun. 24, 2022 for U.S. Appl. No. 16/421,441, filed May 23, 2019, 17 pages.
Notice of Allowance mailed May 24, 2022 for U.S. Appl. No. 16/715,792, filed Dec. 16, 2019, 9 pages.
8 Notice of Allowance mailed Jun. 3, 2022 for U.S. Appl. No. 17/324,803, filed May 19, 2021, 6 pages.
Corrected Notice of Allowance mailed Mar. 22, 2022 for U.S. Appl. No. 16/716,050, filed Dec. 16, 2019, 2 Pages.
Non-Final Office Action mailed Mar. 2, 2022 for U.S. Appl. No. 17/127,670, filed Dec. 18, 2020, 18 pages.
Notice of Allowance mailed Feb. 7, 2022 for U.S. Appl. No. 17/324,803, filed May 19, 2021, 8 pages.
Notice of Allowance mailed Mar. 7, 2022 for U.S. Appl. No. 16/421,441, filed May 23, 2019, 18 pages.
Notice of Allowance mailed Mar. 11, 2022 for U.S. Appl. No. 16/716,050, filed Dec. 16, 2019, 13 pages.
International Preliminary Report on Patentability for International Application No. PCT/US2020/044807, mailed Feb. 17, 2022, 10 pages.
Advisory Action mailed Oct. 1, 2021 for U.S. Appl. No. 17/083,920, filed Oct. 29, 2020, 4 pages.
Notice of Allowance mailed Feb. 14, 2022 for U.S. Appl. No. 16/715,792, filed Dec. 16, 2019, 9 pages.
Notice of Allowance mailed Feb. 22, 2022 for U.S. Appl. No. 17/083,920, filed Oct. 29, 2020, 10 pages.
Amir M.F., et al., "NeuroSensor: A 3D Image Sensor with Integrated Neural Accelerator," IEEE SOI-3D-Subthreshold Microelectronics Technology Unified Conference (S3S), Oct. 2016, pp. 1-2.
Corrected Notice of Allowance mailed Apr. 18, 2023 for U.S. Appl. No. 17/127,670, filed Mar. 5, 2021,2 pages.
Final Office Action mailed Oct. 6, 2022 for U.S. Appl. No. 17/127,670, filed Dec. 18, 2020, 20 pages.
Final Office Action mailed Apr. 12, 2023 for U.S. Appl. No. 16/983,863, filed Aug. 3, 2020, 21 pages.
International Search Report and Written Opinion for International Application No. PCT/US2022/034259, mailed Oct. 21, 2022, 10 pages.
International Search Report and Written Opinion for International Application No. PCT/US2023/011630, mailed Apr. 6, 2023, 10 pages.
Non-Final Office Action mailed Nov. 2, 2022 for U.S. Appl. No. 16/983,863, filed Aug. 3, 2020, 20 pages.
Non-Final Office Action mailed Mar. 6, 2023 for U.S. Appl. No. 17/992,648, filed Nov. 22, 2022,24 pages.
Non-Final Office Action mailed Jun. 30, 2023 for U.S. Appl. No. 17/556,436, filed Dec. 20, 2021,25 pages.

(56) References Cited

OTHER PUBLICATIONS

Notice of Allowance mailed Sep. 2, 2022 for U.S. Appl. No. 16/715,792, filed Dec. 16, 2019, 9 pages.
Notice of Allowance mailed Jan. 3, 2023 for U.S. Appl. No. 16/421,441, filed May 23, 2019,11 pages.
Notice of Allowance mailed Jan. 3, 2023 for U.S. Appl. No. 16/715,792, filed Dec. 16, 2019, 9 pages.
Notice of Allowance mailed Sep. 6, 2022 for U.S. Appl. No. 16/421,441, filed May 23, 2019, 17 pages.
Notice of Allowance mailed Feb. 7, 2023 for U.S. Appl. No. 17/083,920, filed Oct. 29, 2020, 10 pages.
Notice of Allowance mailed Jun. 7, 2023 for U.S. Appl. No. 16/716,050, filed Dec. 16, 2019, 18 pages.
Notice of Allowance mailed Feb. 8, 2023 for U.S. Appl. No. 17/324,803, filed May 19, 2021, 8 pages.
Notice of Allowance mailed Sep. 8, 2022 for U.S. Appl. No. 17/324,803, filed May 19, 2021, 8 pages.
Notice of Allowance mailed Sep. 9, 2022 for U.S. Appl. No. 17/083,920, filed Oct. 29, 2020, 10 pages.
Notice of Allowance mailed Sep. 9, 2022 for U.S. Appl. No. 17/091,331, filed Nov. 6, 2020, 2 pages.
Notice of Allowance mailed Dec. 15, 2022 for U.S. Appl. No. 17/091,331, filed Nov. 6, 2020, 8 pages.
Notice of Allowance mailed May 15, 2023 for U.S. Appl. No. 16/421,441, filed May 23, 2019, 10 pages.
Notice of Allowance mailed Jul. 18, 2023 for U.S. Appl. No. 17/091,331, filed Nov. 6, 2020, 7 pages.
Notice of Allowance mailed Apr. 19, 2023 for U.S. Appl. No. 16/715,792, filed Dec. 16, 2019, 9 pages.
Notice of Allowance mailed Sep. 19, 2022 for U.S. Appl. No. 16/716,050, filed Dec. 16, 2019, 13 pages.
Notice of Allowance mailed May 22, 2023 for U.S. Appl. No. 17/324,803, filed May 19, 2021, 5 pages.
Notice of Allowance mailed Aug. 24, 2022 for U.S. Appl. No. 17/091,331, filed Nov. 6, 2020, 9 pages.
Notice of Allowance mailed Jan. 26, 2023 for U.S. Appl. No. 16/716,050, filed Dec. 16, 2019,14 pages.
Notice of Allowance mailed Mar. 27, 2023 for U.S. Appl. No. 17/127,670, filed Dec. 18, 2020,9 pages.
Notice of Allowance mailed Mar. 28, 2023 for U.S. Appl. No. 17/091,331, filed Nov. 6, 2020, 5 pages.
Notice of Allowance mailed Sep. 28, 2022 for U.S. Appl. No. 16/716,050, filed Dec. 16, 2019, 6 pages.
Office Action mailed Aug. 11, 2022 for European Patent Application No. 19731047.7, filed May 24, 2019, 10 pages.
Office Action mailed Feb. 11, 2023 for Chinese Application No. 201980048866.0, filed May 24, 2019, 20 Pages.
Office Action mailed Feb. 13, 2023 for Taiwan Application No. 108146255, filed Dec. 17, 2019, 30 pages.
Office Action mailed Mar. 14, 2023 for Taiwan Application No. 108146257, filed Dec. 17, 2019, 25 pages.
Office Action mailed Aug. 17, 2022 for Chinese Application No. 201980083991.5, filed Jun. 17, 2021, 24 pages.
Office Action mailed Mar. 23, 2023 for Chinese Application No. 201980083991.5, filed Jun. 17, 2021,21 pages.
Office Action mailed Jul. 29, 2022 for Taiwan Application No. 108118209, filed May 27, 2019, 15 pages.
Corrected Notice of Allowance mailed Oct. 13, 2023 for U.S. Appl. No. 17/324,803, filed May 19, 2021, 2 pages.
Devlin N.R., et al., "Patterning Decomposable Polynorbornene with Electron Beam Lithography to Create Nanochannels," Journal of Vacuum Science and Technology, vol. 27, No. 6, Dec. 1, 2009, pp. 2508-2511.
Dong J., et al., "Self-Assembly of Highly Stable Zirconium(IV) Coordination Cages with Aggregation Induced Emission Molecular Rotors for Live-Cell Imaging," Angewandte Chemie International Edition, vol. 59, No. 25, Jun. 15, 2020, 10 pages.
International Preliminary Report on Patentability for International Application No. PCT/US2020/058439, mailed Jun. 23, 2022, 11 pages.
International Preliminary Report on Patentability for International Application No. PCT/US2020/059560, mailed Jun. 16, 2022, 8 pages.
International Preliminary Report on Patentability for International Application No. PCT/US2020/061218, mailed Jun. 9, 2022, 9 pages.
International Preliminary Report on Patentability for International Application No. PCT/US2020/062991, mailed Jul. 7, 2022, 8 pages.
International Preliminary Report on Patentability for International Application No. PCT/US2020/066992, mailed Jul. 7, 2022, 27 pages.
International Preliminary Report on Patentability for International Application No. PCT/US2021/014970, mailed Sep. 9, 2022, 7 pages.
International Preliminary Report on Patentability for International Application No. PCT/US2021/016158, mailed Aug. 18, 2022, 7 pages.
International Search Report and Written Opinion for International Application No. PCT/US2020/056758, mailed Feb. 17, 2021, 11 Pages.
International Search Report and Written Opinion for International Application No. PCT/US2020/058439, mailed Apr. 6, 2021, 16 Pages.
International Search Report and Written Opinion for International Application No. PCT/US2020/059560, mailed Feb. 9, 2021, 9 Pages.
International Search Report and Written Opinion for International Application No. PCT/US2020/061218, mailed Feb. 16, 2021, 11 pages.
International Search Report and Written Opinion for International Application No. PCT/US2020/062991, mailed Feb. 24, 2021, 9 Pages.
International Search Report and Written Opinion for International Application No. PCT/US2020/066992, mailed May 17, 2021, 31 Pages.
International Search Report and Written Opinion for International Application No. PCT/US2021/014970, mailed Apr. 26, 2021,8 Pages.
Khaled S.R., "A Review of Piezoelectric Polymers as Functional Materials for Electromechanical Transducers," Smart Materials and Structures, IOP Publishing LTD, Bristol, GB, Jan. 20, 2014 [retrieved on Jan. 20, 2014], vol. 23 (3), Article 33001,29 pages, XP020258249, ISSN: 0964-1726, DOI: 10.1088/0964-1726/23/3/033001.
Levola T., "Diffractive Optics for Virtual Reality Displays," Journal of the Society for Information Display—SID, May 2006, vol. 14 (5), pp. 467-475, XP008093627.
Non-Final Office Action mailed Dec. 8, 2023 for U.S. Appl. No. 17/645,904, filed Dec. 23, 2021, 19 pages.
Non-Final Office Action mailed Nov. 14, 2023 for U.S. Appl. No. 16/983,863, filed Aug. 3, 2020, 10 pages.
Non-Final Office Action mailed Jul. 22, 2021 for U.S. Appl. No. 16/834,605, filed Mar. 30, 2020, 12 pages, [FACTP103US].
Notice of Allowance mailed Nov. 1, 2023 for U.S. Appl. No. 17/091,331, filed Nov. 6, 2020, 7 pages.
Notice of Allowance mailed Mar. 6, 2024 for U.S. Appl. No. 17/127,670, filed Dec. 18, 2020, 9 pages.
Notice of Allowance mailed Dec. 12, 2023 for U.S. Appl. No. 17/992,648, filed Nov. 22, 2022, 10 pages.
Notice of Allowance mailed Sep. 12, 2023 for U.S. Appl. No. 17/324,803, filed May 19, 2021,2 pages.
Notice of Allowance mailed Oct. 13, 2023 for U.S. Appl. No. 16/421,441, filed May 23, 2019, 11 pages.
Notice of Allowance mailed Nov. 15, 2023 for U.S. Appl. No. 17/083,920, filed Oct. 29, 2020, 12 pages.
Notice of Allowance mailed Sep. 15, 2023 for U.S. Appl. No. 16/716,050, filed Dec. 16, 2019, 18 pages.
Notice of Allowance mailed Aug. 16, 2023 for U.S. Appl. No. 16/715,792, filed Dec. 16, 2019, 9 pages.
Notice of Allowance mailed Nov. 16, 2023 for U.S. Appl. No. 17/556,436, filed Dec. 20, 2021, 8 pages.
Notice of Allowance mailed Aug. 22, 2023 for U.S. Appl. No. 17/992,648, filed Nov. 22, 2022, 10 pages.

(56) References Cited

OTHER PUBLICATIONS

Notice of Allowance mailed Mar. 22, 2022 for U.S. Appl. No. 16/834,605, filed Mar. 30, 2020, 8 pages, [FACTP103US].
Notice of Allowance mailed Feb. 28, 2024 for U.S. Appl. No. 16/421,441, filed May 23, 2019, 18 pages.
Notice of Allowance mailed Aug. 30, 2023 for U.S. Appl. No. 17/324,803, filed May 19, 2021, 5 pages.
Notice of Allowance mailed May 31, 2022 for U.S. Appl. No. 16/706,859, filed Dec. 9, 2019, 13 pages.
Office Action mailed Sep. 5, 2023 for Japanese Patent Application No. 2020-561752, filed on Nov. 2, 2020, 5 pages.
Office Action mailed Dec. 7, 2023 for Chinese Application No. 201980092371.8, filed Dec. 17, 2019, 7 pages.
Office Action mailed Dec. 7, 2023 for Chinese Application No. 202080047086.7, filed Aug. 4, 2020, 7 pages.
Office Action mailed Dec. 12, 2023 for Japanese Patent Application No. 2021-526520, filed on Dec. 17, 2019, 5 pages.
Office Action mailed Sep. 20, 2023 for Taiwan Application No. 109139740, filed Nov. 13, 2020, 17 pages.
Office Action mailed Jan. 25, 2024 for Chinese Application No. 202080073982.0, filed Oct. 30, 2020, 9 pages.
Office Action mailed Dec. 26, 2023 for Japanese Patent Application No. 2021-531109, filed on May 31, 2021, 2 pages.
Office Action mailed Jan. 29, 2024 for European Patent Application No. 19731047.7, filed on May 24, 2019, 5 pages.
Office Action mailed Jan. 31, 2024 for Korean Application No. 10-2020-7037369, filed May 24, 2019, 20 pages.

* cited by examiner

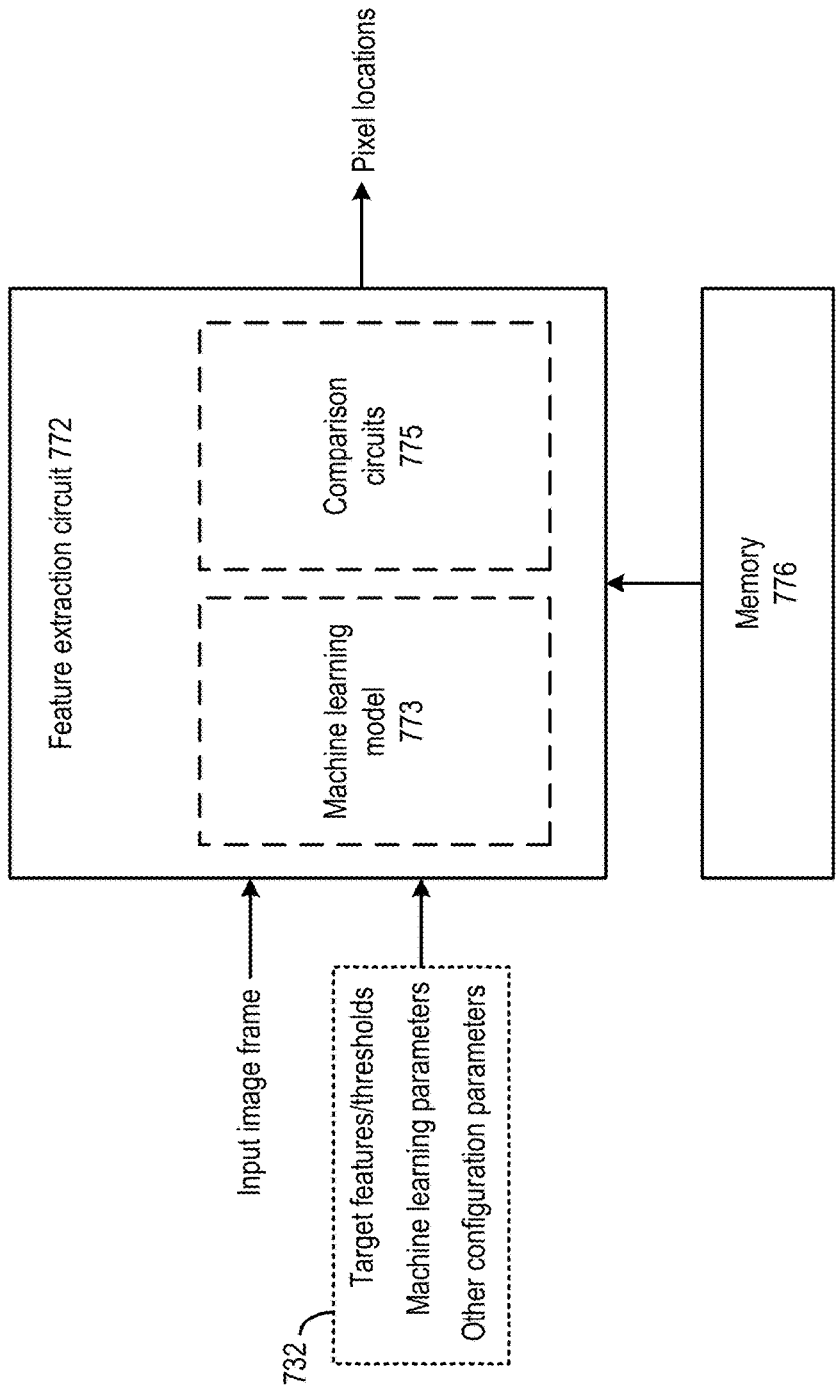

PROGRAMMABLE SMART SENSOR WITH ADAPTIVE READOUT

BACKGROUND

This application claims priority to U.S. provisional patent application Ser. No. 63/075,636, filed Sep. 8, 2020 entitled, "PROGRAMMING OF SMART SENSOR" as well as U.S. provisional patent application Ser. No. 63/084,955, filed on Sep. 29, 2020 entitled "PROGRAMMABLE SENSOR SUPPORTING ADAPTIVE READOUT", each of which is hereby expressly incorporated by reference in its entirety.

BACKGROUND

A typical image sensor includes an array of pixel cells. Each pixel cell may include a photodiode to sense light by converting photons into charge (e.g., electrons or holes). The charge generated by the array of photodiodes can then be quantized by an analog-to-digital converter (ADC) into digital values to generate a digital image. The digital image may be exported from the sensor to another system (e.g., a viewing system for viewing the digital image, a processing system for interpreting the digital image, a compilation system for compiling a set of digital images, etc.).

SUMMARY

The present disclosure relates to image sensors. More specifically, and without limitation, this disclosure relates to a programmable image sensor utilizing compression, mapping, and feedback sequences to improve power consumption of, and data import/export operations from, the image sensor. The programmable image sensor may be communicatively coupled to a pixel map generator that generates compressed pixel mapping data to improve the function of the programmable image sensor.

In some examples, an apparatus is provided. The apparatus includes: an array of pixel cells configured to generate an array of voltages, each pixel cell of the array of pixel cells including one or more photodiodes configured to generate a charge in response to light and a charge storage device to convert the charge to a voltage; one or more analog-to-digital converters (ADC) configured the convert the array of voltages to first digital pixel data comprising one or more pixel values; and a processor configured to: receive the first digital pixel data from the ADC; determine, based on the one or more pixel values, one or more first pixel values and one or more second pixel values; generate second digital pixel data, the second digital pixel data comprising the one or more first pixel values and not the one or more second pixel values; and send, from the sensor apparatus to a separate receiving apparatus, the second digital pixel data.

In some aspects, the processor is further configured to receive activation map data, the activation map data comprising an array of map values corresponding to the array of pixel cells; and process the activation map data to determine the array of map values. In further aspects, the one or more charge storage devices convert the charge to the array of voltages based at least in part on the array of map values. In further aspects, the one or more ADC convert the array of voltages to first digital pixel data based at least in part on the array of map values. In further aspects, the processor generates the second digital pixel data based at least in part on the array of map values.

In some aspects, the array of map values comprises one or more first map values corresponding to the one or more first pixel values and one or more second map values corresponding to the second pixel values. In some further aspects, the first map values represent enabled pixels of the array of pixel cells that will be included in the second digital pixel data as the one or more first pixel values and the second map values represent disabled pixels of the array of pixels cells that will not be included in the second digital pixel data.

In some aspects, the separate receiving apparatus is an application system communicatively coupled to the sensor apparatus and the activation map data is received from an application system. In some further aspects, the activation map data is a compressed representation of an activation map, the activation map data generated based at least on a compression scheme.

In some aspects, the activation map data is a representation of a combined activation map, the combined activation map being generated by the application system using a combination of a first activation map and a second activation map. In some further aspects, the combined map is generated by a generative model of the application system previously trained by a machine learning model to generate activation maps and the second activation map is generated by the application system based on the first activation map. In some further aspects, the first activation map is a region of interest map comprising one or more regions of interest and the second activation map is a sub-sampling map of each of the one or more regions of interest in the first activation map.

In some aspects, the application system is configured to process the second digital pixel data to extract one or more image features from the second digital pixel data.

In some aspects, the activation map data is serialized activation map data and the processor is further configured to deserialize the activation map data prior to processing the activation map data to determine the array of map values.

In some aspects, the one or more photodiodes are configured to generate the charge in response to receiving a control signal indicating to generate the charge. In some further aspects, the processor is further configured to send, to the array of pixel cells and in response to sending the second digital pixel data to the separate receiving apparatus, the control signal indicating to generate the charge. In some further aspects, the processor is configured to determine a dispatch rate corresponding to a rate at which the processor sends the second digital pixel data to the separate receiving apparatus, the control signal comprises the dispatch rate, and the one or more photodiodes are configured to generate the charge based at least in part on the dispatch rate.

In some aspects, the processor is further configured to serialize the second digital pixel data prior to sending the second digital pixel data to the separate receiving apparatus.

In some aspects, the one or more second pixel values are one or more null pixel values corresponding to non-quantized voltages.

In some examples, a method includes: operating each pixel cell of an array of pixel cells to generate a charge in response to light, and to convert the charge to output a voltage of an array of voltages; converting an array of voltages to first pixel data comprising one or more first pixel values and one or more second pixel values; generate second digital pixel data, the second digital pixel data comprising the one or more first pixel values and not the one or more second pixel values; and send, the second digital pixel data to a receiving system.

BRIEF DESCRIPTION OF THE DRAWINGS

Illustrative embodiments are described with reference to the following figures.

FIG. 7A, FIG. 7B, FIG. 7C, FIG. 7D, FIG. 7E, and FIG. 7F illustrate examples of an image processing system and its operations.

Figure 1A:
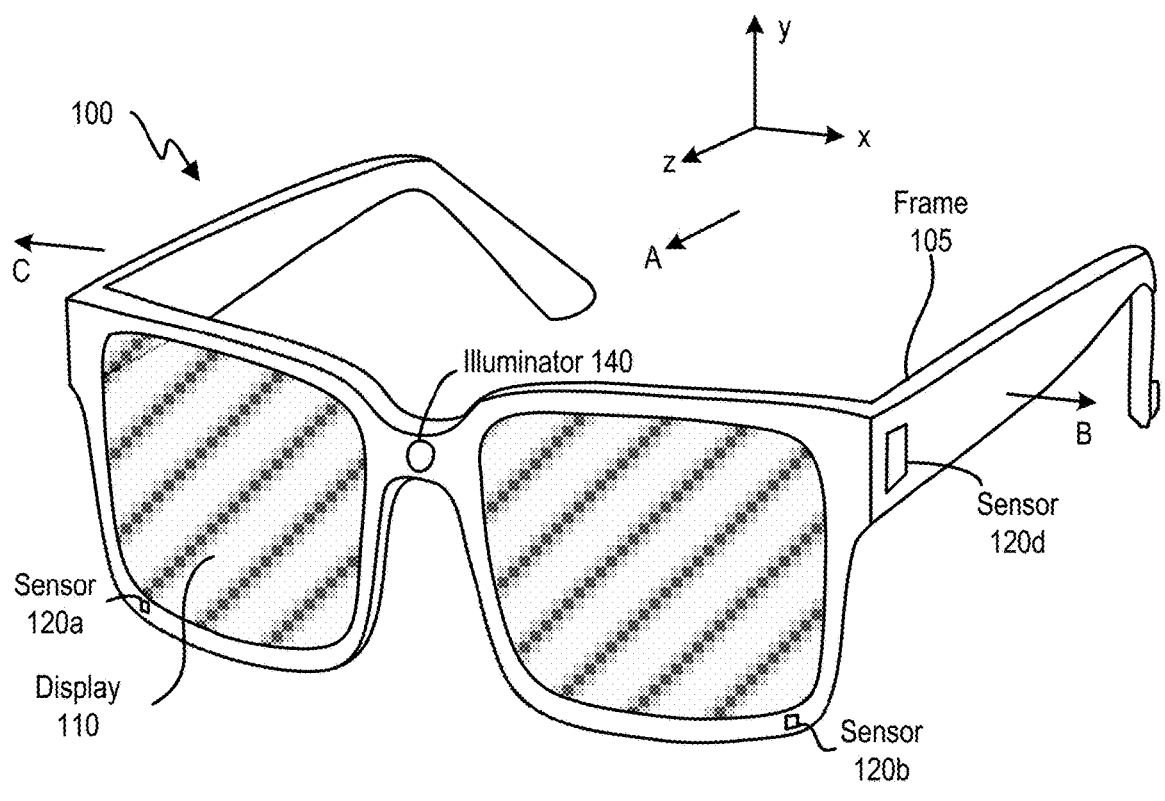
FIG. 1A and FIG. 1B are diagrams of an embodiment of a near-eye display.
Figure 1A:
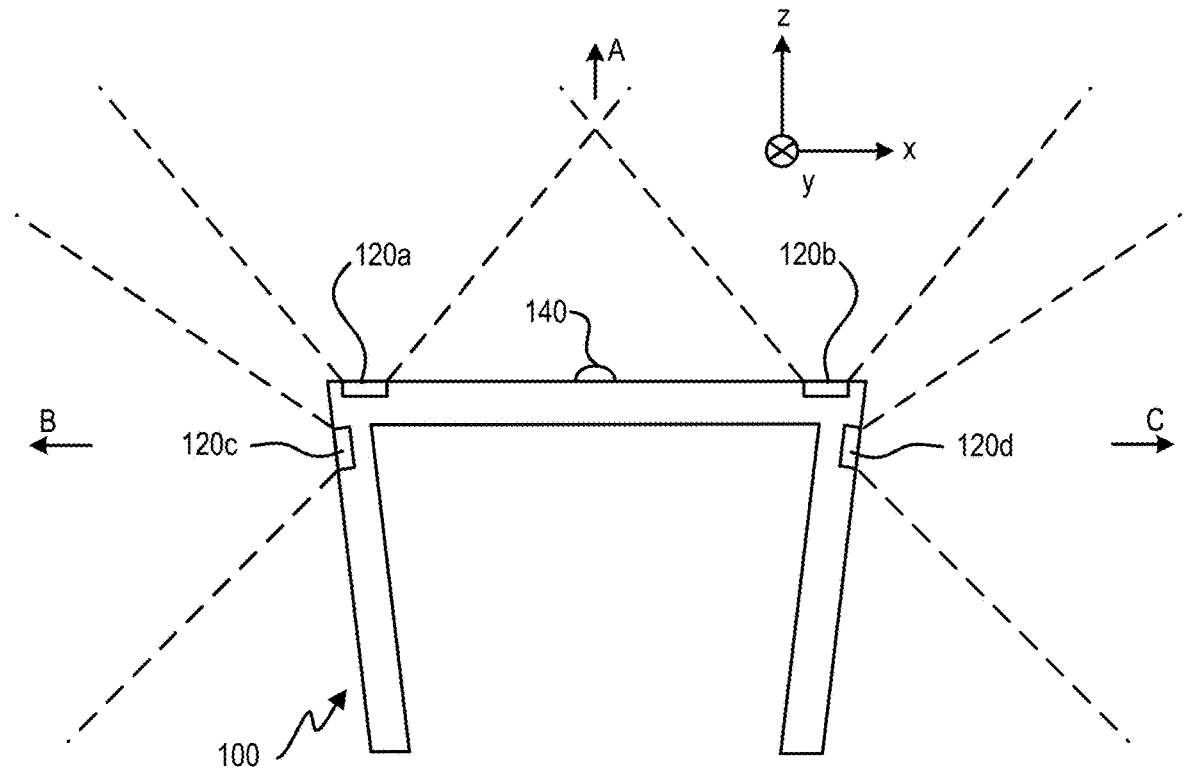

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

A typical image sensor includes an array of pixel cells. Each pixel cell includes a photodiode to sense incident light by converting photons into charge (e.g., electrons or holes). The charge generated by photodiodes of the array of pixel cells can then be quantized by an analog-to-digital converter (ADC) into digital values. The ADC can quantize the charge by, for example, using a comparator to compare a voltage representing the charge with one or more quantization levels, and a digital value can be generated based on the comparison result. The digital values can then be stored in a memory to generate a digital image.

The digital image data can support various wearable applications, such as object recognition and tracking, location tracking, augmented reality (AR), virtual reality (VR), etc. These and other applications may utilize extraction techniques to extract, from a subset of pixels of the digital image, aspects of the digital image (i.e., light levels, scenery, semantic regions) and/or features of the digital image (i.e., objects and entities represented in the digital image). For example, an application can identify pixels of reflected structured light (e.g., dots), compare a pattern extracted from the pixels with the transmitted structured light, and perform depth computation based on the comparison.

The application can also identify 2D pixel data from the same pixel cells that provide the extracted pattern of structured light to perform fusion of 2D and 3D sensing. To perform object recognition and tracking, an application can also identify pixels of image features of the object, extract the image features from the pixels, and perform the recognition and tracking based on the extraction results. These applications are typically executed on a host processor, which can be electrically connected with the image sensor and receive the pixel data via interconnects. The host processor, the image sensor, and the interconnects can be part of a wearable device.

Contemporary digital image sensors are complex apparatuses that convert light into digital image data. Programmable or "smart" sensors are powerful digital image sensors that may use a controller or other processing unit to alter the manner in which digital image data is generated from an analog light signal. These smart sensors have the ability to alter the manner in which a larger digital image is generated at the individual pixel level.

Smart sensors consume a great amount of energy to function. Sensor-based processes that affect the generation of digital pixel data at the pixel level require a high frequency of information to be transferred onto the sensor, off the sensor, and between components of the sensor. Power consumption is a troubling issue for smart sensors, which consumer relatively high levels of power when performing tasks at an individual pixel level of granularity. For example, a smart sensor manipulating individual pixel values may consume power to receive a signal regarding a pixel map, determine an individual pixel value from the pixel map, capture an analog pixel value based on the individual pixel value, convert the analog pixel value to a digital pixel value, combine the digital pixel value with a plurality of digital pixel values, export the plurality of digital pixel values off of the smart sensor, etc. The power consumption for these processes is compounded with each individual pixel that may be captured by the smart sensor and exported off-sensor. For example, it is not uncommon for sensors to capture digital images composed of over two million pixels at least 30 times or more per second, and each pixel captured and exported consumes energy.

There are various power and performance issues that a smart sensor may experience when converting input light to output digital image data. Conversion of light saturation values to analog values requires an minimum period of time to complete for a reliable image, as does converting the analog values to digital values and exporting the digital values off-sensor. When components of the smart sensor perform generation and conversion processes at different rates, components experience a "bottleneck." The bottleneck constrains the rate of digital image data output to the processing rate of the bottlenecked component. In addition, other non-bottlenecked components of the smart sensor actively waste energy while waiting for the bottlenecked component to complete processing. Additionally, the digital image data is often of a fixed size, corresponding to the total number of digital pixel values generated by the smart sensor (i.e. the number of pixels-per-row multiplied by the number of pixels-per-column). Exporting the fixed-size digital image data is inefficient and consumes lots of power to export off-sensor because each individual pixel value is output, even when many of the digital pixel values contain little to no data that is pertinent to the corresponding digital image.

This disclosure relates to a smart sensor utilizing a digital data densifier and feedback controller to address at least some of the issues above. This disclosure further relates to pixel activation maps and compression techniques utilized by an application subsystem communicatively coupled to the smart sensor to address at least some of the issues above.

In some examples, an apparatus is provided. The apparatus includes an array of pixel cells configured to generate an array of voltages, each pixel cell of the array of pixel cells including one or more photodiodes configured to generate a charge in response to light, and a charge storage device to convert the charge to a voltage of an array of voltages. For example, the array of pixel cells may be configured to receive light through an array of apertures in the array of pixel cells. The light may cause the one or more photodiodes to generate a charge based on the composition of light received at one or more corresponding apertures of the array of pixel cells. Based on the charges generated by the photodiodes, one or more charge storage devices may convert the generated charges into one or more corresponding voltages. The resulting analog voltages may be stored and/or transmitted to a converter.

The apparatus further includes one or more analog-to-digital converters (ADC) configured the convert the array of analog voltages to first digital pixel data, the first digital pixel data comprising one or more first pixel values and one or more second pixel values. For example, the analog to digital converter utilizes one or more sense amplifier converters configured to quantize the analog voltage values into digital pixel values as part of the conversion. The digital pixel data may comprise the digital pixel values and the digital pixel values may be grouped into distinct groups based on the digital pixel values generated. In an illustrative embodiment, the first and second groups of digital pixel values may be grouped according to a threshold value, with all pixel values that are greater than or equal to the threshold value being grouped in the first group and all pixel values that are less than the threshold value are grouped in the second group. In other illustrative embodiments, the first group includes pixel values that are quantized (e.g., pixel values corresponding to pixel cells in the pixel array that are enabled at the time of a frame capture and are thus quantized based on the voltage captured by the pixel cells), and the second group includes pixel values that are not quantized (e.g. corresponding to pixel cells in the pixel array that are disabled/not quantized at the time of a frame capture). The pixel arrays described herein may include dynamically programmable pixel arrays as described in U.S. application Ser. No. 16/421,441, titled PROGRAMMABLE PIXEL ARRAY and U.S. application Ser. No. 16/716,050, titled DYNAMICALLY PROGRAMMABLE PIXEL ARRAY.

The apparatus further includes a processor/controller configured to perform operations using the digital pixel data generated by the ADC. The terms processor/controller are used interchangeably hereafter, and refer to a processing component capable of affecting operations performed on the apparatus. The process may be configured to receive the first digital pixel data from the ADC, determine, based on the one or more pixel values, one or more first pixel values and one or more second pixel values, generate second digital pixel data, the second digital pixel data comprising the one or more first pixel values and not the one or more second pixel values, and send, from the sensor apparatus to a separate receiving apparatus, the second digital pixel data. In some embodiments, generating the second digital pixel data comprises discarding all pixel values in the second pixel values to form the second digital pixel data. The process of generating second digital pixel data comprising first pixel values and not second pixel values may be referred to as densification due to the saturation of the second digital pixel data with only values included in the first pixel values. For example, the second digital pixel data may be "densified" with quantized first pixel values from the first digital pixel data by removing second pixel values that are not quantized and are represented by "null" values from the first digital pixel data. As described above, significant power is consumed when compiling and sending digital pixel data off-sensor. By densifying the second digital pixel data with only relevant data from the first pixel values, the important features of a digital image may be maintained while reducing the power require to export the image data off-sensor.

In some aspects, the processor is further configured to receive activation map data, the activation map data comprising an array of map values corresponding to the array of pixel cells; and process the activation map data to determine the array of map values. The activation map data representing a mapping of the pixel array that will affect the manner in the second digital pixel data is generated. For example, the activation map data may be processed to extract an array of map values, each map value of the map values corresponding to a pixel of the pixel array. Each map value corresponds to some aspect of a quantization/transformation of digital pixel values that may or may not be performed between the generation of the charge in response to light and the generation of the second digital pixel data. For example, the map values may be utilized to perform spare sensing operations, such as the operations described in U.S. application Ser. No. 16/983,863 titled ON-SENSOR PREDICTIVE SPARSE CAPTURE.

In some embodiments, the one or more charge storage devices convert the charge to the array of voltages based at least in part on the array of map values in the activation map data. For example, the pixel array or ADC may quantize analog voltage values based on the activation map to generate pixel values that will be used to generate the densified digital pixel data. In some embodiments, the array of pixel cells is configured to temporarily cease functions of charge generation or voltage conversion of one or more pixels cells based on corresponding map values in the array of map values. For example, the array of map values may include various values of "1" corresponding to pixel cells that will be enabled for the capture of a frame, and various values of "0" corresponding to pixel cells that will not be enabled for the capture of a frame.

In some embodiments, the one or more ADC convert the array of voltages to first digital pixel data based at least in part on the array of map values. For example, the ADC may be configured to quantize only voltages of the array of voltages corresponding to certain corresponding map values of the array of map values. In some embodiments, the conversion of voltages to digital pixel data may be caused based at least in part on the array of map values, the array of map values acting as a transformation array to affect the final digital pixel values converted and included in the second digital pixel data. For example, the map values may determine the null values that are discarded from the first digital pixel data to densify the second digital pixel data.

In further aspects, the processor generates the second digital pixel data based at least in part on the array of map values. For example the map values of the array of map values may comprise binary values corresponding to an indication of whether to include a particular pixel value in the first or second groups of pixel values. Thus, the activation map provides an indication of how to "densify" the first pixel data by including only first pixel values in the second digital pixel data corresponding to a first binary indicator present in corresponding map values (e.g., "1") and not including second pixel values in the second digital pixel data corresponding to a second binary indicator present in corresponding map values (e.g. "0").

In some embodiments, the sensor apparatus is communicatively coupled to a separate receiving apparatus including an application system. The application system may communicate with the sensor apparatus to affect the generation of the second digital pixel data. For example, the application system may send, over a network channel shared by the sensor apparatus, an indication to generate second digital pixel data to be sent to the application system. The indication may include data for affecting the generation of the second digital pixel data, such as an activation map. The sensor apparatus may receive the indication and the application map and generate the charges at the array of pixel cells in response to receiving the indication. Once the second digital pixel data is generated using the activation map, the second digital pixel data comprising the densified digital pixel data is sent to the application system.

In some further aspects, the activation map data is a compressed representation of the activation map. Sending an uncompressed activation map to the sensor apparatus may be consume a disproportionate amount of power, because the activation map may include values corresponding to each pixel cell of the array of pixel cells. Thus, the application system may be configured to compress the activation map based on one or more compression schemes to form a map "descriptor". The descriptor is a set of data representing a compressed representation of an activation map that may be utilized by the smart sensor as described herein. In some embodiments, the descriptor describes a compressed activation map using bitmap data. In some other embodiments, the descriptor described a compressed activation map using coordinate data. The sensor apparatus may receive the compressed activation map as activation map data. The activation map data may include the descriptor representing the compressed activation map, which the sensor apparatus may utilize to determine the map values of the activation map.

In some aspects, the application system may utilize a generating model to determine an activation map and compress the activation map. The generative model or a similar data structure may be utilized to select and compress an activation map based on some input received or generated by the application system. For example, the generative model may have been previously trained by a machine-learning model to select or generate a descriptor based on input pixel data (e.g. digital pixel data from a previously received digital image). For example, the generative model may be trained by a machine learning model to select one or more descriptors to compress an activation map into activation map data. The descriptors may be compressed data corresponding to pixel cell configurations that describe, in a higher order, the activation map. More information regarding descriptors will be given below. The generative model may receive, as input, some aspect of a frame, image, feature, or indication and select a descriptor to represent the compressed activation map.

In some aspects, the activation map data represents a combined activation map generated from one or more activation maps/activation mapping algorithms (e.g. a first activation map and a second activation map). The combined activation map may be generated, for example, by the generative model of the application system based at least in part on a first activation map selected by the generative model and further modified by a second activation map algorithm that builds on the first activation map. For example, a first activation map may be a region of interest (ROI) map describing one or more localized regions of interest within the array of pixel cells. The second activation map may be a subsampling algorithm describing a proportional subsampling of pixel cells within the first descriptor areas (i.e., the ROIs). These first and second activation maps/algorithms may be combined to form a combined activation map. A compression algorithm may then be applied to the combined activation map to form a descriptor for the activation map that will be sent to the smart sensor. It will be appreciated that any combination of compression descriptors may be used and that the generative model may select those combinations based on inputs provided to the generative model. The descriptor may thus convey complex activation map data to the smart sensor without requiring the entirely of the activation map to be sent, thereby saving valuable power and resources.

In some aspects, the application system is configured to process the second digital pixel data to extract one or more image features from the second digital pixel data. For example, the application system may process the second digital image data received from the sensor apparatus to extract one or more features to be used in a downstream application process. For example, the application system may process digital image data received from the sensor apparatus, determine one or more features (e.g., objects, environments, shapes, etc.) predicted within the digital image, and the predictions may be used by the application system or another system. Examples of feature extraction components include, for example, convolutional neural network (CNN) machine learning models.

In some aspects, the data exchanged between the application system and the sensor apparatus may be serialized prior to sending the data. For example, the compressed representation of the activation map may be serialized (e.g., placed is a sequenced stream of data to is more easily received and parsed by another system) prior to sending the data. The sensor apparatus may then de-serialize the compressed representation of the activation map prior to decompressing the activation map for use in generating the second digital pixel data.

In some aspects, the one or more photodiodes are configured to generate the charge in response to receiving a control signal indicating to generate the charge. For example, the one or more photodiodes of the array of pixel cells may be configured to generate the charges in response to light when the photodiodes receive a control signal to being generating the charge. The control signal may be a binary signal (e.g., a "1" indicating to begin generating the charges, or a "0" indicating standby) or may be a more complex signal (e.g., a floating point variable indicating a rate at which the photodiodes shall generate charges). In some further aspects, the processor is further configured to send, to the array of pixel cells and in response to sending the second digital pixel data to the separate receiving apparatus, the control signal indicating to generate the charge.

The processor is configured to generate the control signal based on the rate of export of densified digital image data off-sensor. For example, the processor may generate control signals representing the processor's effective rate of densifying the first digital image data to generate second digital image data and exporting the second digital image data off-sensor. Thus, the controller may use control signals to cause the array of pixel cells to generate charges or standby depending on the densification functions described herein. As described above, a significant amount of power is used to generate analog voltage values. If a densifier module is acting as a bottleneck in the export of digital image data (e.g., the array of pixel cells is generating analog voltage arrays faster than an ADC and densifier can convert the voltages to second image data and export the image data), then the densifier may use the control signal to temporarily halt generation of the array of voltages. This will cause the array of pixel cells to cease using power to generate excess voltage values that would otherwise be caught in the densification bottleneck. Thus the control signal prevents inefficient usage of power that would otherwise occur during a data bottleneck.

In some examples, a method includes the processes described above with respect to the application system and the sensor apparatus. The disclosed techniques may include or be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of an embodiment of a near-eye display 100. Near-eye display 100 presents media to a user. Examples of media presented by near-eye display 100 include one or more images, video, and/or audio. In some embodiments, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some embodiments, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some embodiments, display 110 includes a waveguide display assembly for directing light from one or more images to an eye of the user.

Near-eye display 100 further includes image sensors 120a, 120b, 120c, and 120d. Each of image sensors 120a, 120b, 120c, and 120d may include a pixel array configured to generate image data representing different fields of views along different directions. For example, sensors 120a and 120b may be configured to provide image data representing two fields of view towards a direction A along the Z axis, whereas sensor 120c may be configured to provide image data representing a field of view towards a direction B along the X axis, and sensor 120d may be configured to provide image data representing a field of view towards a direction C along the X axis.

In some embodiments, sensors 120a-120d can be configured as input devices to control or influence the display content of the near-eye display 100, to provide an interactive VR/AR/MR experience to a user who wears near-eye display 100. For example, sensors 120a-120d can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some embodiments, the location tracking system may operate a SLAM algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of views, sensors 120a-120d can provide the location tracking system a more holistic view of the physical environment, which can lead to more objects to be included in the construction and updating of the map. With such an arrangement, the accuracy and robustness of tracking a location of the user within the physical environment can be improved.

In some embodiments, near-eye display 100 may further include one or more active illuminators 130 to project light into the physical environment. The light projected can be associated with different frequency spectrums (e.g., visible light, infrared light, ultraviolet light), and can serve various purposes. For example, illuminator 130 may project light in a dark environment (or in an environment with low intensity of infrared light, ultraviolet light, etc.) to assist sensors 120a-120d in capturing images of different objects within the dark environment to, for example, enable location tracking of the user. Illuminator 130 may project certain markers onto the objects within the environment, to assist the location tracking system in identifying the objects for map construction/updating.

In some embodiments, illuminator 130 may also enable stereoscopic imaging. For example, one or more of sensors 120a or 120b can include both a first pixel array for visible light sensing and a second pixel array for infrared (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array, and generate a stereoscopic image of the object based on the distances. Based on the stereoscopic image of the object, the system can determine, for example, a relative position of the object with respect to the user, and can update the image data provided to display 100 based on the relative position information to provide the interactive experience.

As discussed above, near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

Figure 1B:
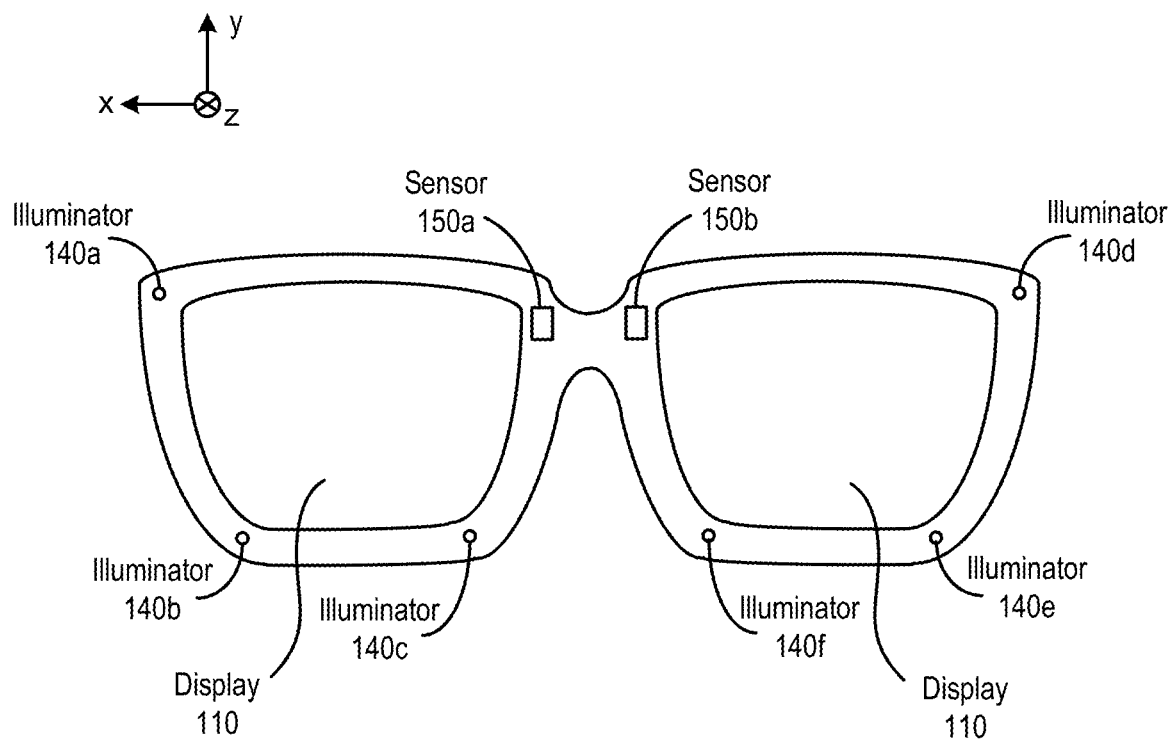
Figure 1B:
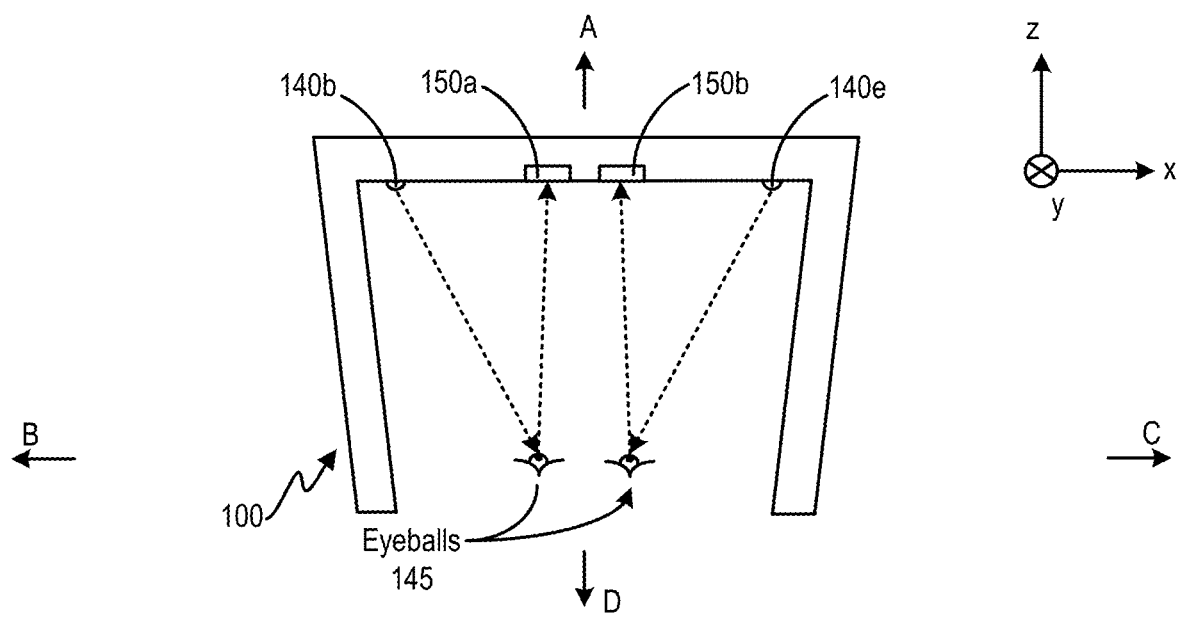

FIG. 1B is a diagram of another embodiment of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., NIR) towards direction D (which is opposite to direction A of FIG. 1A). The emitted light may be associated with a certain pattern, and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user, and may be received by sensor 150b. Sensor 150b may also include a pixel array to generate an image of the reflected pattern. Based on the images of the reflected pattern from sensors 150a and 150b, the system can determine a gaze point of the user, and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b include the same sensor devices as image sensors 120a-120d of FIG. 1A, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the sensor outputs into digital values for image generation. Moreover, as discussed above, the image sensors also need to be able to operate at an environment with low light intensity.

Figure 2:
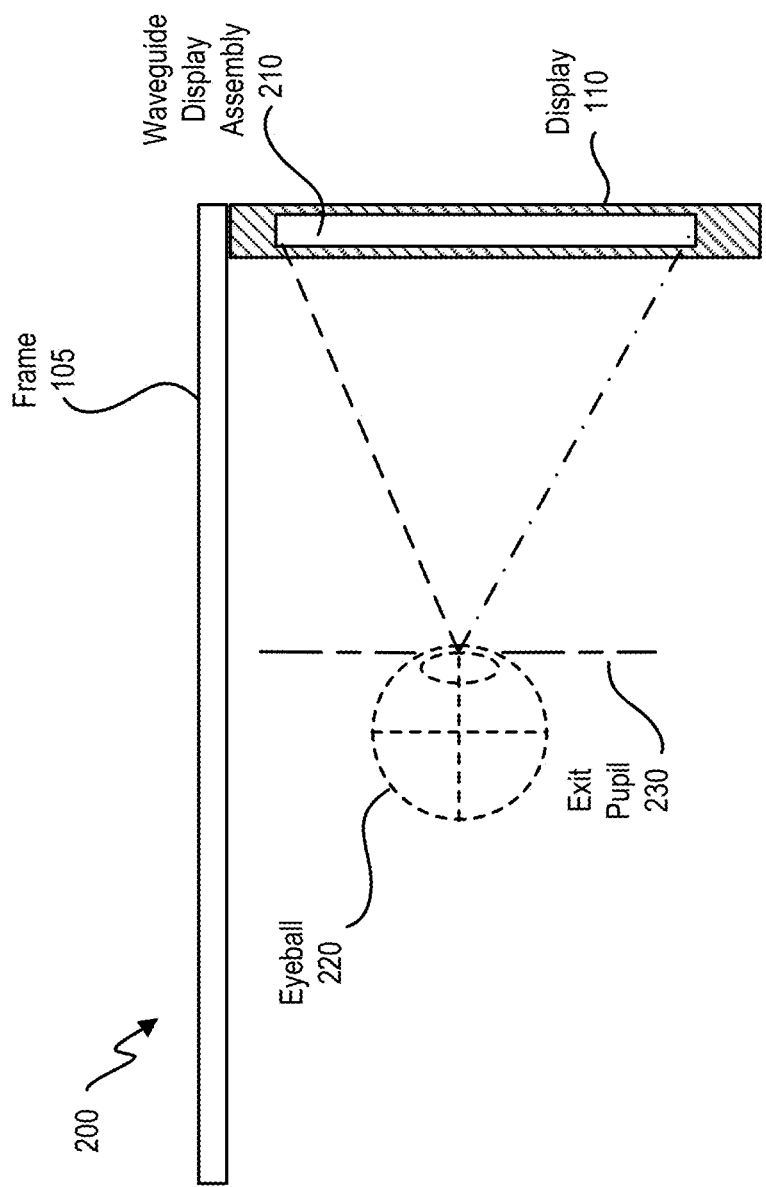
FIG. 2 is an embodiment of a cross section of the near-eye display.

FIG. 2 is an embodiment of a cross section 200 of near-eye display 100 illustrated in FIG. 1. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass) with one or more refractive indices. In some embodiments, near-eye display 100 includes one or more optical elements between waveguide display assembly 210 and eyeball 220.

In some embodiments, waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate embodiments, waveguide display assembly 210 may include the stacked waveguide display and the varifocal waveguide display.

Figure 3:
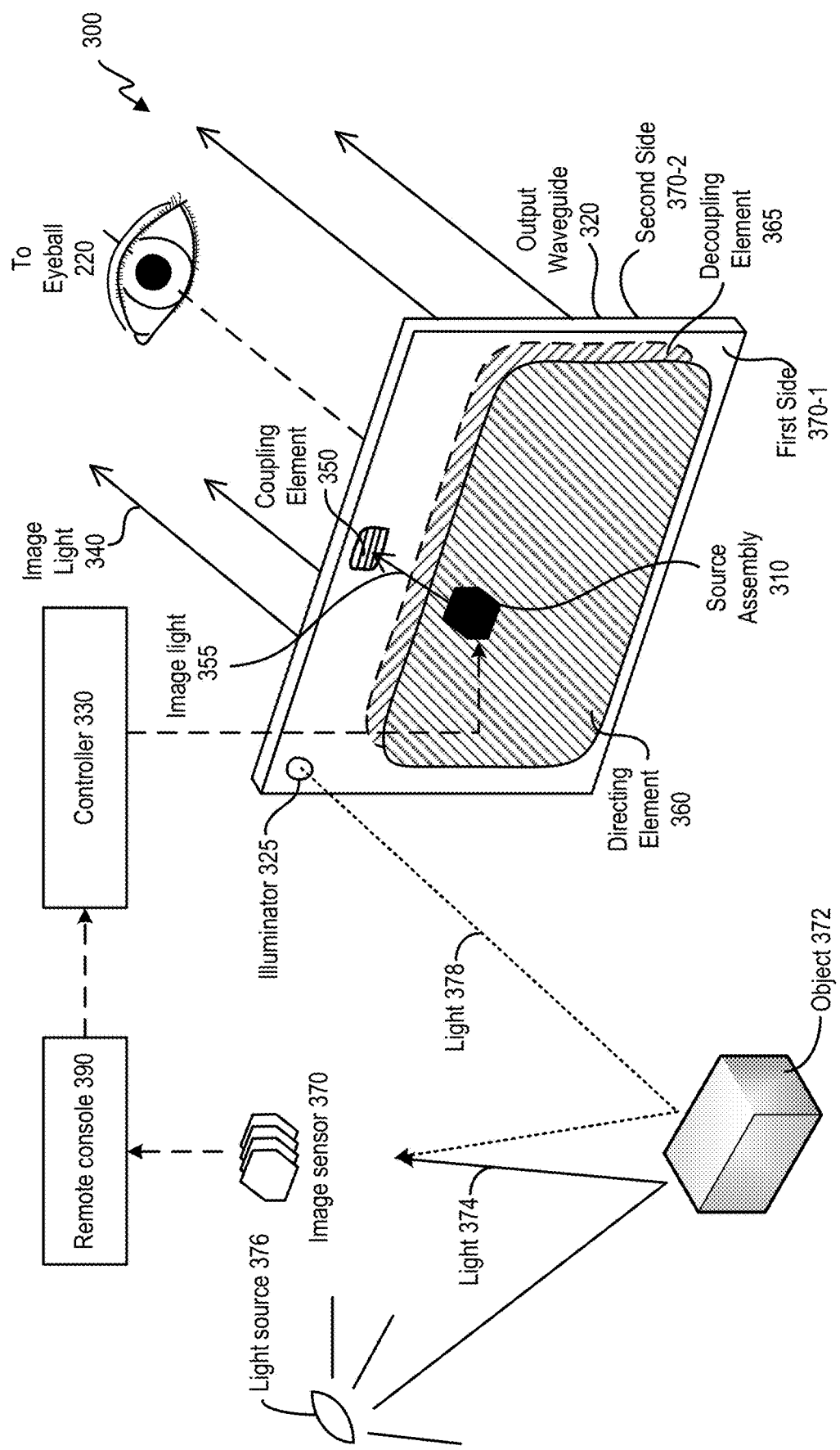
FIG. 3 illustrates an isometric view of an embodiment of a waveguide display with a single source assembly.

FIG. 3 illustrates an isometric view of an embodiment of a waveguide display 300. In some embodiments, waveguide display 300 is a component (e.g., waveguide display assembly 210) of near-eye display 100. In some embodiments, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some embodiments, another waveguide display separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some embodiments, coupling element 350 couples the image light 355 from source assembly 310 into output waveguide 320. Coupling element 350 may be, for example, a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, for example, a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of, for example, silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some embodiments, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A to generate image data of a physical environment in front of the user (e.g., for location determination). Image sensor 370 may also be located on second side 370-2 and may include image sensors 150a and 150b of FIG. 1B to generate image data of eyeball 220 (e.g., for gaze point determination) of the user. Image sensor 370 may interface with a remote console that is not located within waveguide display 300. Image sensor 370 may provide image data to the remote console, which may determine, for example, a location of the user or a gaze point of the user, and determine the content of the images to be displayed to the user. The remote console can transmit instructions to controller 330 related to the determined content. Based on the instructions, controller 330 can control the generation and outputting of image light 355 by source assembly 310.

Figure 4:
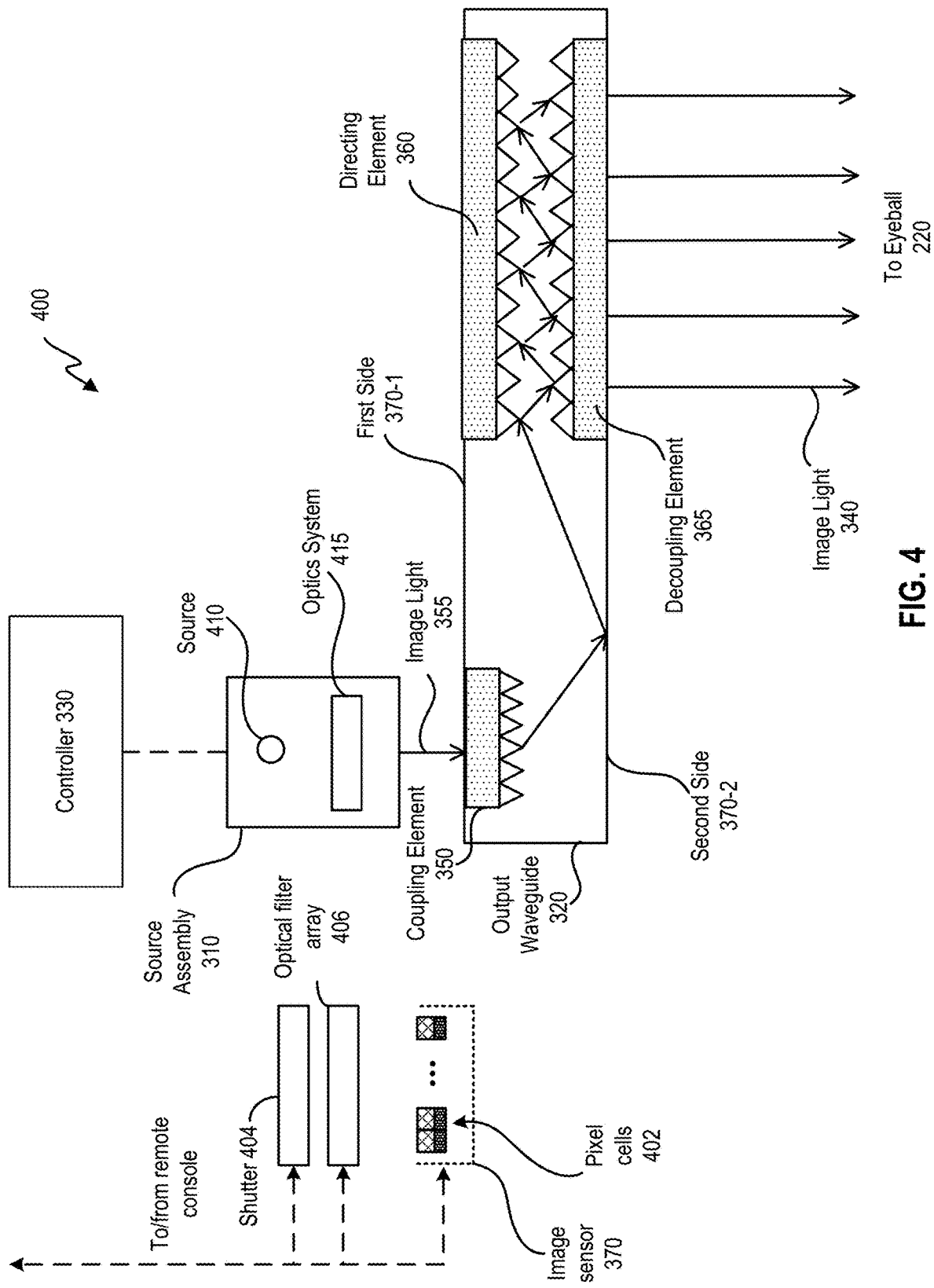
FIG. 4 illustrates a cross section of an embodiment of the waveguide display.

FIG. 4 illustrates an embodiment of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some embodiments, there can be a mechanical shutter 404 interposed between the set of pixel cells 402 and the physical environment to control the exposure of the set of pixel cells 402. In some embodiments, the mechanical shutter 404 can be replaced by an electronic shutter switch, as to be discussed below. Each of pixel cells 402 may correspond to one pixel of the image. Although not shown in FIG. 4, it is understood that each of pixel cells 402 may also be overlaid with a filter to control the frequency range of the light to be sensed by the pixel cells.

After receiving instructions from the remote console, mechanical shutter 404 can open and expose the set of pixel cells 402 in an exposure period. During the exposure period, image sensor 370 can obtain samples of lights incident on the set of pixel cells 402, and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, for example, a laser diode, a vertical cavity surface emitting laser, and/or a light emitting diode.

Optics system 415 includes one or more optical components that condition the light from source 410. Conditioning light from source 410 may include, for example, expanding, collimating, and/or adjusting orientation in accordance with instructions from controller 330. The one or more optical components may include one or more lenses, liquid lenses, mirrors, apertures, and/or gratings. In some embodiments, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In embodiments where coupling element 350 is a diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In embodiments where directing element 360 is a diffraction grating, the pitch of the diffraction grating is chosen to cause incident image light 355 to exit output waveguide 320 at angle(s) of inclination relative to a surface of decoupling element 365.

In some embodiments, directing element 360 and/or decoupling element 365 are structurally similar. Expanded image light 340 exiting output waveguide 320 is expanded along one or more dimensions (e.g., may be elongated along x-dimension). In some embodiments, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
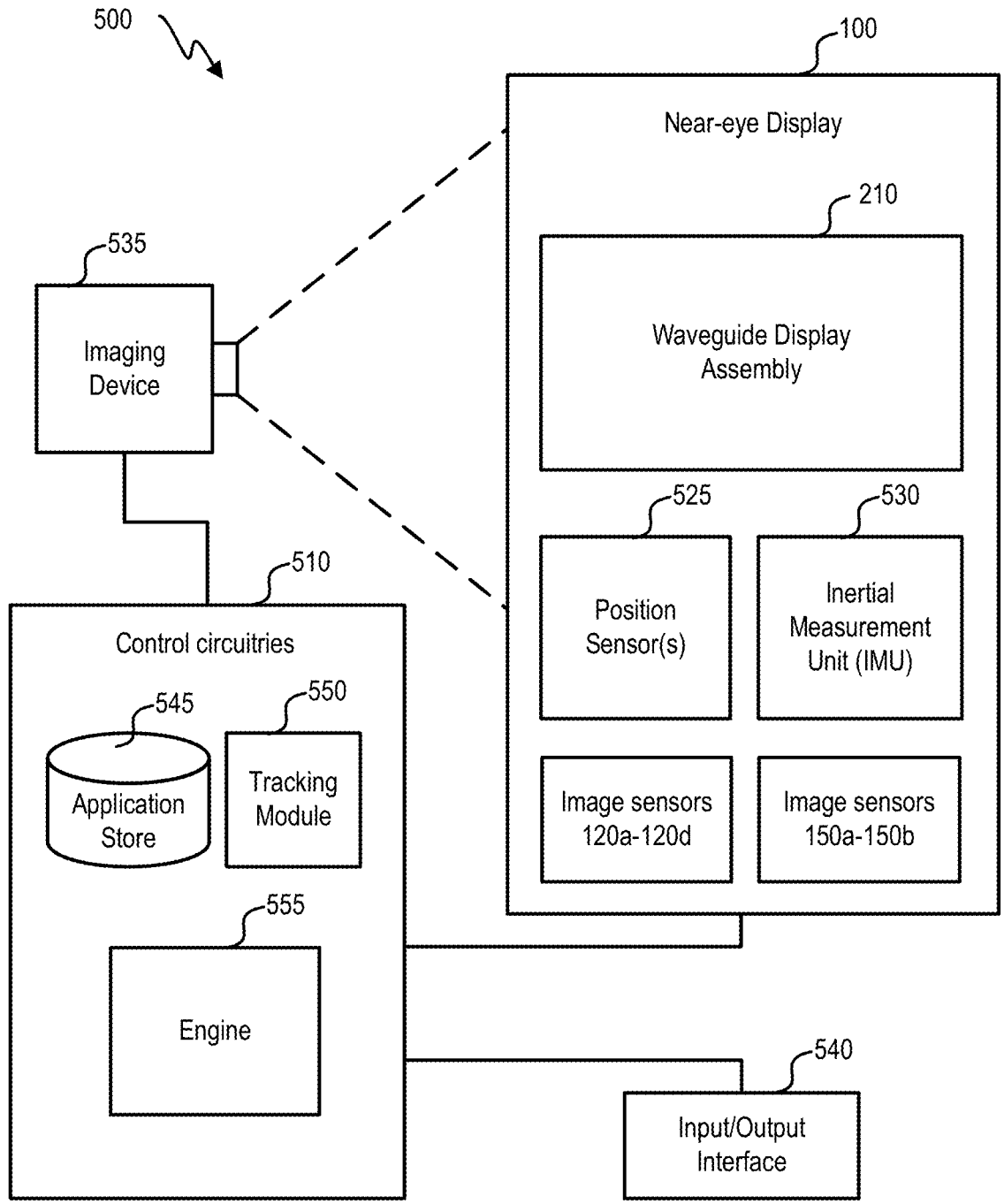
FIG. 5 is a block diagram of an embodiment of a system including the near-eye display.

FIG. 5 is a block diagram of an embodiment of a system 500 including the near-eye display 100. The system 500 includes near-eye display 100, an imaging device 535, an input/output interface 540, and image sensors 120a-120d and 150a-150b that are each coupled to control circuitries 510. System 500 can be configured as a head-mounted device, a wearable device, etc.

Near-eye display 100 is a display that presents media to a user. Examples of media presented by the near-eye display 100 include one or more images, video, and/or audio. In some embodiments, audio is presented via an external device (e.g., speakers and/or headphones) that receives audio information from near-eye display 100 and/or control circuitries 510 and presents audio data based on the audio information to a user. In some embodiments, near-eye display 100 may also act as an AR eyewear glass. In some embodiments, near-eye display 100 augments views of a physical, real-world environment, with computer-generated elements (e.g., images, video, sound).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120a-120d of FIG. 1A for generating image data of a physical environment in which the user is located, for performing location tracking of the user. Imaging device 535 may further include, for example, image sensors 150a-150b of FIG. 1B for generating image data for determining a gaze point of the user, to identify an object of interest of the user.

The input/output interface 540 is a device that allows a user to send action requests to the control circuitries 510. An action request is a request to perform a particular action. For example, an action request may be to start or end an application or to perform a particular action within the application.

Control circuitries 510 provide media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions, that, when executed by a processor, generates content for presentation to the user. Examples of applications include: gaming applications, conferencing applications, video playback applications, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some embodiments, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), or a gaze point of the user (e.g., based on image data provided by imaging device 535), a distance between an object and user (e.g., based on image data provided by imaging device 535).

Figure 6A:
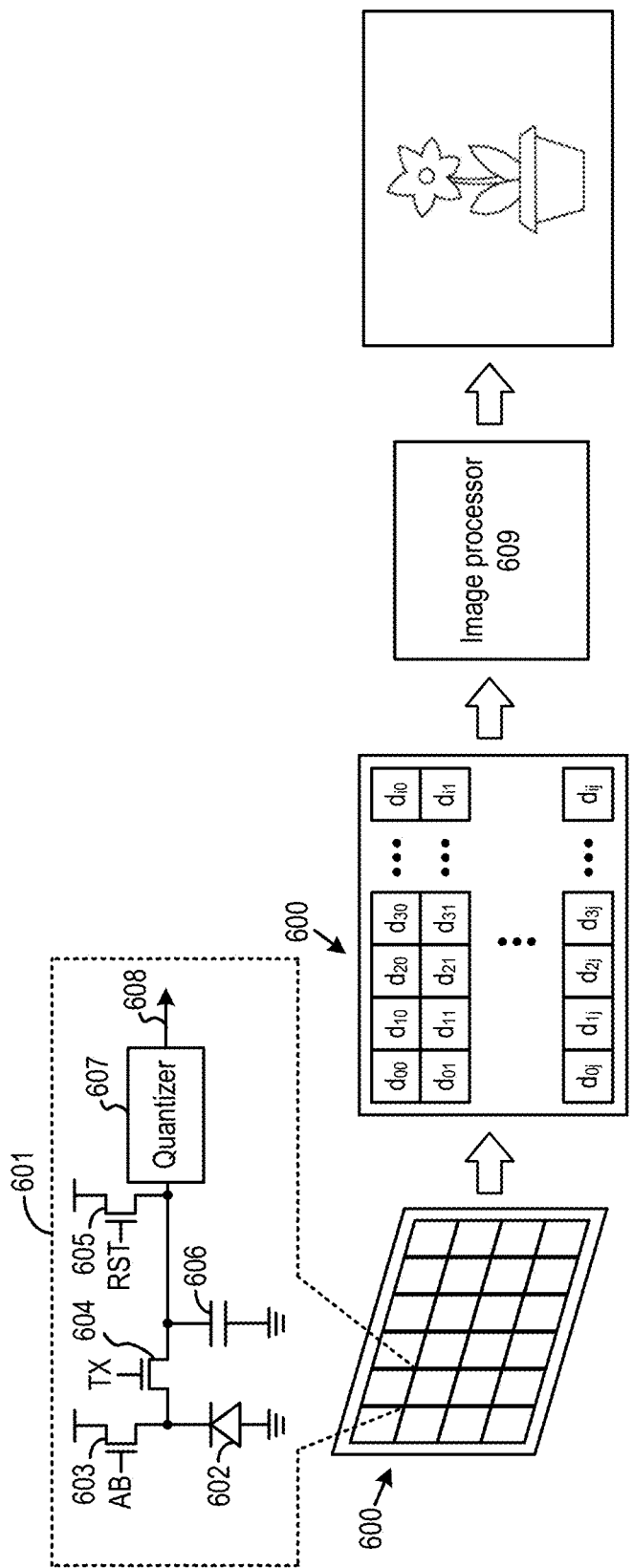
FIG. 6A, FIG. 6B, FIG. 6C, FIG. 6D, FIG. 6E, FIG. 6F, and FIG. 6G illustrate examples of an image sensor and its operations.
Figure 6B:
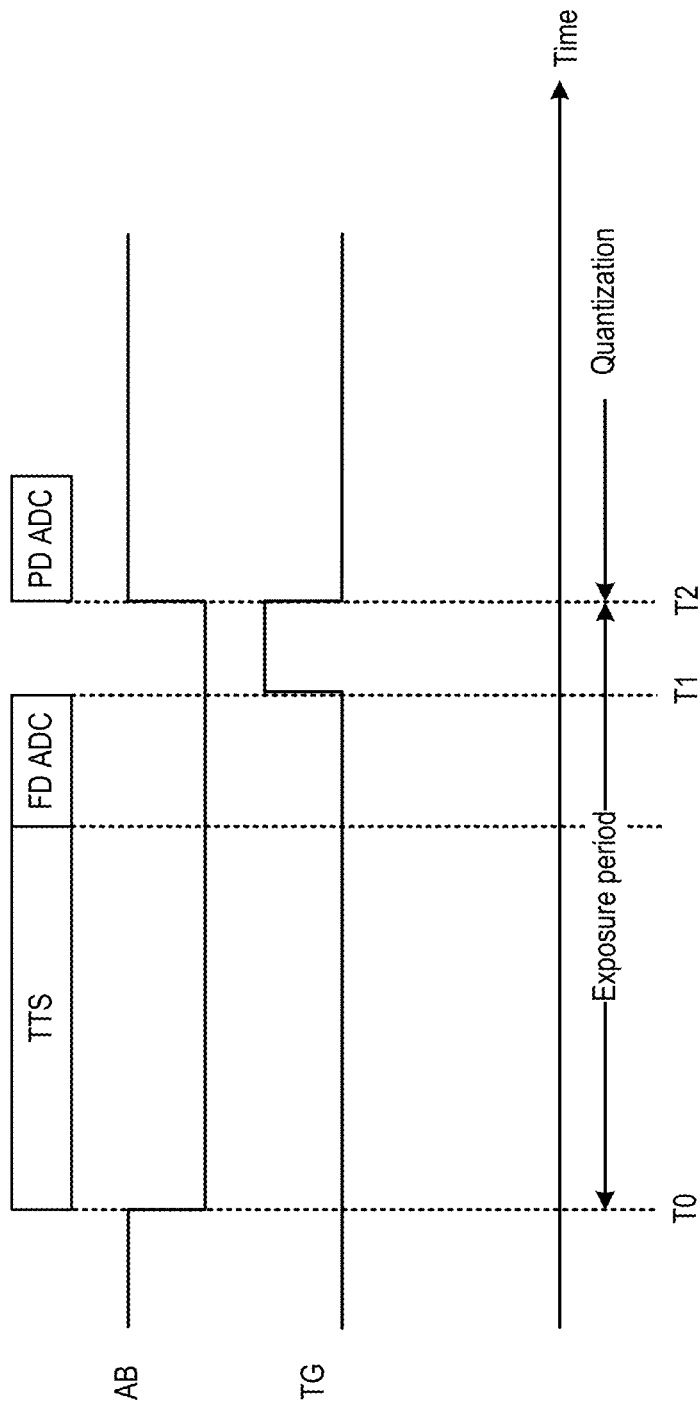

FIG. 6A, FIG. 6B, FIG. 6C, FIG. 6D, FIG. 6E, FIG. 6F, and FIG. 6G illustrate examples of an image sensor 600 and its operations. As shown in FIG. 6A, image sensor 600 can include an array of pixel cells, including pixel cell 601, and can generate digital intensity data corresponding to pixels of an image. Pixel cell 601 may be part of pixel cells 402 of FIG. 4. As shown in FIG. 6A, pixel cell 601 may include one or more photodiodes 602, an electronic shutter switch 603, a transfer switch 604, a reset switch 605, a charge storage device 606, and a quantizer 607. Quantizer 607 can be a pixel-level ADC that is accessible only by pixel cell 601. Photodiode 602 may include, for example, a P-N diode, a P-I-N diode, or a pinned diode, whereas charge storage device 606 can be a floating diffusion node of transfer switch 604. Photodiode 602 can generate and accumulate charge upon receiving light within an exposure period, and the quantity of charge generated within the exposure period can be proportional to the intensity of the light.

The exposure period can be defined based on the timing of AB signal controlling electronic shutter switch 603, which can steer the charge generated by photodiode 602 away when enabled, and based on the timing of the TX signal controlling transfer switch 604, which can transfer the charge generated by photodiode 602 to charge storage device 606 when enabled. For example, referring to FIG. 6B, the AB signal can be de-asserted at time T0 to allow photodiode 602 to generate charge and accumulate at least some of the charge as residual charge until photodiode 602 saturates. T0 can mark the start of the exposure period. The TX signal can set transfer switch 604 at a partially-on state to transfer additional charge (e.g., overflow charge) generated by photodiode 602 after saturation to charge storage device 606. At time T1, the TG signal can be asserted to transfer the residual charge to charge storage device 606, so that charge storage device 606 can store all of the charge generated by photodiode 602 since the beginning of the exposure period at time T0.

At the time T2, the TX signal can be de-asserted to isolate charge storage device 606 from photodiode 602, whereas the AB signal can be asserted to steer charge generated by photodiode 602 away. The time T2 can mark the end of the exposure period. An analog voltage across charge storage device 606 at time T2 can represent the total quantity of charge stored in charge storage device 606, which can correspond to the total quantity of charge generated by photodiode 602 within the exposure period. Both TX and AB signals can be generated by a controller (not shown in FIG. 6A) which can be part of pixel cell 601. After the analog voltage is quantized, reset switch 605 can be enabled by an RST signal to remove the charge in charge storage device 606 to prepare for the next measurement.

Figure 6C:
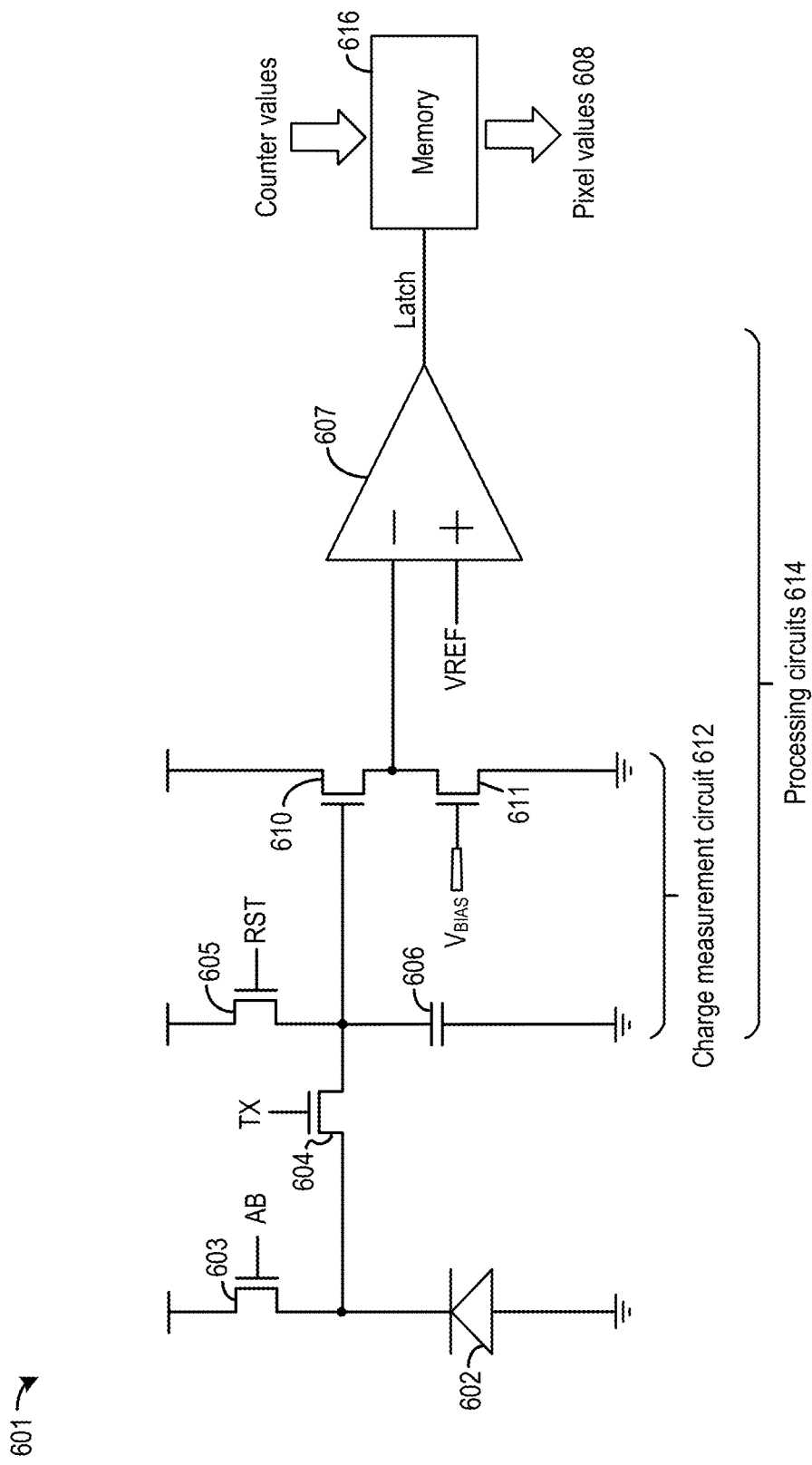

FIG. 6C illustrates additional components of pixel cell 601. As shown in FIG. 6C, pixel cell 601 can include a source follower 610 that can buffer the voltage at charge storage device 606, and output the voltage to quantizer 607. Charge storage device 606 and source follower 610 can form a charge measurement circuit 612. Source follower 610 can include a current source 611 controlled by a bias voltage VBIAS, which sets the current that flows through source follower 610. Quantizer 607 can include a comparator. Charge measurement circuit 612 and quantizer 607 together can form a processing circuits 614. The comparator is further coupled with a memory 616 to store a quantization output as pixel value 608. Memory 616 can include a bank of memory devices, such as static random-access memory (SRAM) devices, with each memory device configured as a bit cell. The number of memory devices in the bank can be based on a resolution of the quantization output. For example, if the quantization output has a 10-bit resolution, memory 616 can include a bank of ten SRAM bit cells. In a case where pixel cell 601 includes multiple photodiodes to detect light of different wavelength channels, memory 616 may include multiple banks of SRAM bit cells.

Figure 6D:
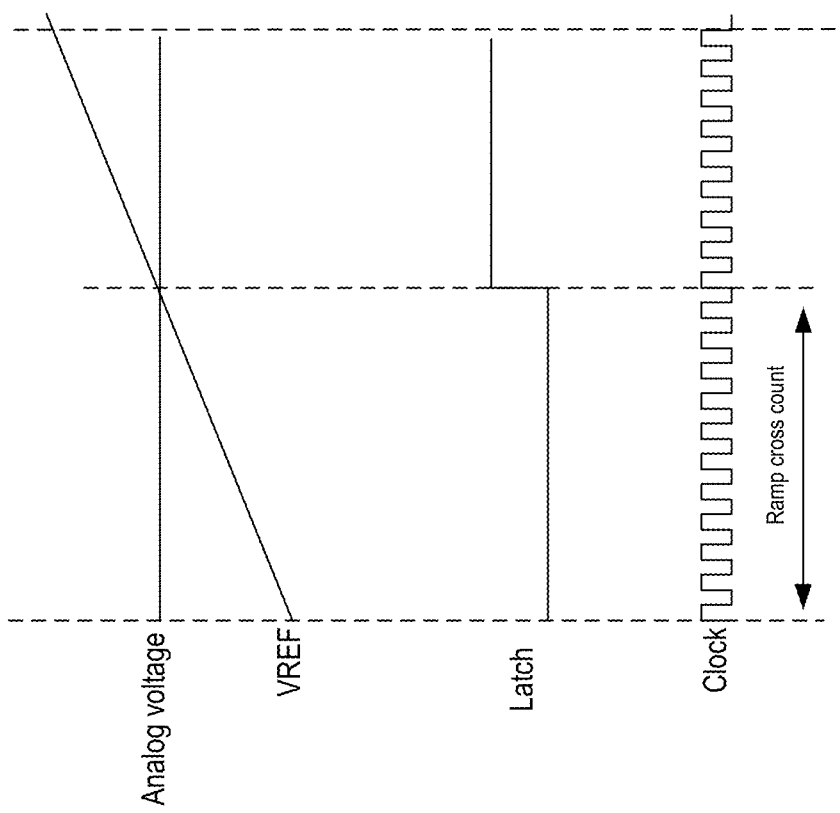

Quantizer 607 can be controlled by the controller to quantize the analog voltage after time T2 to generate a pixel value 608. FIG. 6D illustrates an example quantization operation performed by quantizer 607. As shown in FIG. 6D, quantizer 607 can compare the analog voltage output by source follower 610 with a ramping reference voltage (labelled "VREF" in FIG. 6C and FIG. 6D) to generate a comparison decision (labelled "Latch" in FIG. 6C and FIG. 6D). The time it takes for the decision to trip can be measured by a counter to represent a result of quantization of the analog voltage. In some examples, the time can be measured by a free-running counter that starts counting when the ramping reference voltage is at the start point. The free-running counter can periodically updates its count value based on a clock signal (labelled "clock" in FIG. 6D) and as the ramping reference voltage ramps up (or down). The comparator output trips when the ramping reference voltage meets the analog voltage. The tripping of the comparator output can cause a count value to be stored in memory 616. The count value can represent a quantization output of the analog voltage. Referring back to FIG. 6C, the count value stored in memory 616 can be read out as pixel value 608.

In FIG. 6A and FIG. 6C, pixel cell 601 is illustrated as including processing circuits 614 (including charge measurement circuit 612 and quantizer 607) and memory 616. In some examples, processing circuits 614 and memory 616 can be external to pixel cell 601. For example, a block of pixel cells can share and take turn in accessing processing circuits 614 and memory 616 to quantize the charge generated by the photodiode(s) of each pixel cell and to store the quantization result.

Figure 6E:
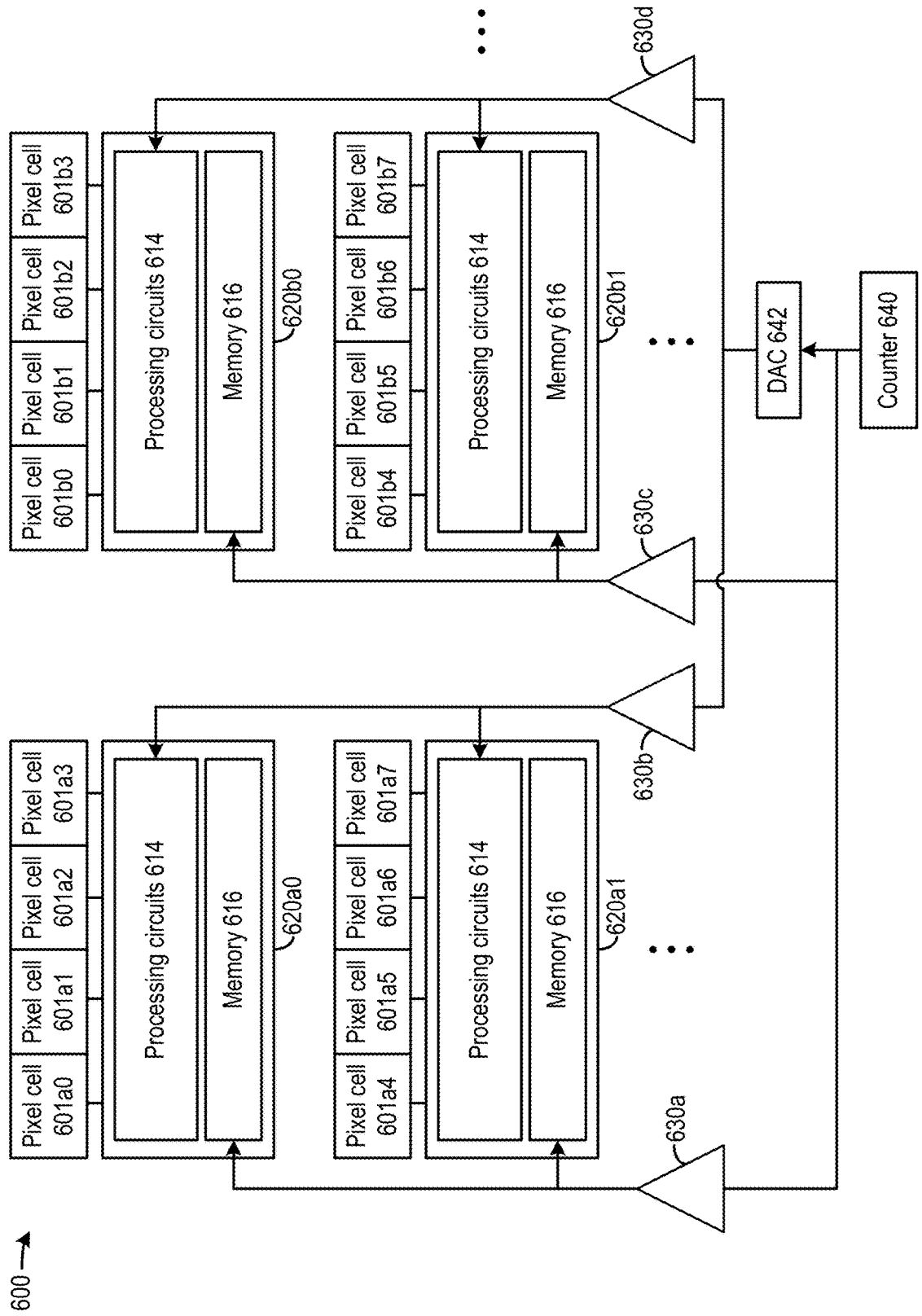
Figure 6F:
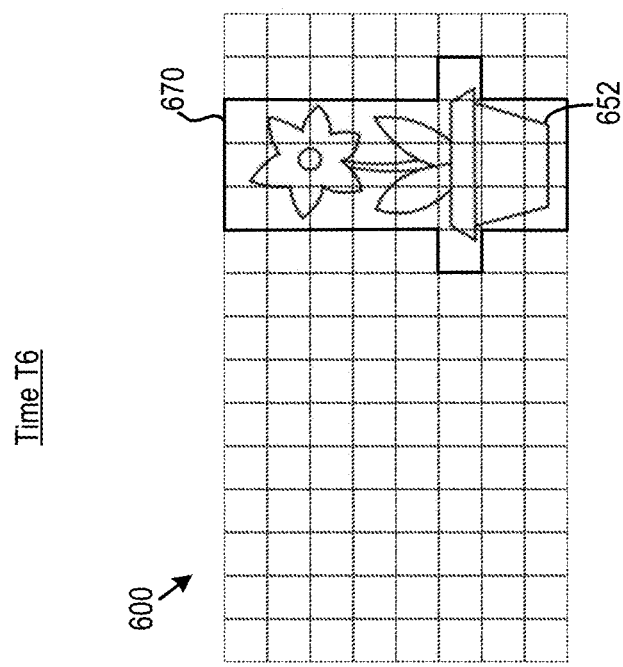
Figure 6F:
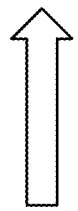
Figure 6F:
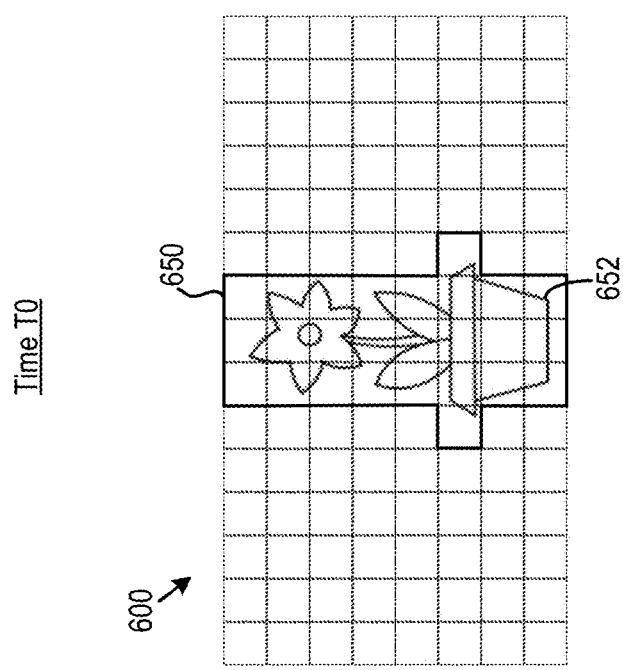
Figure 6G:
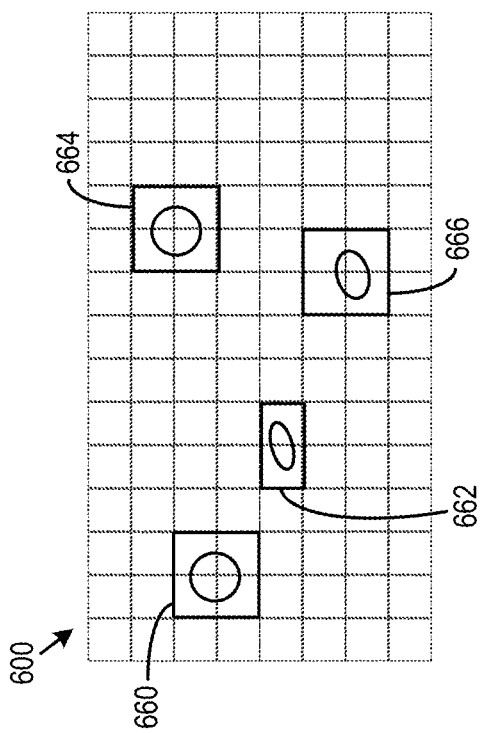
Figure 6G:
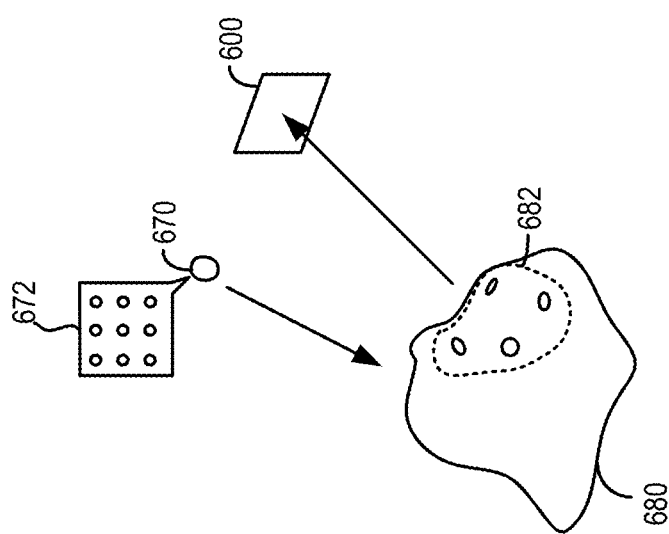

FIG. 6E illustrates additional components of image sensor 600. As shown in FIG. 6E, image sensor 600 includes pixel cells 601 arranged in rows and columns, such as pixel cells 601$a$0-$a$3, 601$a$4-$a$7, 601$b$0-$b$3, or 601$b$4-$b$7. Each pixel cell may include one or more photodiodes 602. Image sensor 600 further includes quantization circuits 620 (e.g., quantization circuit 620$a$0, $a$1, $b$0, $b$1) comprising processing circuits 614 (e.g., charge measurement circuit 612 and comparator/quantizer 607) and memory 616. In the example of FIG. 6E, a block of four pixel cells may share a block-level quantization circuit 620, which can include a block-level ADC (e.g., comparator/quantizer 607) and a block-level memory 616 via a multiplexor (not shown in FIG. 6E), where each pixel cell takes turn in accessing quantization circuit 620 to quantize the charge. For example, pixel cells 601$a$0-$a$3 share quantization circuit 620$a$0, pixel cells 601$a$4-$a$7 share quantization circuit 621$a$1, pixel cells 601$b$0-$b$3 share quantization circuit 620$b$0, whereas pixel cells 601$b$4-$b$7 share quantization circuit 620$b$1. In some examples, each pixel cell may include or has its dedicated quantization circuit.

In addition, image sensor 600 further includes other circuits, such as a counter 640 and a digital-to-analog converter (DAC) 642. Counter 640 can be configured as a digital ramp circuit to supply count values to memory 616. The count values can also be supplied to DAC 642 to generate an analog ramp, such as VREF of FIG. 6C and FIG. 6D, which can be supplied to quantizer 607 to perform the quantization operation. Image sensor 600 further includes a buffer network 630 including buffers 630$a$, 630$b$, 630$c$, 630$d$, etc. to distribute the digital ramp signals representing the counter values, and the analog ramp signal, to processing circuits 614 of different blocks of pixel cells, such that at any given time each processing circuit 614 receives the same analog ramp voltage and the same digital ramp counter value. This is to ensure that any difference in the digital values output by different pixel cells is due to differences in the intensity of light received by the pixel cells, not due to mismatches in the digital ramp signals/counter values and analog ramp signals received by the pixel cells.

The image data from image sensor 600 can be transmitted to host processor (not shown in FIG. 6A-FIG. 6E) to support different applications, such as identifying and tracking object 652 or performing depth sensing of object 652 with respect to image sensor 600. For all these applications, only a subset of pixel cells provide relevant information (e.g., pixel data of object 652), whereas the rest of pixel cells do not provide relevant information. For example, referring to FIG. 6F, at time T0 a group of pixel cells 650 of image sensor 600 receive light reflected by object 652, whereas time T6, object 652 may have shifted (e.g., due to a movement of object 652, a movement of image sensor 600, or both), and a group of pixel cells 670 of image sensor 600 receive light reflected by object 652. At both times T0 and T6, image sensor 600 can transmit only the pixel data from group of pixel cells 660 and 670, as a sparse image frame, to the host processor to reduce the volume of pixel data being transmitted. Such arrangements can allow transmission of higher resolution images at a higher frame rate. For example, a larger pixel cell array including more pixel cells can be used to image object 652 to improve image resolution, while the bandwidth and power required to provide the improved image resolution can be reduced when only a subset of the pixel cells, including the pixel cells that provide pixel data of object 652, transmit the pixel data to the host processor. Similarly, image sensor 600 can be operated to generate images at a higher frame rate, but the increases in bandwidth and power can be reduced when each image only includes pixel values output by the subset of the pixel cells. Similar techniques can be employed by image sensor 600 in the case of 3D sensing.

The volume of pixel data transmission can also be reduced in the case of 3D sensing. For example, referring to FIG. 6G, an illuminator 670 can project a pattern 672 of structured light onto an object 680. The structured light can be reflected on a surface of an object 680, and a pattern of reflected light can be captured by image sensor 600 to generate an image. Host processor can match pattern 672 with object pattern 682 and determine the depth of object 680 with respect to image sensor 600 based on the configuration of object pattern 682 in the image. For 3D sensing, only groups of pixel cells 660, 662, 664, and 666 contain relevant information (e.g., pixel data of pattern 652). To reduce the volume of pixel data being transmitted, image sensor 600 can be configured to send only the pixel data from groups of pixel cells 660, 662, 664, and 666, or the image location locations of pattern 682 in the image, to the host processor.

Figure 7A:
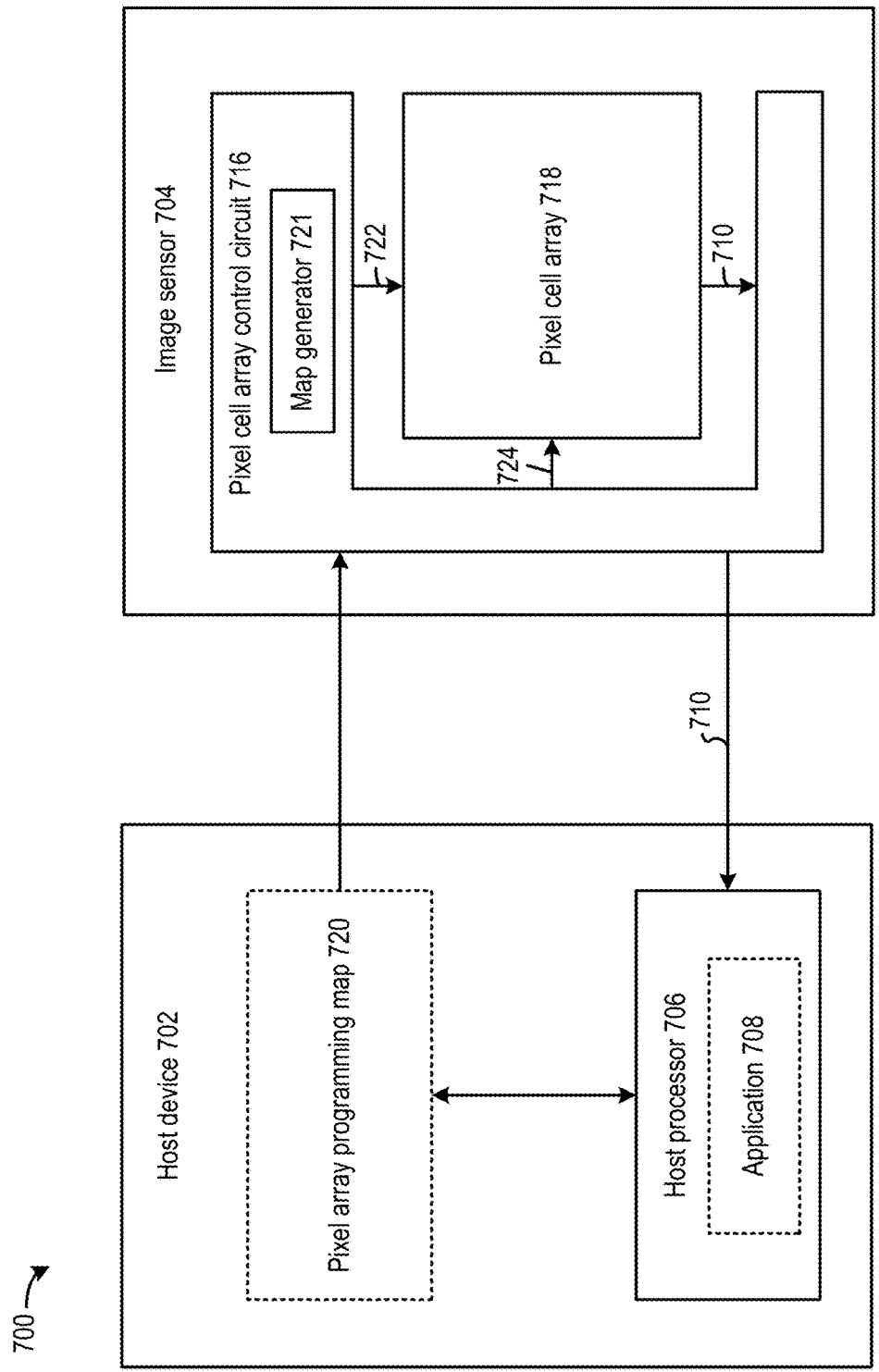
Figure 7B:
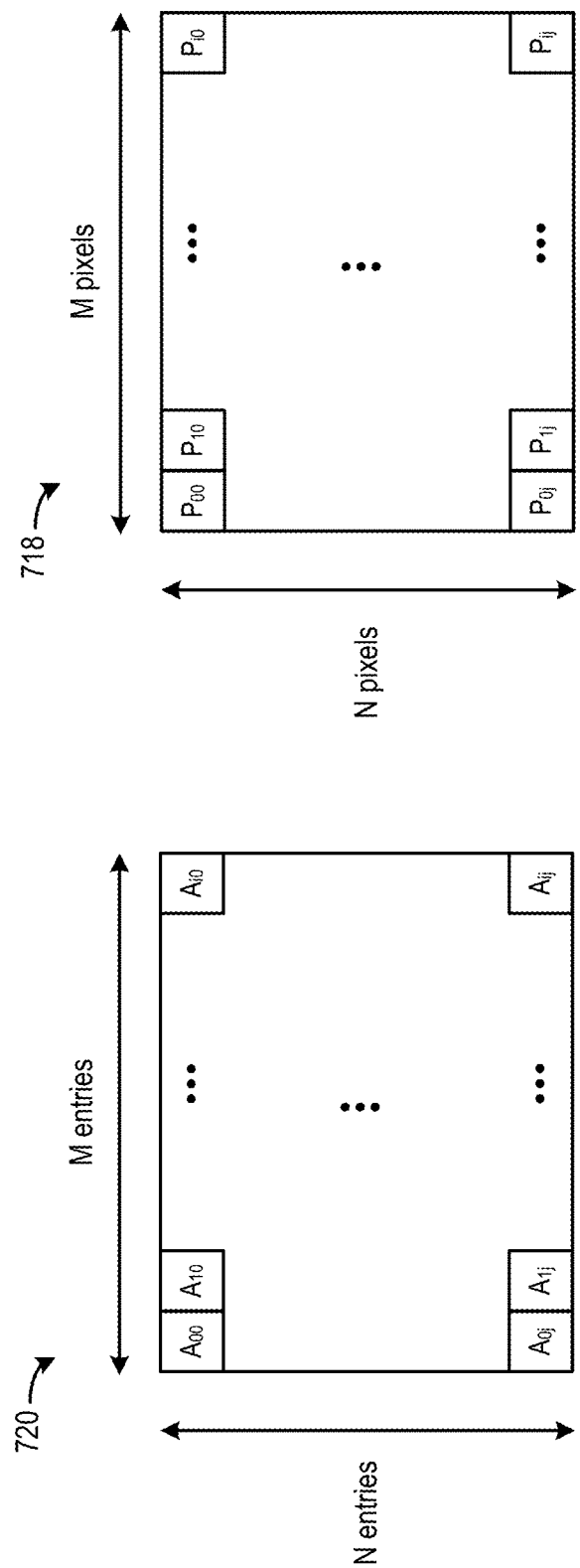
Figure 7C:
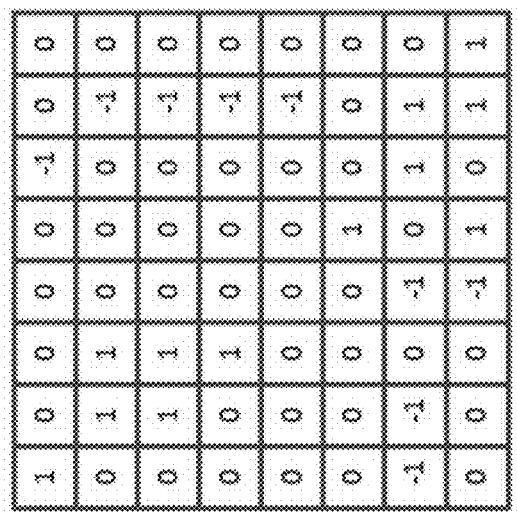
Figure 7C:
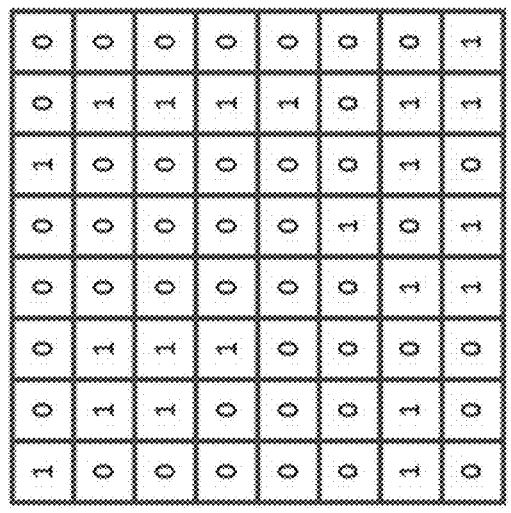

FIG. 7A, FIG. 7B, and FIG. 7C illustrate examples of an image processing system 700 and its operations. Image processing system 700 includes a host device 702 and an image sensor 704. Host device 702 can include a host processor 706 which operates an application 708 which can perform operations including, for example, fusion of 2D and 3D sensing, object recognition and tracking, or location tracking, on image 710 generated by image sensor 704. In some examples, image processing system 700 can be in a wearable device. In some examples, processing system 700 can be split into multiple separate devices. For example, host device 702 can be a personal computer (PC), a smart phone, a camera base station, or an integrated circuit such as a central processing unit (CPU), a field-programmable switch array (FPGA), or a micro controller unit (MCU). Host device 702 and image sensor 704 can be electrically connected via an interconnect (not shown in FIG. 7A), such as an interconnect compatible with the Mobile Industry Processor Interface (MIPI) standard.

Referring to FIG. 7A, image sensor 704 includes a pixel cell array control circuit 716 and a pixel cell array 718. Each pixel cell of pixel cell array 718 can include similar components as pixel cell 601 of FIG. 6A and FIG. 6C such as photodiode 602, electronic shutter switch 603, transfer switch 604, processing circuits 614, and memory 616, to perform a light measurement operation to generate pixel data. Blocks of pixel cells can also share quantization circuits 620 comprising processing circuits 614 and memory 616 as shown in FIG. 6E. Image sensor 704 further includes other circuits, such as counters 640 and DAC 642 shown in FIG. 6E. In some examples, pixel cell array 718 and pixel cell array control circuit 716 can form a stack structure to maximize the light receiving surface of image sensor 704, which allows pixel cell array 718 to include more pixel cells to improve resolution.

Each pixel cell in pixel cell array 718 may include a configuration memory, which can be part of or external to the pixel cell, to store programming data for configuring/programming the light measurement operation at the each pixel cell, or at blocks of pixel cells. The configuration memory of each pixel cell can be individually addressable, which allows the light measurement operation at each pixel cell, or a block of pixel cells, to be individually programmed by pixel cell array control circuit 716 based on a pixel array programming map 720. In some examples, pixel array programming map 720 can be generated by host processor 706 as a result of the object tracking operation on image 710. In some examples, pixel cell array control circuit 716 may also include a programming map generator 721 to generate pixel array programming map 720 based on image 710. Pixel cell array control circuit 716 can extract programming data from pixel array programming map 720 and transmit the programming data in the form of control signals 722 and 724 to pixel cell array 718. Programming data can be read out from the configuration memory to configure the light measurement operation.

As to be described in details below, the configuration of the light measurement operation at a pixel cell can include, for example, setting a power state of the different circuit components accessed/associated by the pixel cell, such as quantization circuit 620. The configuration may also include other aspects of the light measurement operation, such as setting an exposure period for the light measurement operation or setting the quantization resolution/bit depth.

Pixel array programming map 720 can include programming data targeted at each pixel cell of the array of pixel cells. FIG. 7B illustrates an example of pixel array programming map 720. As shown in FIG. 7B, pixel array programming map 720 can be include a 2D array of programming data, with each entry of programming data of the two-dimensional array targeted at a pixel cell of pixel cell array 718. For example, in a case where pixel cell array 718 has a width of M pixels (e.g., M columns of pixels) and a height of N pixels (e.g., N rows of pixels), pixel array programming map 720 also has a width of M entries (e.g., M columns of entries) and a height of N entries (e.g., N rows of entries). The programming data $A_{00}$ at entry (0, 0) of pixel array programming map 720 is targeted at pixel cell Poo at pixel location (0, 0) of pixel cell array 718, whereas the programming data $A_{01}$ at entry (0, 1) of pixel array programming map 720 is targeted at pixel cell Poi at pixel location (0, 1) of pixel cell array 718. In some examples, the programming data of each entry of pixel array programming map 720 can be transmitted sequentially following a pre-determined scanning pattern, such as traversing a row from left to right (e.g., $A_{00}, A_{01}, \ldots A_{0i}$), followed by the next row from left to right (e.g., $A_{10}, A_{11}, \ldots A_{1i}$), to form a stream of serial data. The programming data for each entry can be extracted and identified from the stream of serial data based on the scanning pattern and the order by which the entries are received. In some examples, pixel array programming map 720 can be sent only when certain programming data need to be updated between frames, and only the programming data that need to be updated are included in pixel array programming map 720. In some examples, each entry of pixel array programming map 720 can also target at a block of pixel cells (e.g., a 2×2 array of pixel cells, a 4×4 array of pixel cells).

Depending on the configuration operation, each entry of pixel array programming map 720 can either include binary programming data or non-binary programming data. FIG. 7C illustrates examples of pixel array programming maps 720a and 720b. As shown in FIG. 7C, pixel array programming map 720a includes binary programming data 0 and 1. In some examples, the binary programming data at each entry of pixel array programming map 720a can enable (e.g., with programming data set to 1) or disable (e.g., with programming data set to 0) the generation of pixel data at the pixel cell corresponding to the entry. The binary programming data can also set a power state of the quantization circuit 620 used by the pixel cell. For example, if the programming data indicates that the pixel cell is not to generate pixel data, the processing circuits and memory included in the quantization circuit used by the pixel cell can be powered down.

In addition, pixel array programming map 720b may include non-binary programming data such as −1, 0, 1, or other values. The non-binary programming data of pixel array programming map 720b, as shown in FIG. 7C, can be used to, for example, set an exposure period or set a quantization resolution. For example, a programming value of −1 can indicate the pixel cell and the quantization circuit being disabled during a frame period, a programming value of 0 can indicate the pixel cell and the quantization circuit operating in a low resolution mode, whereas a programming value 1 can indicate the pixel cell and the quantization circuit operating in the full resolution mode. The pixel cell can then set the power state of the processing circuits and the memory of the quantization circuit accordingly.

In some examples, pixel array programming map 720*a/b* can be generated by the application (e.g., application 708) operating at host device 702, or map generator 721 of pixel cell array control circuit 716, that consumes the pixel data from pixel cell array 718. For example, application 708/map generator 721 may identify, from an image, pixels that contain relevant information, and determine a region of interest (ROI) comprising the pixels. Pixel cells that generate pixel data corresponding to the ROI can then be identified. As an illustrative example, referring back to the example of FIG. 6F, application 708/map generator 721 may identify an ROI including the group of pixel cells 650 as providing relevant information (e.g., pixel data of object 652) in an image at time T0. Application 708/map generator 721 can then predict the change in the ROI between times T0 and T6 based on, for example, a direction and a speed of movement of object 652 with respect to image sensor 600. Application 708/map generator 721 can then predict the new image location of the ROI at time T6, which includes the group of pixel cells 670, based on the image location of the group of pixel cells 650 at time T0 and the predicted change. Based on the image location of the group of pixel cells 670 at time T6, application 708/map generator 721 can generate pixel array programming map 720*a* by setting the programming data of the entries corresponding to the group of pixel cells 670 to one, while setting the programming data of the rest of the entries to zero, so that only the group of pixel cells 670 transmits pixel data to host device 702. In some examples, the ROIs can also be used to set a non-uniform spatial sampling rate such that each pixel cell corresponding to the ROIs transmits pixel data, whereas outside the ROI, a sparsely distributed set of pixel cells is selected to transmit pixel data. The selection of which pixel cells to transmit pixel data can be encoded in pixel array programming map 720*a*.

In some examples, application 708/map generator 721 may maintain a model of an environment in which an object being tracked is located based on prior images, and predict the pixel cells that are likely to provide the pixel data of the object in a current image based on an environment model. In some examples, image sensor 704, or other processing circuits that is part of the same chip as image sensor 704, may also compute fixed primitives (e.g. temporal or spatial contrast) and estimate where relevant information is occurring based on those primitives, and generate pixel array programming map 720*a* based on the estimation.

Figure 7D:
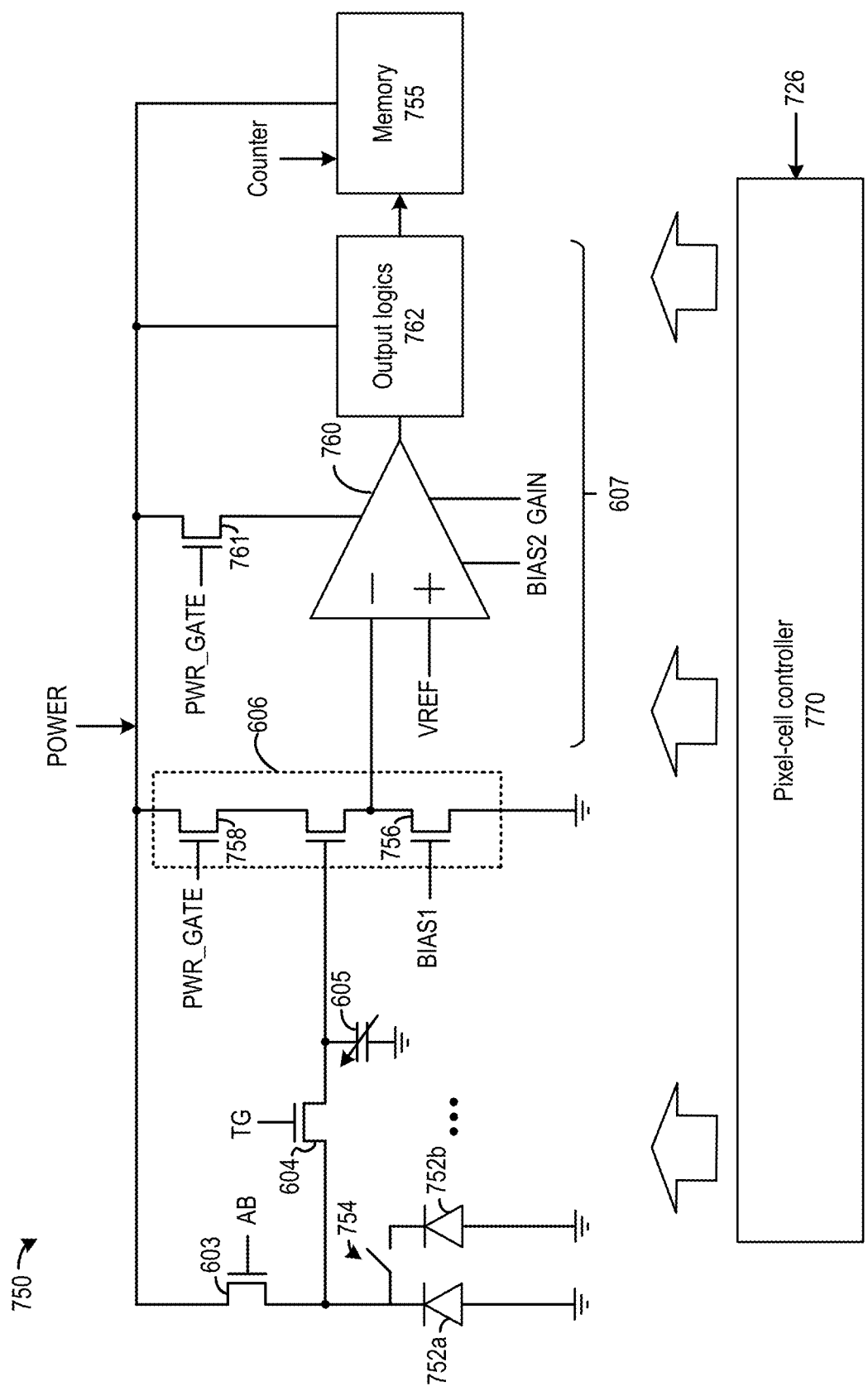

FIG. 7D illustrates example internal components of a pixel cell 750 of pixel cell array 718, which can include at least some of the components of pixel cell 601 of FIG. 6A. Pixel cell 750 can include one or more photodiodes, including photodiodes 752*a*, 752*b*, etc., each can be configured to detect light of a different frequency range. For example, photodiode 752*a* can detect visible light (e.g., monochrome, or one of red, green, or blue color), whereas photodiode 752*b* can detect infra light. Pixel cell 750 further includes a switch 754 (e.g., a transistor, a controller barrier layer) to control which photodiode outputs charge for pixel data generation.

In addition, pixel cell 750 further includes electronic shutter switch 603, transfer switch 604, charge storage device 605, buffer 606, quantizer 607 as shown in FIG. 6A, as well as a memory 755. Charge storage device 605 can have a configurable capacitance to set a charge-to-voltage conversion gain. In some examples, the capacitance of charge storage device 605 can be increased to store overflow charge for FD ADC operation for a medium light intensity to reduce the likelihood of charge storage device 605 being saturated by the overflow charge. The capacitance of charge storage device 605 can also be decreased to increase the charge-to-voltage conversion gain for PD ADC operation for a low light intensity. The increase in the charge-to-voltage conversion gain can reduce quantization error and increase the quantization resolution. In some examples, the capacitance of charge storage device 605 can also be decreased during the FD ADC operation to increase the quantization resolution. Buffer 606 includes a current source 756 of which the current can be set by a bias signal BIAS1, as well as a power gate 758 which can be controlled by a PWR_GATE signal to turn on/off buffer 606. Buffer 606 can be turned off as part of disabling pixel cell 750.

In addition, quantizer 607 includes a comparator 760 and output logics 762. Comparator 760 can compare the output of buffer with a reference voltage (VREF) to generate an output. Depending on a quantization operation (e.g., TTS, FD ADC, and PD ADC operations), comparator 706 can compare the buffered voltage with different VREF voltages to generate the output, and the output be further processed by output logics 762 to cause memory 755 to store a value from a free running counter as the pixel output. The bias current of comparator 760 can be controlled by a bias signal BIAS2 which can set the bandwidth of comparator 760, which can be set based on the frame rate to be supported by pixel cell 750. Moreover, the gain of comparator 760 can be controlled by a gain control signal GAIN. The gain of comparator 760 can be set based on a quantization resolution to be supported by pixel cell 750. Comparator 760 further includes a power switch 761 which can also be controlled by the PWR_GATE signal to turn on/off comparator 760. Comparator 760 can be turned off as part of disabling pixel cell 750.

In addition, output logics 762 can select the outputs of one of the TTS, FD ADC, or PD ADC operations and based on the selection, determine whether to forward the output of comparator 760 to memory 755 to store the value from the counter. Output logics 762 can include internal memory to store indications, based on the output of comparator 760, of whether the photodiode 752 (e.g., photodiode 752*a*) is saturated by the residual charge, and whether charge storage device 605 is saturated by the overflow charge. If charge storage device 605 is saturated by the overflow charge, output logics 762 can select TTS output to be stored in memory 755 and prevent memory 755 from overwriting the TTS output by the FD ADC/PD ADC output. If charge storage device 605 is not saturated but the photodiodes 752 are saturated, output logics 762 can select the FD ADC output to be stored in memory 755; otherwise output logics 762 can select the PD ADC output to be stored in memory 755. In some examples, instead of the counter values, the indications of whether photodiodes 752 are saturated by the residual charge and whether charge storage device 605 is saturated by the overflow charge can be stored in memory 755 to provide the lowest precision pixel data.

In addition, pixel cell 750 may include a pixel-cell controller 770, which can include logic circuits to generate control signals such as AB, TG, BIAS1, BIAS2, GAIN, VREF, PWR_GATE, etc. Pixel-cell controller 770 can also be programmed by pixel-level programming signals 726. For example, to disable pixel cell 750, pixel-cell controller 770 can be programmed by pixel-level programming signals 726 to de-assert PWR_GATE to turn off buffer 606 and comparator 760. Moreover, to increase the quantization resolution, pixel-cell controller 770 can be programmed by pixel-level programming signals 726 to reduce the capacitance of charge storage device 605, to increase the gain of comparator 760 via GAIN signal, etc. To increase the frame rate, pixel-cell controller 770 can be programmed by pixel-level programming signals 726 to increase BIAS1 signal and BIAS2 signal to increase the bandwidth of, respectively, buffer 606 and comparator 760. Further, to control the precision of pixel data output by pixel cell 750, pixel-cell controller 770 can be programmed by pixel-level programming signals 726 to, for example, connect only a subset of bits (e.g., most significant bits) of the counter to memory 755 so that memory 755 only stores the subset of bits, or to store the indications stored in output logics 762 to memory 755 as the pixel data. In addition, pixel-cell controller 770 can be programmed by pixel-level programming signals 726 to control the sequence and timing of AB and TG signals to, for example, adjust the exposure period and/or select a particular quantization operation (e.g., one of TTS, FD ADC, or PD ADC) while skipping the others based on the operation condition, as described above.

FIG. 7E illustrates examples of internal components of image processor 609. As shown in FIG. 7E, image processor 609 may include a feature extraction circuit 772 and a memory 776. The features to be extracted/detected by image processor 609 may include, for example, spatial features and keypoints of pre-determined objects (e.g., a human face, a body part, certain physical objects in a scene), temporal contrasts, etc. In some examples, feature extraction circuit 772 may implement a machine-learning model 773, such as a convolutional neural network (CNN), a recurring neural network (RNN), etc, which can be trained to perform image feature operations on an input image frame generated by pixel cell array 718. In some examples, feature extraction circuit 772 can also include comparison circuits 775 to compare the pixel data against a threshold to identify pixels having pre-determined temporal contrasts. Feature extraction circuit 772 may include other circuits, such as a digital signal processor (DSP), a linear solver unit, a micro-controller, arithmetic circuits, etc., to perform the feature extraction operation. Image processor 609 may receive, as part of second programming signals 732 from host processor 706, target features/thresholds, machine-learning parameters (e.g., weights, backward propagation gradients), or other configuration parameters, to support the feature extraction operations and/or training operations of machine-learning model 773. As a result of the feature extraction operation, feature extraction circuit 772 may output, for example, pixel locations of the detected features in the input image frame, which can then be fed to a programming map generator to generate pixel array programming map 720.

In addition, memory 776 can provide an on-chip memory to store pixel data of the input image frame, various configuration data for the feature extraction operation, as well as the output of a feature extraction circuit (e.g., pixel locations). In some examples, a current input image frame provided to feature extraction circuit 772 may include only sparse pixel data rather than a full frame of pixel data. In such a case, memory 776 may also store pixel data of prior input image frames, which can be fed to feature extraction circuit 772 and combined with the current input image to generate a reconstructed full frame of pixel data. Feature extraction circuit 772 can then perform the feature extraction operation based on the reconstructed full frame of pixel data. Memory 776 may include, for example, spin tunneling random access memory (STRAM), non-volatile random access memory (NVRAM), etc. In some examples, image processor 609 may also include an interface to an off-chip memory (e.g., dynamic random access memory) to support the feature extraction operations at a feature extraction circuit.

Feature extraction circuit 772 can employ various techniques to perform the feature extraction operation. In one example, feature extraction circuit 772 can use machine-learning model 773, such as a CNN, to perform a convolution operation between a block of pixel data with a filter. The filter may include a set of weights representing a target feature to be extracted. As part of the convolution operation, the filter is superimposed with a portion of the block of pixel data at a particular stride location, and a sum of products of each element of the filter and each pixel within the portion can be determined. As the filter is shifted around within the block of pixels, a distribution of the sum of products with respect to different stride locations can be determined as the convolution outputs. The convolution outputs may indicate, for example, a probability that a particular pixel captures the target feature, a probability that the pixel belongs to a target object, etc. Based on the probabilities, feature extraction circuit 772 can output the pixel locations of the pixels that are determined to be likely to include the target feature(s) or to be part of the target object. The pixel locations can then be output as part of region of interest information to adjust the sparse capture operation of a pixel cell array as described above.

The filter weights of the convolution operation can be obtained from a training process, which can be performed off-line, on-line, or a combination of both. In an off-line training process, the weights can be pre-stored in memory 776 prior to the feature extraction operation. The weights can be obtained from a training process based on a training data set that cover a range of image data expected to be processed by image processor 609. The training data set can be stored in a cloud environment, and the training can also be performed in the cloud environment as an off-line training process. The weights obtained from the off-line training process can be common for all image processors of different imaging systems.

In an on-line training process, the weights used by image processor 609 can be obtained while image processor 609 receives image data of the actual object to be detected. An example application may be eye tracking (e.g., based on images of an eye captured by the image sensor). As part of the on-line training process, image processor 609 can operate in a training mode in which it receives pixel data of the eye of the user when the user is asked to look at specific targets or locations in space. Through the training process, image processor 609 can adjust the weights to maximize the likelihood of correctly identifying the eye of the user. In such a case, the weights used by image processor 609 of a particular imaging system can be different from the weights used by image processor 609 of another imaging system, as the weights are optimized for a specific user and/or for a specific operation condition. In some examples, the weights used by image processor 609 can be obtained by a combination of off-line and on-line training processes. For example, the weights used by the first neural network layer can be generic weights used to extract generic features of an object, whereas the weights of the upper neural network layers can be trained in an on-line training process to become specific to a user and/or to a specific operation condition.

In addition, to support a dynamic vision sensing (DVS) operation, feature extraction circuit 772 can use comparison circuits 775 to compare the pixels in the input image frame with corresponding pixels in the prior image frame stored in memory 776 to obtain temporal contrasts for the pixels. Comparison circuits 775 can also compare the temporal contrasts against a target threshold (received as part of second programming signals 732) to output the pixel locations of pixels having (or exceeding) a pre-determined threshold of temporal contrast.

The feature extraction operation at feature extraction circuit 772 can be configured based on second programming signals 732. For example, host processor 706 can encode the target features to be extracted as filter weights, and supply the filter weights to the CNN model to perform convolution operations. In addition, host processor 706 can set the temporal contrast thresholds for the DVS operation, and send the temporal contrast thresholds as part of second programming signals 732. The pixel locations can then be output as part of region of interest information to adjust the sparse capture operation of pixel cell array 718 as described above.

Besides target features and thresholds, host processor 706 can influence the feature extraction operation at feature extraction circuit 772 based on other configuration parameters included in second programming signals 732. For example, host processor 706 can be part of the on-line training operation and can determine the backward propagation gradients, based on a training operation involving images received from a single imaging system or multiple imaging systems. Host processor 706 can then provide the backward propagation gradients back to each imaging system as part of second programming signals 732 to adjust the weights locally at each imaging system. As another example, host device 702 can provide the intermediate result of the image processing operation, such as the outputs of lower level neural network layers, as part of second programming signals 732 to feature extraction circuit 772, which can then use the outputs to perform the neural network computations at the higher level neural network layers. As another example, host processor 706 can provide a predicted accuracy of the image processing operation performed by the neural network as feedback, which allows the neural network of feature extraction circuit 772 to update the weights to improve the predicted accuracy of the image processing operation.

As another example, host processor 706 can provide the locations of an initial regions of interest (ROI). Image processor 609 can perform the feature extraction operation (e.g., convolution operation, dynamic sensing operation) in a two-step process. For example, image processor 609 can first perform a feature extraction operation on pixels identified by the initial ROI. If the extraction results indicate that the initial ROI is off (e.g., the identified pixels do not resemble the shape of the target object), image processor 609 can use the initial ROI as a baseline to search for additional pixels that may include the target features in a second step. At the end of the second step, image processor 609 can determine the refined pixel locations to provide a more refined ROI.

In addition, host processor 706 can also perform an evaluation of the feature extraction operation, and provide the evaluation result back to feature extraction circuit 772. Host device 702 can provide the evaluation result as a feedback to influence the feature extraction operation at feature extraction circuit 772. The evaluation result can include, for example, an indication of whether (and/or a percentage of) the sparse pixels output by pixel cell array 718 contain the data needed by application 708. In a case where the sparse pixels are output based on an ROI defined in first programming signals generated as a result of the feature extraction operation, feature extraction circuit 772 can adjust the ROI and/or the feature extraction operation based on the evaluation result. For example, in a case of object tracking/detection operation, host processor 706 can evaluate whether the sparse pixels in an image frame output by pixel cell array 718 contain all the pixels of the target object, and provide the evaluation result back to feature extraction circuit 772. Feature extraction circuit 772 can then adjust, for example, the selection of pixels to perform the feature extraction operation based on the evaluation result. In a case where the evaluation result indicate that the sparse pixels do not contain all the pixels of the target object, feature extraction circuit 772 can expand the ROI to process more pixels, or even forgo the ROI and process all pixels of the input image frame, to extract/detect the target features.

Figure 7F:
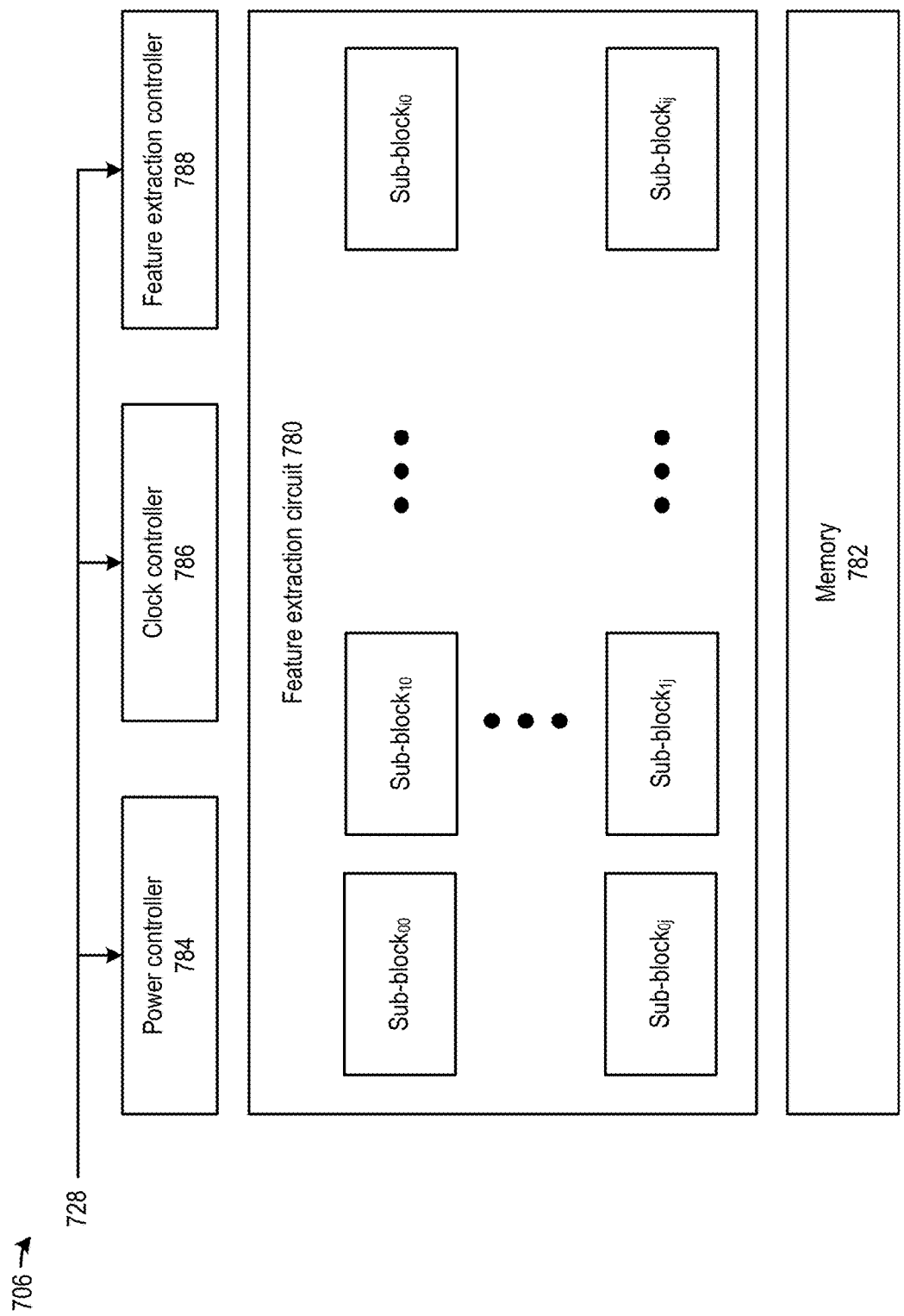

FIG. 7F illustrates example internal components of host processor 706. As shown in FIG. 7F, host processor 706 may include a feature extraction circuit 780 and a memory 782. Feature extraction circuit 780 may include an array of sub-blocks, such as sub-block$_{00}$, sub-block$_{10}$, sub-block$_{i0}$, sub-block$_{0j}$, sub-block$_{1j}$, sub-block$_{ij}$, etc. Each sub-block can be configured to extract features from a block of pixel data generated by a pixel cell array 718, such that the blocks of pixel data of an image frame can be processed in parallel to expedite the extraction process. Each sub-block can output data representing the extracted features, as well as the pixel locations of the extracted features. Memory 782 can provide on-chip memory to store the input data to the sub-blocks (e.g., the pixel data), various configuration data for the feature extraction operation, as well as the output of the sub-blocks of feature extraction circuit 780. Memory 782 may include, for example, spin tunneling random access memory (STRAM), non-volatile random access memory (NVRAM), etc. In some examples, host processor 706 may also include an interface to an off-chip memory (e.g., dynamic random access memory) to support the feature extraction operations at feature extraction circuit 780.

Feature extraction circuit 780 can employ various techniques to perform the feature extraction operation. In one example, each sub-block of feature extraction circuit 780 can perform a convolution operation between a block of pixel data with a filter including the pixels of a target feature to be extracted, in which the filter is superimposed with a portion of the block of pixel data at a particular stride location, and a sum of products of each element of the filter and each pixel within the portion can be determined. As the filter is shifted around within the block of pixels, a distribution of the sum of products with respect to different stride locations can be determined as the convolution outputs. The convolution outputs from a block of pixel data can be provided to controller 706, which can identify a peak of the convolution outputs, and if the peak exceeds a threshold, the controller can determine that the block of pixel data contains the target feature, whereas the stride location of the filter within the block of pixel data can provide the pixel locations of the target feature.

In some examples, each sub-block of feature extraction circuit 780 can include circuits to perform the aforementioned convolution operation. In some examples, feature extraction circuit 780 can include a field programmable gate array (FPGA), a digital signal processor (DSP), a linear solver unit, a micro-controller, etc. In some examples, feature extraction circuit 780 can include dedicated arithmetic circuits to perform the convolution operation. The arithmetic circuits of each sub-block can implement a neural network, such as a convolution neural network (CNN), to perform the convolution operation, in which the arithmetic circuit can represent a plurality of neural network layer. The first neural network layer comprises nodes each configured to multiply a pixel value with a weight which can be part of the convolution filter to generate an intermediate output. The second neural network layer can multiply the intermediate outputs from the first neural network layer with another set of weights to generate outputs. The outputs can indicate, for example, whether a target feature is detected in a block of pixel data, and its pixel location. Besides CNN, feature extraction circuit 780 may implement other neural network topologies/architectures, such as a stochastic neural network, a spike neural network, neuromorphic computing unit, etc.

The weights of the neural network can be stored and fetched from memory 782. The weights can be generated by a training process to maximize the likelihood of the neural network correctly detecting a feature in a block of pixel data. The training process can be performed off-line, on-line, or a combination of both. In an off-line training process, the weights can be fetched to host processor 706 before the feature extraction operation (e.g., when host processor 706 is fabricated or powered up). The weights can be obtained from a training process based on a training data set that cover a range of image data expected to be processed by host processor 706. The training data set can be stored in a cloud environment, and the training can also be performed in the cloud environment as an off-line training process. The weights obtained from the off-line training process can be common for all host processors 706 of different imaging systems 700.

In an on-line training process, the weights used by host processor 706 can be obtained while host processor 706 receives image data of the actual object to be detected. An example application may be eye tracking (e.g., based on images of an eye captured by the image sensor). As part of the on-line training process, host processor 706 can operate in a training mode in which it receives pixel data of the eye of the user when the user is asked to look at specific targets or locations in space. Through the training process, host processor 706 can adjust the weights to maximize the likelihood of correctly identifying the eye of the user. In such a case, the weights used by host processor 706 of a particular imaging system 700 can be different from the weights used by host processor 706 of another imaging system 700, as the weights are optimized for a specific user and/or for a specific operation condition.

In some examples, the weights used by host processor 706 can be obtained by a combination of off-line and on-line training processes. For example, the weights used by the first neural network layer can be generic weights used to extract generic features of an object, whereas the weights of the upper neural network layers can be trained in an on-line training process to become specific to a user and/or to a specific operation condition.

In addition to pixel data and the weights, feature extraction circuit 780 can also perform the feature extraction operation based on other inputs, such as sensor data from an inertial measurement unit, which can detect the motion and location of imaging system 700. Based on the sensor data, feature extraction circuit 780 can adjust the feature extraction operation account for the motion of imaging system 700, and/or the relative physical location of imaging system 700 with respect to the target object to be detected, all of which may be reflected in the pixel data.

Besides feature extraction circuit 780 and memory 782, host processor 706 may further include a power controller 784, a clock controller 786, and a feature extraction controller 788, each of which can be controlled by programming signals 728 from controller 706. Power controller 784 can control a supply voltage of host processor 706 based on programming signals 728 from controller 706. For example, based on a target power usage, a frame rate, a latency requirement, etc., power controller 784 can scale up or down the supply voltage to feature extraction circuit 780. In addition, clock controller 786 can control, based on programming signals 728, a frequency of a clock signal supplied to feature extraction circuit 780, to set an operating frequency of feature extraction circuit 780. The operating frequency can be set based on, for example, a frame rate of pixel data supplied by image sensor 704, a target power usage, a latency requirement, etc.

In addition, feature extraction controller 788 can control the feature extraction operations at feature extraction circuit 780 based on programming signals. For example, feature extraction controller 788 can disable one or more sub-blocks of feature extraction circuit 780 based on the ROI information from a controller when those sub-blocks are not expected to receive pixel data from image sensor 702. As another example, feature extraction controller 788 can also control the outputs of sub-block, such as a precision (e.g., bit-length) of the outputs, whether the outputs are compressed, etc. Feature extraction circuit 780 can control feature extraction circuit 780 to skip the feature extraction operation and forward the pixel data directly to, for example, host processor 706 or other external systems. This can happen when, for example, a controller determines that feature extraction circuit 780 cannot complete the feature extraction operations on time (e.g., based on a power/frequency setting by power controller 784 and clock controller 786), and determines that the feature extraction operation is to be performed by an external system.

Figure 8A:
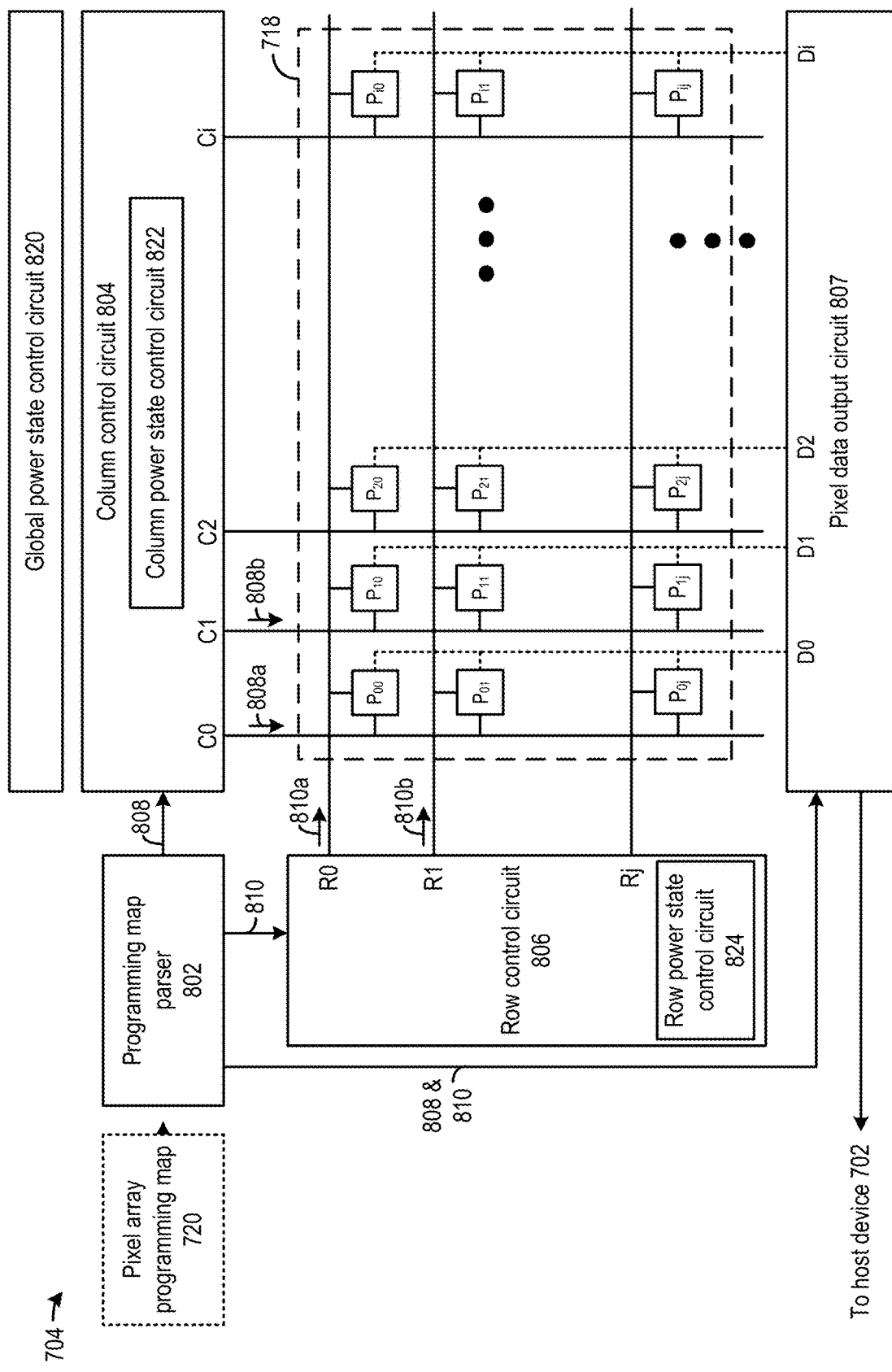
FIG. 8A, FIG. 8B, and FIG. 8C illustrate example components of the image processing system of FIGS. 7A-7F.
Figure 8B:
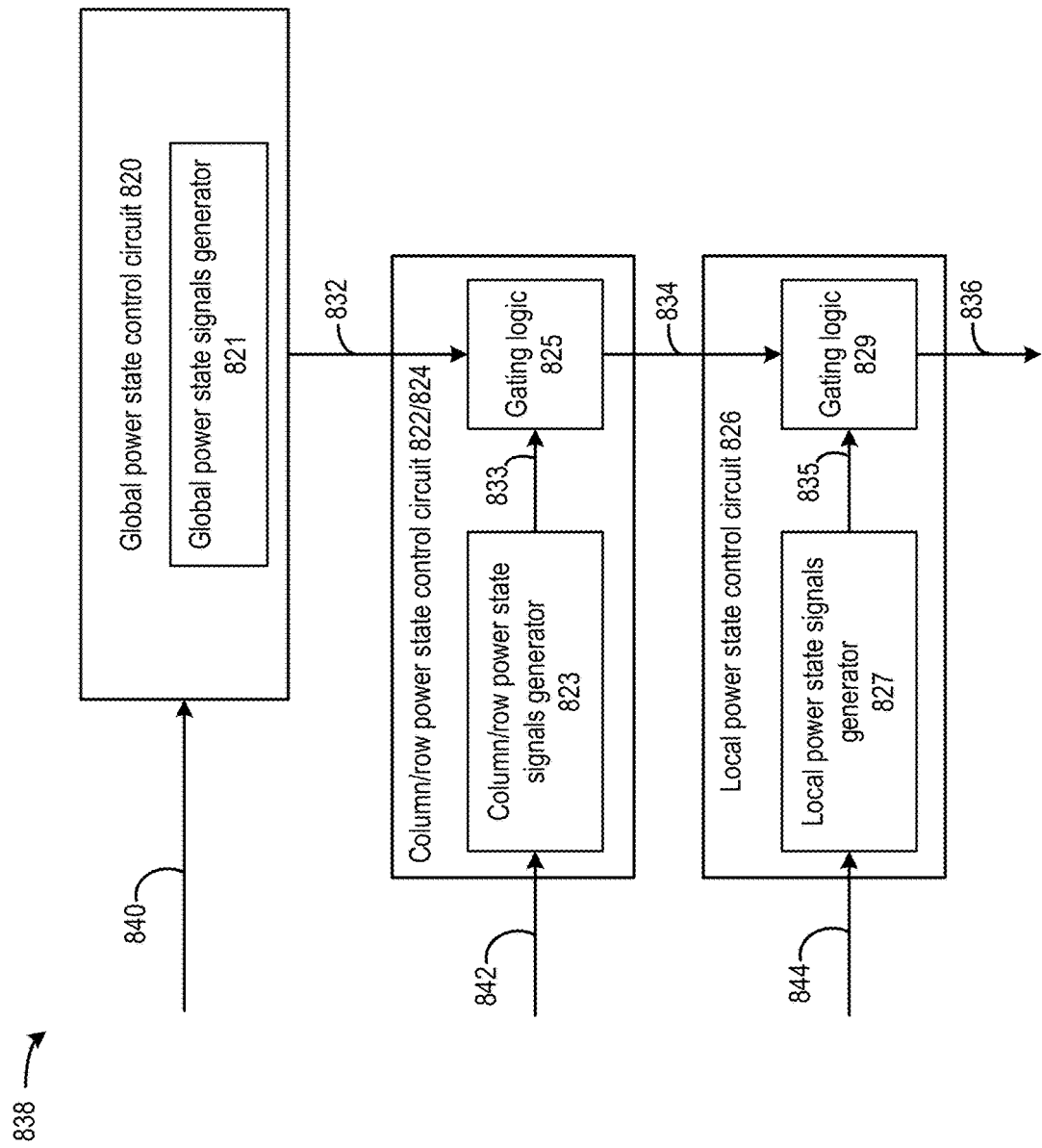
Figure 8C:
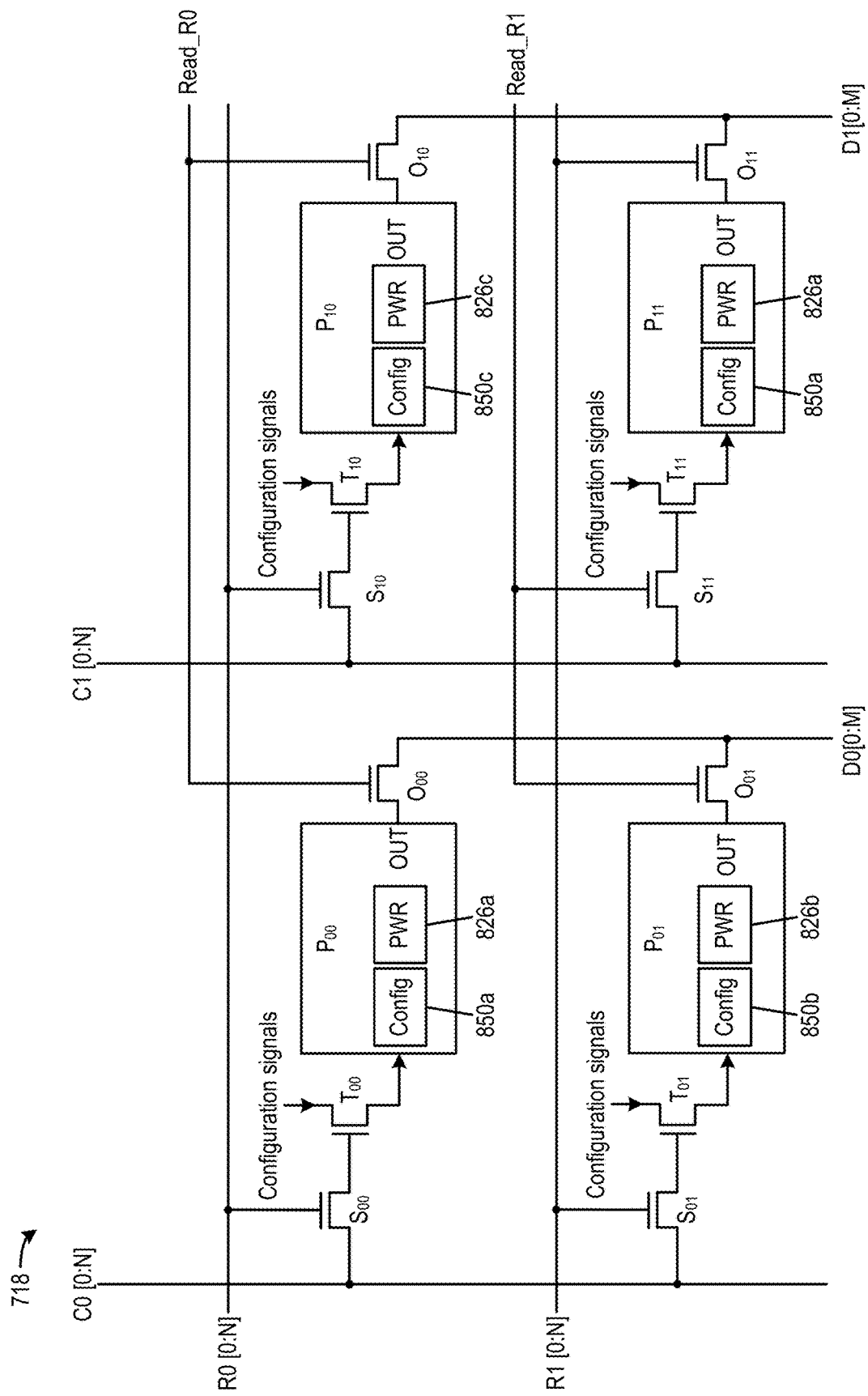

FIG. 8A, FIG. 8B, and FIG. 8C illustrate example components of peripheral circuit 716 and pixel cell array 718 of image sensor 704. As shown in FIG. 8A, an image sensor 704 can include a programming map parser 802, a column control circuit 804, a row control circuit 806, and a pixel data output circuit 807. Programming map parser 802 can parse pixel array programming map 720, which can be in a serial data stream, to identify the programming data for each pixel cell (or block of pixel cells). The identification of the programming data can be based on, for example, a predetermined scanning pattern by which the two-dimensional pixel array programming map is converted into the serial format, as well as the order by which the programming data is received by programming map parser 802 from the serial data stream. Programming map parser 802 can create a mapping among the row addresses of the pixel cells, the column addresses of the pixel cells, and one or more configuration signals based on the programming data targeted at the pixel cells. Based on the mapping, programming map parser 802 can transmit control signals 808 including the column addresses and the configuration signals to column control circuit 804, as well as control signals 810 including the row addresses mapped to the column addresses and the configuration signals to row control circuit 806. In some examples, the configuration signals can also be split between control signals 808 and control signals 810, or sent as part of control signals 810 to row control circuit 806.

Column control circuit 804 and row control circuit 806 are configured to forward the configuration signals received from programming map parser 802 to the configuration memory of each pixel cell of pixel cell array 718. In FIG. 8A, each box labelled $P_{ij}$ (e.g., $P_{00}$, $P_{01}$, $P_{10}$, $P_{11}$) can represent a pixel cell or a block of pixel cells (e.g., a 2×2 array of pixel cells, a 4×4 array of pixel cells) and can include or can be associated with a quantization circuit 620 of FIG. 6E comprising processing circuits 614 and memory 616. As shown in FIG. 8A, column control circuit 804 drives a plurality of sets of column buses C0, C1, . . . Ci. Each set of column buses includes one or more buses and can be used to transmit control signals 722 of FIG. 7A, which can include a column selection signal and/or other configuration signals, to a column of pixel cells. For example, column bus(es) C0 can transmit a column selection signal 808a to select a column of pixel cells (or a column of blocks of pixel cells) $p_{00}$, $p_{01}$, . . . $p_{0j}$, column bus(es) C1 can transmit a column selection signal 808b to select a column of pixel cells (or blocks of pixel cells) $p_{10}$, $p_{11}$, . . . $p_{1j}$, etc.

Further, row control circuit 806 drives a plurality of sets of row buses labelled R0, R1, . . . Rj. Each set of row buses also includes one or more buses and can be used to transmit control signals 724 of FIG. 7A, which can include a row selection signal and/or other configuration signals, to a row of pixel cells, or a row of blocks of pixel cells. For example, row bus(es) R0 can transmit a row selection signal 810a to select a row of pixel cells (or blocks of pixel cells) $p_{00}$, $p_{10}$, . . . $p_{i0}$, row bus(es) R1 can transmit a row selection signal 810b to select a row of pixel cells (or blocks of pixel cells) $p_{01}$, $p_{11}$, . . . $p_{1j}$, etc. Any pixel cell (or block of pixel cells) within pixel cell array 718 can be selected based on a combination of the row selection signal and the column signal to receive the configuration signals. The row selection signals, column selection signals, and the configuration signals (if any) are synchronized based on control signals 808 and 810 from programming map parser 802, as described above. Each column of pixel cells can share a set of output buses to transmit pixel data to pixel data output module 807. For example, column of pixel cells (or blocks of pixel cells) $p_{00}$, $p_{01}$, . . . $p_{0j}$ can share output buses $D_0$, column of pixel cells (or blocks of pixel cells) $p_{10}$, $p_{11}$, . . . $p_{1j}$ can share output buses $D_1$, etc.

Pixel data output module 807 can receive the pixel data from the buses, convert the pixel data into one or more serial data streams (e.g., using a shift register), and transmit the data streams to host device 702 under a pre-determined protocol such as MIPI. The data stream can come from a quantization circuit 620 (e.g., processing circuits 614 and memory 616) associated with each pixel cell (or block of pixel cells) as part of a sparse image frame. In addition, pixel data output module 807 can also receive control signals 808 and 810 from programming map parser 802 to determine, for example, which pixel cell does not output pixel data or the bit width of pixel data output by each pixel cell, and then adjust the generation of serial data streams accordingly. For example, pixel data output module 807 can control the shift register to skip a number of bits in generating the serial data streams to account for, for example, variable bit widths of output pixel data among the pixel cells or the disabling of pixel data output at certain pixel cells.

In addition, a pixel cell array control circuit further includes a global power state control circuit, such as global power state control circuit 820, a column power state control circuit 822, a row power state control circuit 824, and a local power state control circuit 826 at each pixel cell or each block of pixel cells (not shown in FIG. 8A) forming hierarchical power state control circuits. Global power state control circuit 820 can be of the highest level in the hierarchy, followed by row/column power state control circuit 822/824, with local power state control circuit 826 at the lowest level in the hierarchy.

The hierarchical power state control circuits can provide different granularities in controlling the power state of image sensor 704. For example, global power state control circuit 820 can control a global power state of all circuits of image sensor 704, including processing circuits 614 and memory 616 of all pixel cells, DAC 642 and counter 640 of FIG. 6E, etc. Row power state control circuit 822 can control the power state of processing circuits 614 and memory 616 of each row of pixel cells (or blocks of pixel cells) separately, whereas column power state control circuit 824 can control the power state of processing circuits 614 and memory 616 of each column of pixel cells (or blocks of pixel cells) separately. Some examples may include row power state control circuit 822 but not column power state control circuit 824, or vice versa. In addition, local power state control circuit 826 can be part of a pixel cell or a block of pixel cells, and can control the power state of processing circuits 614 and memory 616 of the pixel cell or the block of pixel cells.

FIG. 8B illustrates examples of internal components of hierarchical power state control circuits and their operations. Specifically, global power state control circuit 820 can output a global power state signal 832, which can be in the form of a bias voltage, a bias current, a supply voltage, or programming data, that sets a global power state of image sensor 704. Moreover, column power state control circuit 822 (or row power state control circuit 824) can output a column/row power state signal 834 that sets a power state of a column/row of pixel cells (or blocks of pixel cells) of image sensor 704. Column/row power state signal 834 can be transmitted as row signals 810 and column signals 808 to the pixel cells. Further, local power state control circuit 826 can output a local power state signal 836 that sets a power state of the pixel cell (or a block of pixel cells), including the associated processing circuits 614 and memory 616. Local power state signal 836 can be output to processing circuits 614 and memory 616 of the pixel cells to control their power state.

In hierarchical power state control circuits 838, an upper-level power state signal can set an upper bound for a lower-level power state signal. For example, global power state signal 832 can be an upper level power state signal for column/row power state signal 834 and set an upper bound for column/row power state signal 834. Moreover, column/row power state signal 834 can be an upper level power state signal for local power state signal 836 and set an upper bound for local power state signal 836. For example, if global power state signal 832 indicates a low power state, column/row power state signal 834 and local power state signal 836 may also indicate a low power state.

Each of global power state control circuit 820, column/row power state control circuit 822/824, and local power state control circuit 826 can include a power state signal generator, whereas column/row power state control circuit 822/824, and local power state control circuit 826 can include a gating logic to enforce the upper bound imposed by an upper-level power state signal. Specifically, global power state control circuit 820 can include a global power state signals generator 821 to generate global power state signal 832. Global power state signals generator 821 can generate global power state signal 832 based on, for example, an external configuration signal 840 (e.g., from host device 702) or a pre-determined temporal sequences of global power states.

In addition, column/row power state control circuit 822/824 can include a column/row power state signals generator 823 and a gating logic 825. Column/row power state signals generator 823 can generate an intermediate an column/row power state signal 833 based on, for example, an external configuration signal 842 (e.g., from host device 702) or a predetermined temporal sequences of row/column power states. Gating logic 825 can select one of global power state signal 832 or intermediate column/row power state signal 833 representing the lower power state as column/row power state signal 834.

Further, local power state control circuit 826 can include a local power state signals generator 827 and a gating logic 829. Low power state signals generator 827 an intermediate local power state signal 835 based on, for example, an external configuration signal 844, which can be from a pixel array programming map, a pre-determined temporal sequences of row/column power states, etc. Gating logic 829 can select one of intermediate local power state signal 835 or column/row power state signal 834 representing the lower power state as local power state signal 836.

FIG. 8C illustrates additional details of pixel cell array 718, including local power state control circuit 826 (e.g., 826a, 826b, 826c, and 826d, labelled as "PWR" in FIG. 8C) and configuration memory 850 (e.g., 850a, 850b, 850c, and 850d, labelled as "Config" in FIG. 8C) of each pixel cell (or each block of pixel cells). Configuration memory 850 can store first programming data to control a light measurement operation (e.g., exposure period duration, quantization resolution) of a pixel cell (or a block of pixel cells). In addition, configuration memory 850 can also store second programming data that can be used by local power state control circuit 826 to set the power states of processing circuits 614 and memory 616. Configuration memory 850 can be implemented as a static random-access memory (SRAM). Although FIG. 8C shows that local power state control circuit 826 and configuration memory 850 are internal to each pixel cell, it is understood that configuration memory 850 can also be external to each pixel cell, such as when local power state control circuit 826 and configuration memory 850 are for a block of pixel cells.

As shown in FIG. 8C, the configuration memory 850 of each pixel cell is coupled with column buses C and row buses R via transistors S, such as $S_{00}$, $S_{10}$, $S_{10}$, $S_{11}$, etc. In some examples, each set of column buses (e.g., C0, C1) and row buses (e.g., R0, R1) can include multiple bits. For example, in FIG. 8C, each set of column buses and row buses can carry N+1 bits. It is understood that in some examples each set of column buses and row buses can also carry a single data bit. Each pixel cell is also electrically connected with transistors T, such as $T_{00}$, $T_{10}$, $T_{10}$, or $T_{11}$, to control the transmission of configuration signals to the pixel cell (or block of pixel cells). Transistor(s) S of each pixel cell can be driven by the row and column select signals to enable (or disable) the corresponding transistors T to transmit configuration signals to the pixel cell. In some examples, column control circuit 804 and row control circuit 806 can be programmed by a single write instruction (e.g., from host device 702) to write to configuration memory 850 of multiple pixel cells simultaneously. Column control circuit 804 and row control circuit 806 can then control the row buses and column buses to write to the configuration memory of the pixel cells.

In some examples, local power state control circuit 826 can also receive configuration signal directly from transistors T without storing the configuration signals in configuration memory 850. For example, as described above, local power state control circuit 826 can receive row/column power state signal 834, which can be an analog signal such as a voltage bias signal or a supply voltage, to control the power state of the pixel cell and the processing circuits and/or memory used by the pixel cell.

In addition, each pixel cell also includes transistors O, such as $O_{00}$, $O_{10}$, $O_{10}$, or $O_{11}$, to control the sharing of the output bus D among a column of pixel cells. The transistors O of each row can be controlled by a read signal (e.g., read_R0, read_R1) to enable a row-by-row read out of the pixel data, such that one row of pixel cells output pixel data through output buses D0, D1, . . . Di, followed by the next row of pixel cells.

In some examples, the circuit components of pixel cell array 718, including processing circuits 614 and memory 616, counter 640, DAC 642, buffer network including buffers 630, etc., can be organized into a hierarchical power domain managed by hierarchical power state control circuits 838. The hierarchical power domain may include a hierarchy of multiple power domains and power sub-domains. The hierarchical power state control circuits can individually set a power state of each power domain, and each power sub-domain under each power domain. Such arrangements allow fine grain control of the power consumption by image sensor 704 and support various spatial and temporal power state control operations to further improve the power efficiency of image sensor 704.

While a sparse-image sensing operation can reduce the power and bandwidth requirement, having pixel-level ADCs (e.g., as shown in FIG. 6C) or block-level ADCs (e.g., as shown in FIG. 6E) to perform the quantization operations for the sparse-image sensing operation can still lead to inefficient use of power. Specifically, while some of the pixel-level or block-level ADCs are disabled, high speed control signals, such as clocks, analog ramp signals, or digital ramp signals, may still be transmitted to each pixel-level or block-level ADCs via buffer network 630, which can consume a substantial amount of power and increase the average power consumption for generation of each pixel. The inefficiency can be further exacerbated when the sparsity of the image frame increases (e.g., containing fewer pixels), but the high speed control signals are still transmitted to each pixel cell, such that the power consumption in transmitting the high speed control signals remains the same and the average power consumption for generation of each pixel increases due to fewer pixels being generated.

Figure 9A:
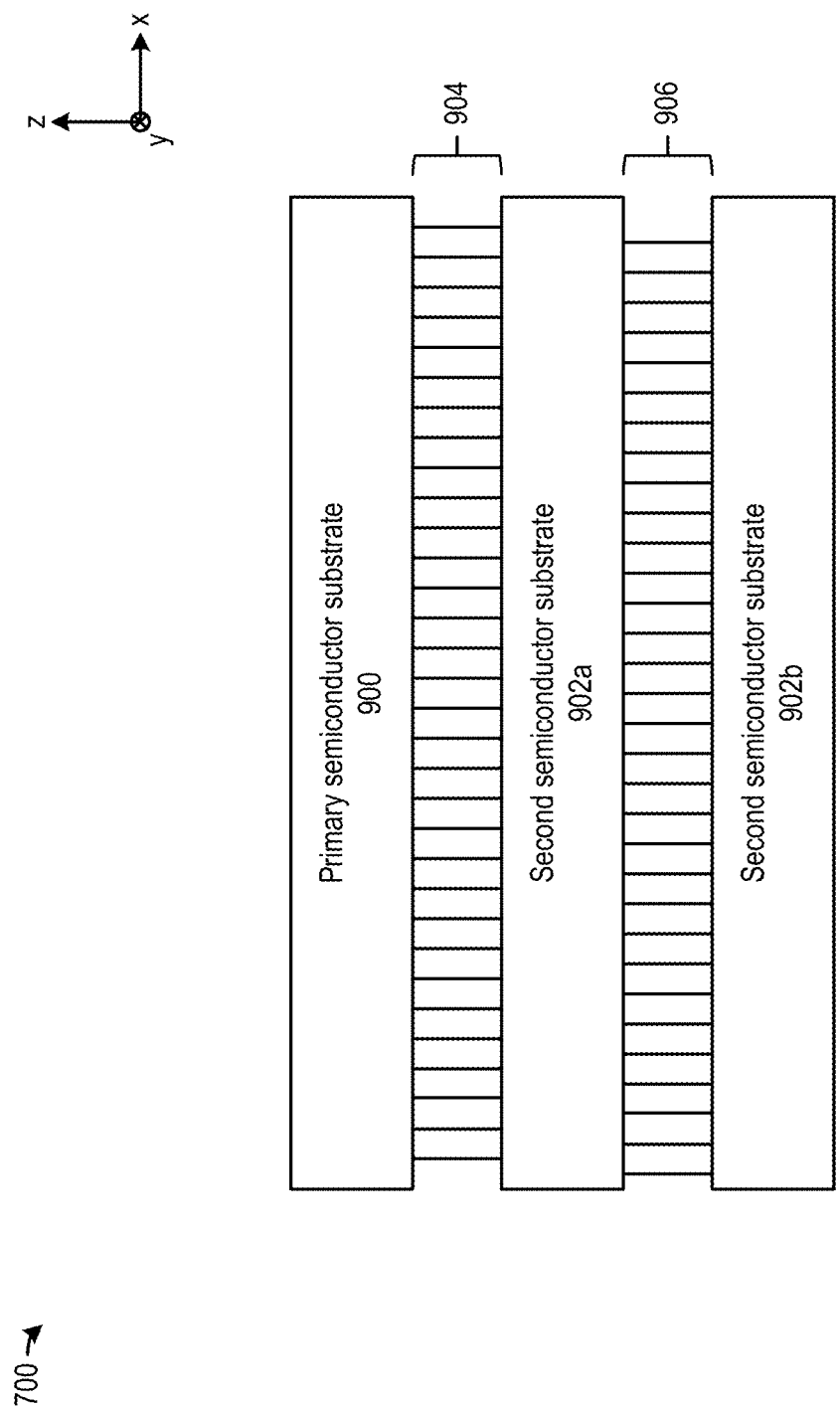
FIG. 9A, FIG. 9B, and FIG. 9C illustrate an example intelligent image sensor and integrated controller subsystem.
Figure 9B:
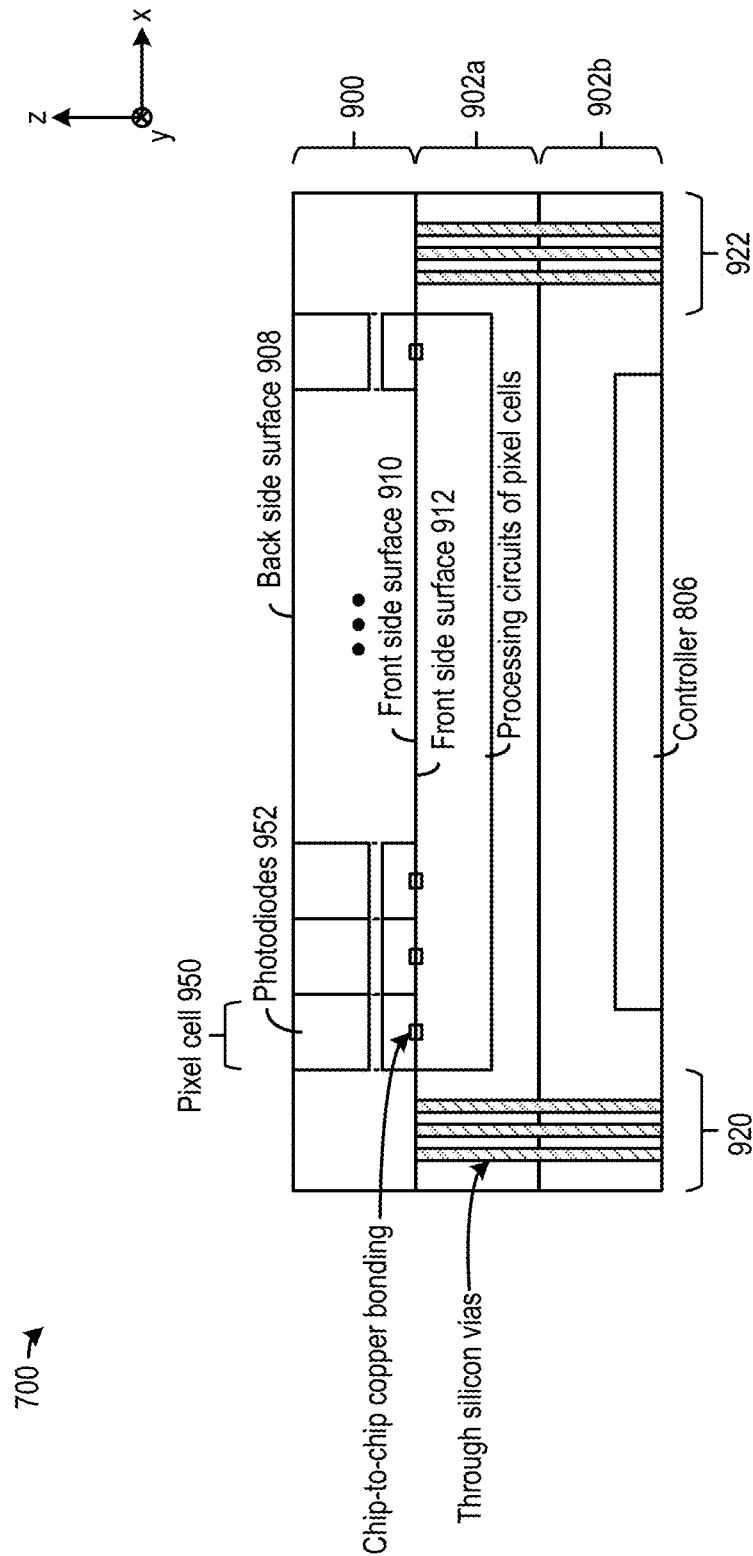
Figure 9C:
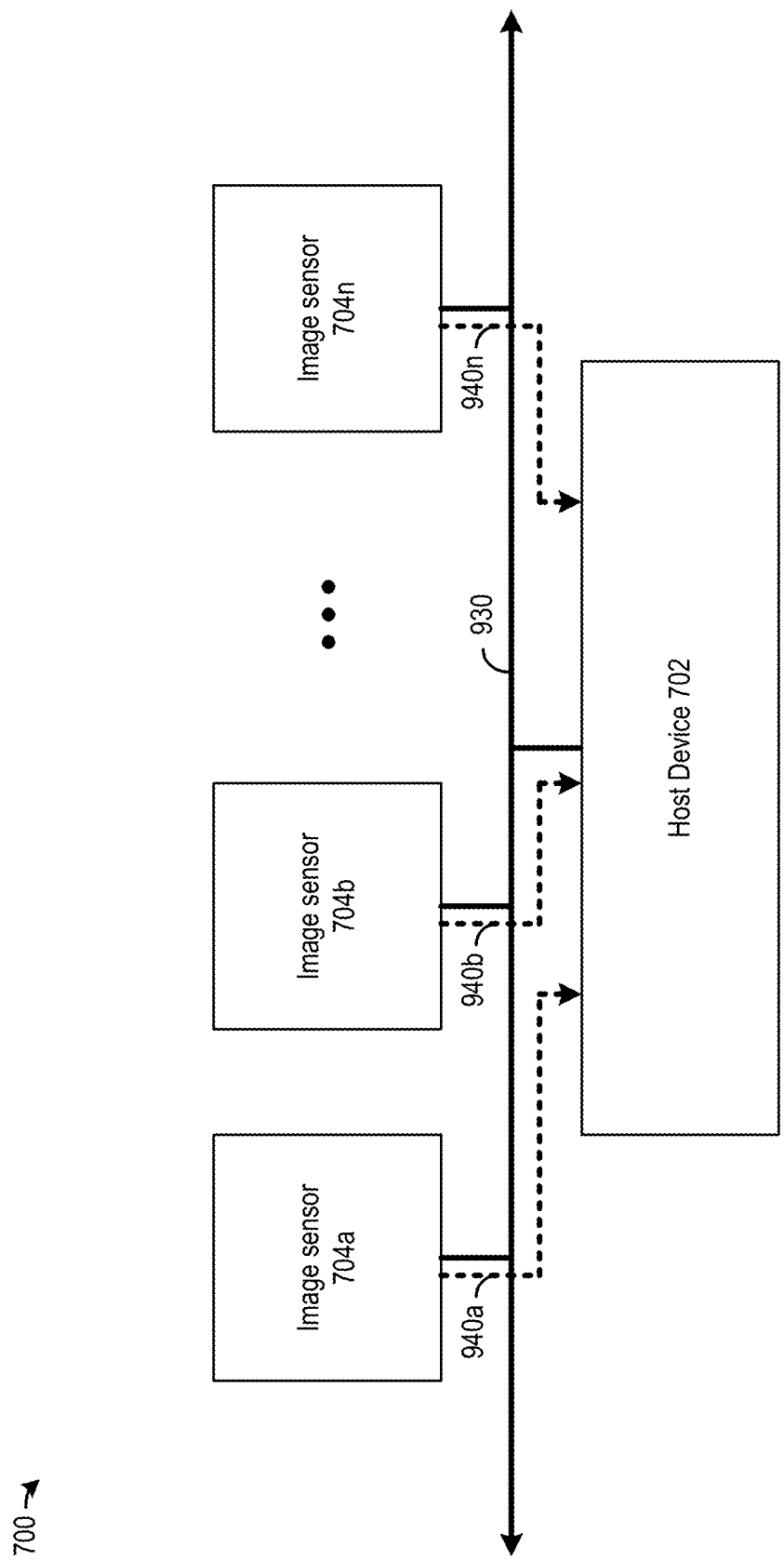

FIG. 9A, FIG. 9B, and FIG. 9C illustrate examples of physical arrangements of image sensor 704 and host device 702 in imaging system 700. FIG. 9A and FIG. 9B illustrate examples of physical arrangements of a controller and pixel cell array. As shown in FIG. 9A, image sensor 704 may include a primary semiconductor substrate 900 that includes some of the components of pixel cell array 718, such as photodiodes of the pixel cells, and one or more secondary semiconductor substrates 902 that include the processing circuits of pixel cell array 718, such as buffer 606, quantizer 607, and memory 616, as well as a controller. In some examples, one or more secondary semiconductor substrates 902 includes a plurality of secondary semiconductor substrates, such as secondary semiconductor substrates 902a and 902b. Secondary semiconductor substrate 902a can include the processing circuits of the pixel cell array 718, whereas second semiconductor substrate 902b can include a controller.

In some examples, the primary semiconductor substrate 900 and one or more secondary semiconductor substrates 902 can form a stack along a vertical direction (e.g., represented by z-axis), with vertical interconnects 904 and 906 to provide electrical connection among the substrates. Such arrangements can reduce the routing distance of the electrical connections between pixel cell array 718 and the controller, which can increase the speed of transmission of data (especially pixel data) from pixel cell array 718 to the controller, and reduce the power required for the transmission.

FIG. 9B illustrates examples of details of the stack structure of image sensor 704. As shown in FIG. 9B, primary semiconductor substrate 900 may include a back side surface 908 configured as a light receiving surface and includes photodiodes of each pixel cell, and a front side surface 910 on which a transfer transistor and charge storage device (e.g., a floating drain of transfer transistor) are implemented, whereas the processing circuits of the pixel cells including buffer 606, quantizer 607, memory 616, etc. are implemented below a front side surface 912 of second semiconductor substrate 902a. Front side surface 910 of primary semiconductor substrate 900 may be electrically connected with front side surface 912 of secondary semiconductor substrate 902a by vertical interconnects which include chip-to-chip copper bonding. The chip-to-chip copper bonding can provide pixel interconnects between, for example, the transfer transistor of each pixel cell and the buffer of each pixel cell.

In addition, image sensor 700 further includes through silicon vias (TSV) to provide vertical interconnects between pixel cell array 718 and a controller. The TSVs can be on shoulder regions 920 and 922 of the stack and penetrate through secondary semiconductor substrate 902a and 902b. The TSVs can be configured to transmit, for example, first programming signals and image frames (e.g., primary image frames). The vertical interconnects can support, for example, transmission of full frame of pixel data (e.g., 1920 pixels×1080 pixels) at the normal frame rate (e.g., 60 frames/second) from pixel cell array 718 to image processor 609 to perform image feature extraction operations.

FIG. 9C illustrates the connection between host device 702 and image sensors 704. In the example shown in FIG. 9C, imaging system 700 can include a host device 702 and multiple image sensors 704, including image sensor 704a, 704b, ..., 704n, etc. Each of image sensor 704 can include a high speed point-to-point connection 940, such as a MIPI CSI interface, to host device 702 to transmit image frames. For example, image sensor 704a is connected to host device 702 via point-to-point connection 940a, image sensor 704b is connected to host device 702 via point-to-point connection 940b, whereas image sensor 704n is connected to host device 702 via point-to-point connection 940n. In addition, image sensors 704 and host device 702 are also connected via a shared system bus, such as an 13C bus, which provides a low rate and low power bus connection for host device 702 to transmit secondary programming signals to each of image sensors 704a, 704b, ..., and 704n.

Figure 10:
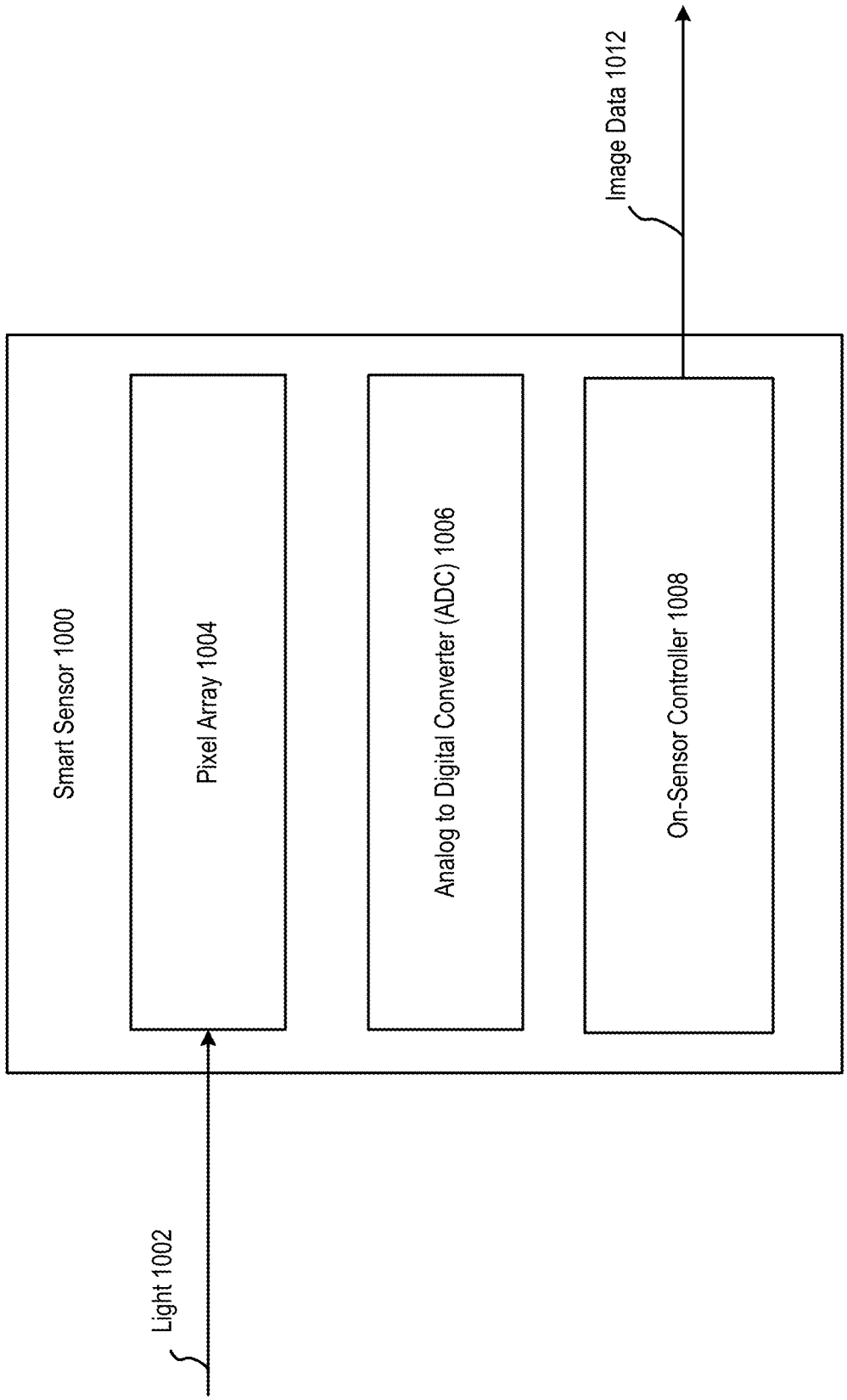
FIG. 10 illustrates an example smart sensor apparatus including several on-sensor subsystems.

FIG. 10 illustrates an example intelligent image sensor and integrated on-sensor controller subsystem. Specifically, FIG. 10 depicts an intelligent sensor which receives, as input, light, from an environment and outputs digital image data. Intelligent sensor 1000 contains pixel array 1004, which may be a pixel array including an array of pixel cells.

The pixel cells of pixel array 1004 may each include one or more photodiodes configured to generate a charge in response to receiving light 1002 as input. When the charge is generated, a charge storage device may convert the charge to output a voltage.

Intelligent sensor 1000 contains analog to digital converter 1006. Analog to digital converter 1006 may be a system of subsystem configured to receive, as input an analog signal, such as an array of voltages generated by the charge storage devices of the pixel array, and output digital pixel data. Analog to digital converter 1006 may be any entity for converting an analog signal to a digital signal, and may be similar to the converters described herein.

Intelligent sensor 1000 contains on-sensor controller subsystem 1008. On-sensor controller subsystem 1008 may be a processing system built into intelligent sensor 1000 configured to facilitate on-sensor processing of digital image data output by the analog to digital converter 1006. On-sensor controller subsystem 1008 may be a system comprising a processor and a plurality of computer-readable instructions stored in memory, such that when the processor executes the computer-readable instructions, the processor is configured to perform the processes and methods described herein.

Figure 11:
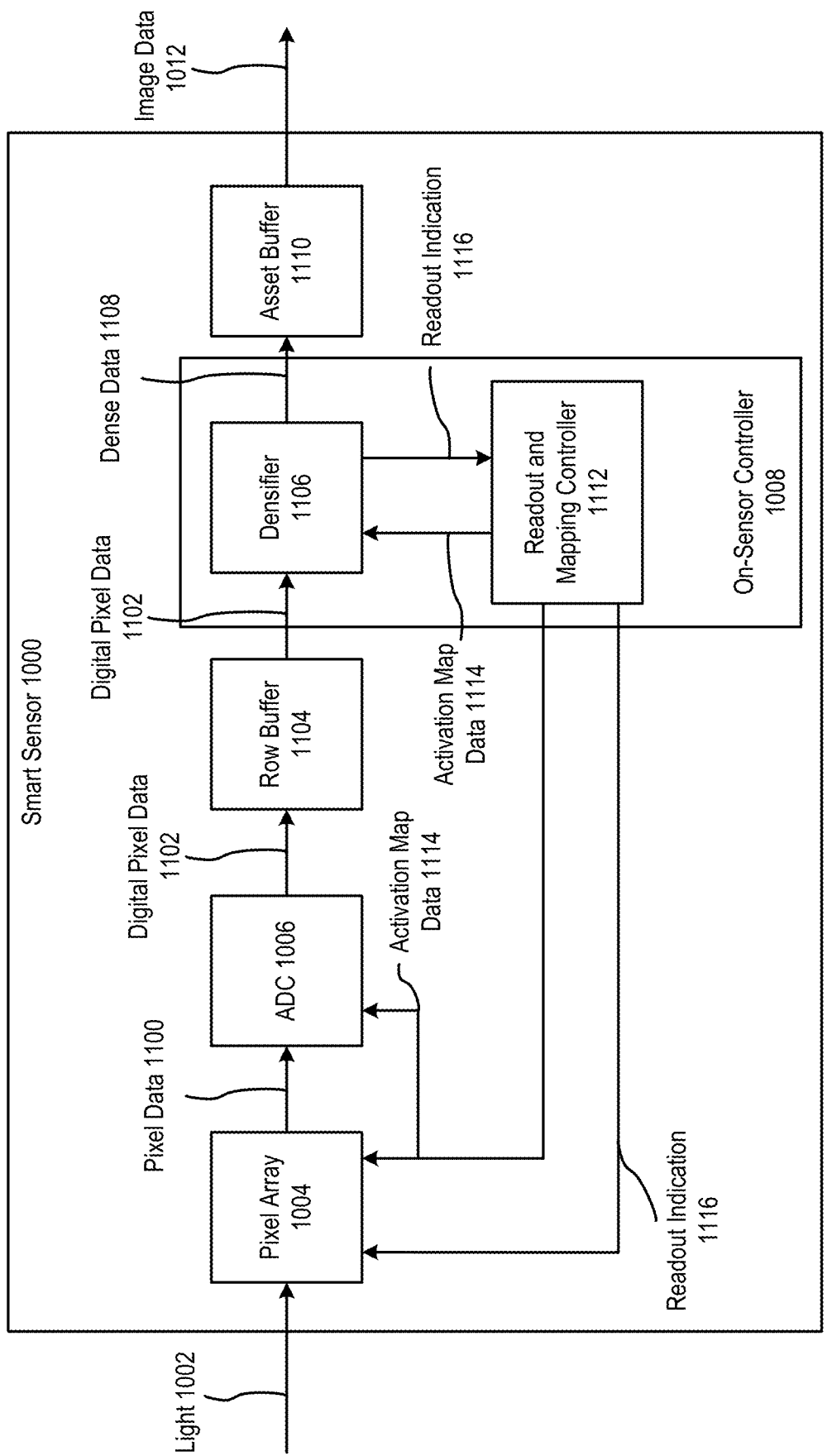
FIG. 11 illustrates an example smart sensor apparatus including a densifier and readout controller.

FIG. 11 illustrates an example smart sensor apparatus including a densifier and readout controller. As depicted in FIG. 11, smart sensor 1000 is an apparatus including a number of subsystems/components for facilitating the processes described herein, including pixel array 1004, analog to digital converter (ADC) 1006, and on-sensor controller 1008. Smart sensor 1000 may be configured to received light 1002 through pixel array 1004. Pixel array 1004 may utilize light 1002 to generate pixel data 1100, such as analog pixel data, which is forwarded to ADC 1006. ADC 1006 will intake the analog pixel data 1100 and convert the array of voltages included therein into digital pixel data 1102. The digital pixel data may eventually be transformed and output as image data 1012.

Smart sensor 1000 further includes row buffer 1104. Row buffer 1104 may be a buffer component configured to receive, store, and send digital image data, such as digital pixel data 1102. In some embodiments, row buffer 1104 is a fixed-size buffer component configured to receive digital pixel data 1102 from ADC 1006, temporarily store the digital pixel data 1102 in a fixed size buffer, and forward the digital pixel data 1102 to a densifier component 1106. The row buffer may provide a buffer memory to store rows of digital pixel data subsequent to conversion of the pixel data 1100 to digital pixel data 1102 at ADC 1006. For example, ADC 1006 may send digital pixel data corresponding to a row of pixel data to row buffer 1104, which has a fixed-size memory corresponding to a maximum size of a row of digital pixel data. In embodiments implementing a column-level ADC, the row buffer 1104 may store the digital pixel data 1102 so that ADC 1006 may immediately begin processing new pixel data 1100 from the pixel array. For example, in embodiments implementing a column-level ADC, the row buffer 1104 will wait for an indication that image data has been sent off-sensor before a new row of pixel data may be quantized by the ADC. In embodiments implementing a digital pixel sensor (DPS) ADC, the ADC 1006 may quantize all analog pixel values in parallel and store the quantized values in row buffer 1104. Row buffer 1104 may then send an indication that a new row of pixel data may be sent off sensor.

Smart sensor 1000 includes densifier 1106. Densifier 1106 may be a component of on-sensor controller 1008 configured to transform digital pixel data 1102 received from row buffer 1104 into dense data 1008. As described herein, dense data 1008 refers to digital image data generated by the densifier 1106 based on the digital pixel data 1102 sent to the densifier 1106 from the row buffer 1104 or another component of smart sensor 1000. In various embodiments, densifier 1106 is configured to generate dense data 1108. Dense data 1108 may include a subset of digital pixel data 1102 and exclude another mutually-exclusive subset of digital pixel data 1102. The subset of digital pixel data 1102 included in dense data 1108 may correspond to digital image data having a certain set of values, each at, or above, a threshold value. For example, the dense data 1108 may contain only values having a pixel color values which are above a certain threshold of darkness as measured by hexadecimal color values.

Light 1002 may enter pixel array 1004 through one or more pixel cell apertures in an array of pixel cells. In some embodiments, a subset of pixel cells of the pixel array 1004 may be disabled during a time period that light 1002 is collected by the pixel cells of pixel array 1004. For example, a first subset of pixel cells may be in a standby state during the time period and a second subset of pixel cells may be in an active state during the time period. The second subset of active pixel cells may collect light 1002 to generate an array of analog voltages, while the first subset of standby pixel cells may not generate voltage values. In some embodiments, each pixel cell of the pixel array is active, but only a subset of the voltages collected by the array of pixel cells is quantized. For example, each pixel cell of the array of pixel cells may actively generate an analog voltage value, but only a second subset of analog voltages collected by the pixel cells may be quantized by the ADC, while the first subset of analog voltages collected by the pixel cells are not quantized and are then forwarded as "null" values.

The array of voltages is then received at the ADC 1006, where the array of voltages are converted to digital pixel data. The digital pixel data converted may include a number of measured pixel values corresponding to the original second subset of active pixel cells. The pixel data may also include a number of "null" pixel values corresponding to a subset of pixel cells for which a corresponding voltage was not quantized. These pixel values are included in the digital pixel data 1102 as pixel values having non-quantized pixel values converted by the ADC 1006. The digital pixel data 1102 comprising the pixel values (including both quantized and non-quantized values) is exported off of the ADC 1006, through the row buffer 1004, and sent to the densifier 1106.

The densifier 1106 receives the digital pixel data 1102 from the row buffer 1104. The densifier may be configured to generate dense data 1108 according to instructions specifying that generated dense data 1108 shall include only non-null (i.e. quantized) pixel values in the digital pixel data 1102. Densifier 1106 may be further configured to process the digital pixel data 1102 to determine the first pixel values and the second pixel values as described above. The densifier 1106 may be further configured to generate new digital image data as dense data 1108, wherein the new digital image data includes only the non-null pixel values of the digital pixel data 1102. The null pixel values may be discarded by the densifier as part of the process of generating dense data 1108. Thus densifier 1106 may be utilized to generate dense data 1108 that preserves relevant features of a digital image (e.g., groupings of pixel values that are non-null) while reducing the overall size of the data that will be exported off of the smart sensor. In some embodiments, densifier 1106 may further generate, as part of the dense data 1108, one or more row and/or column indicators that a component may use to reconstruct a digital image using the dense data 1108. In some embodiments, a component, such as a host component, may utilize a pixel map to determine a sequence of the dense data so as to reconstruct a digital image from the dense data in a deterministic manner.

Smart sensor includes asset buffer 1110. Asset buffer 1110 may be a buffer component configured to intake dense data 1108 sent from densifier 1106. Asset buffer 1110 may be a buffer configured to store, in a temporary memory, one or more sets of dense data. The one or more sets of dense data may be collected by asset buffer 1110 in the temporary memory 1110 until the asset buffer 1110 reaches a threshold of saturation corresponding to a particular amount of image data that will be sent off-sensor. For example, asset buffer 1110 may continue to store dense data 1108 sent from densifier 1106 in a serialized manner before the amount of dense data 1108 in asset buffer 1110 surpasses a threshold amount of data. The entirety of the serialized dense data 1108 in asset buffer 1110 will then be exported off of the smart sensor 1000 as image data 1012. In various embodiments, the asset buffer may be employed as part of a separate independent system or as part of a receiving system which receives dense data 1108 from smart sensor 1000.

Densifier 1106 may be communicatively coupled to a readout and mapping controller 1112 included in on-sensor controller 1008. Readout and mapping controller 1112 may be a component of on-sensor controller 1008 configured to intake and output readout indications 1116 and activation map data 1114.

Readout indication 1116 may be an indication generated by densifier 1106 in response to generating dense data 1108 and/or sending dense data 1108 to asset buffer 1110. In this manner, readout indication 1116 may operate as a signal that the densifier 1106 has completed or is completing densification of digital pixel data 1102 at a particular rate. In various embodiments, densifier 1106 generates and sends a readout indication 1116 every time densifier 1106 completes generation of dense data 1108. In various embodiments, readout indication 1116 is a variable value that may be stored in memory and updated every time densifier 1106 generates dense data 1108. Readout and mapping controller 1112 is configured to receive readout indication 1116 and forward the readout indication 1116 to pixel array 1004. The densifier may, for example, generate and send or update the readout indication 1116 when the densifier or the on-sensor controller determines that the densifier 1106 is a bottlenecked component. The readout indication 1116 may resolve the bottleneck by reducing the generation of arrays of voltage data at the pixel array 1004.

Pixel array 1004 may be further configured to generate the array of voltages based on the value of a readout indication 1116 received. For example, readout indication 1116 may be a binary value, where the value of "1," when received by pixel array 1004, may responsively cause pixel array 1004 to enter or maintain a capture state wherein the pixel array 1004 is continuously processing arrays of voltages for each individual frame of a scene. In contrast, the value of "0," when received by pixel array 1004, may responsively cause pixel array 1004 to enter or maintain a standby state wherein the pixel array 1004 is not expending power to process arrays of voltages. In some embodiments, the pixel array 1004 maintains a state of standby by default until a readout indication 1116 indicating a capture state is received and the pixel array 1004 has responsively captured an array of voltages for a frame. In various embodiments, the readout indication 1116 is a variable value that indicates a transformation. Thus the smart sensor 1000 may utilize readout indication 1116 to control the manner in which pixel array 1004 generates arrays of voltages. For example the readout indication 1116 may comprise a floating point value indicating a minimum and/or maximum time period during which the pixel array 1004 may generate the array of voltages. Thus, the smart sensor 1000 may utilize the readout indication as part of an adaptive readout configuration to maintain efficient image data generation while preventing inefficient power waste from non-bottlenecked components.

Readout and mapping controller 1112 may be further configured to send, to one or more other components of the smart sensor 1000, activation map data 1114. Activation map data may be a set of data corresponding to an activation map including an array of map values. The array of map values may include one or more values indicating a pixel state to be used as part of the image data 1012 generation process. For example an activation map may include one or more map values corresponding to pixel cells and/or pixel values that should not be captured and exported off-sensor as image data 1012. For example, the map values may be binary values, where a value of "1" may indicate that a corresponding individual pixel cell of the array of pixel cells should be in an active state during a frame capture. In contrast a value of "0" may indicate that a corresponding individual pixel cell of the array of pixel cells should be in a standby state during a frame capture, and that the resulting digital pixel value corresponding to that pixel cell should be null when the digital image data is sent to the densifier 1106.

Readout and mapping controller 1112 may send activation map data 1114 to a number of components of the smart sensor 1000 to alter the manner in which data is generated and/or processed by the components. In various embodiments, activation map data 1114 is sent to pixel array 1004. Pixel array 1004 may responsively utilize activation map data 1114 to set a certain subset of pixel cells in an activate state and another subset of pixel cells in a standby state. In various embodiments, activation map data 1114 is sent to ADC 1006. ADC 1006 may responsively generate digital pixel values for only a subset of voltages of the array of voltages and generate null data for another subset of voltages of the array of voltages. In some embodiments, activation map data 1114 is sent to densifier 1106 to provide an indicator to densifier 1106 of a first set of pixel values that will be included in the dense data 1108 and a second set of pixel values that will not be included in the dense data 1108.

Figure 12:
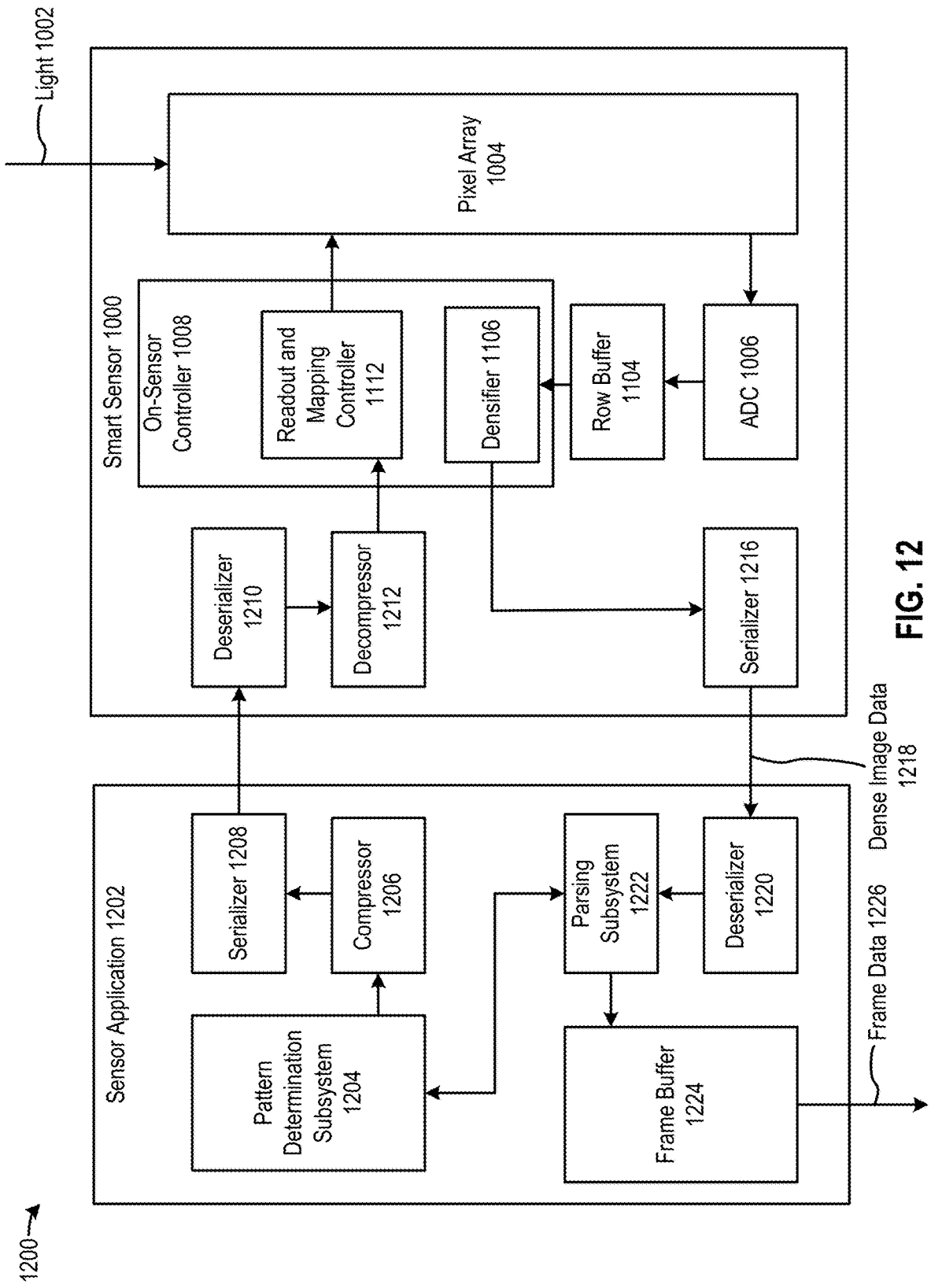
FIG. 12 illustrates a distributed system including a smart sensor and a sensor application.

FIG. 12 illustrates a distributed system including a smart sensor and a sensor application. Specifically, FIG. 12 illustrates a distributed system 1200 including a sensor application 1202 and a smart sensor 1000 to perform the embodiments described herein. As depicted in FIG. 12 smart sensor 1000 includes pixel array 1004, analog to digital converter (ADC) 1006, and on-sensor controller 1008. Smart sensor 1000 may be configured to receive light 1002 at pixel array 1004. Smart sensor 1000 may interact with a software application such as sensor application 1202 to facilitate output of frame data 1226 for use in a downstream application.

Sensor application 1202 may be a system, separate from smart sensor 1000, for facilitating the processes and embodiments described herein. In various embodiments, sensor application 1202 is system hosting and/or operating a software application that may be utilized to facilitate communication between sensor application 1202 and smart sensor 1000. For example, sensor application 1202 may be a system hosting a software application, such as a VR, AR, or MR application.

Sensor application 1202 may be a system configured to determine one or more activation maps to send to a smart sensor to cause generation of dense image data according to the embodiments described herein. Sensor application 1202 may be configured to utilize contextual environmental data to determine one or more activation maps for use by the smart sensor 1000. For example, sensor application 1202 may determine that the smart sensor 1000 is operating in a sparse-feature environment, and cause selection of one or more activation maps suitable for spare-feature environments to send to smart sensor 1000 to improve efficient image data generation.

As depicted in FIG. 12, sensor application 1202 includes pattern determination subsystem 1204. Pattern determination subsystem 1204 may be configured to determine one or more activation maps to be sent to smart sensor 1000. For example, pattern determination subsystem may comprise one or more algorithms for determining an activation map to be sent to a smart sensor 1000 to generate dense data. In various embodiments, the determination may be based on one or more features determined from image data previously received from one or more smart sensors. Pattern determination subsystem 1204 may utilize any components/algorithms necessary to determine and/or generate an activation map to send to smart sensor 1000. In various embodiments, pattern determination subsystem 1204 comprises a generative model or machine learning model configured to intake image data an input and output one or more predictions for an activation map to send to smart sensor 1000.

In some embodiments, an eye tracking model generates a visual environment corresponding to a predicted field of vision for a user. The visual environment may be utilized to predict and generate an activation map. The activation map may represent predicted pixel regions of the pixel array corresponding to where the user may be casting their vision for a given frame. In other embodiments, a computational algorithm/model, such as Simultaneous Localization and Mapping (SLAM) may be utilized to predict and generate activation maps. For example, a SLAM algorithm may generate predictions of features that will appear in subsequent frames based on analysis of current and/or previous frames and the features included therein. In still other embodiments, movement-detection components, such as inertial measurement units (IMUs) may be utilized to determine a relative spatial orientation of a sensor for a present/future frame based on a previous orientation of a sensor for a past/present frame. For example, the IMU may be used to predict and generate an activation map based on spatially-predicted features of a frame based on a past and present orientations of the sensors according to the IMU.

As described above, an activation map includes a relatively large set of data that, the sending of which requires larger amounts of time and power resources. For these reasons, sensor application 1202 may compress the activation map to generate activation map data as a "descriptor" prior to sending the activation map data to the smart sensor 1000. For example, sensor application 1202 includes compressor 1206. Compressor 1206 may be a component configured to compress a determined activation map into data descriptor prior to sending the activation map data to the smart sensor 1000.

As described herein descriptions may be data representing a compressed configuration of one or more activation maps that may be sent to and utilized by a smart sensor. A descriptor may include data specifying a pattern of compression that may is applied to an activation map to form to activation map data. Descriptors may include high-level descriptors and low-level descriptors. Examples of both high-level and low-level descriptors will follow below.

Multiple descriptors may be used to represent activation maps and the compression schemes used to generate descriptors from the activation maps. These descriptors may provide mapping patterns for activation maps that will be utilized by the smart sensor. Both high-level and low-level descriptors, as well as a combination of both types of descriptors, may be used to represent a compressed activation map. High-level descriptors may be descriptors for generating and compressing activation maps based on known sampling patterns for predicted items to be captured in a frame (i.e. features of the image). For example, high-level descriptors may be detailed descriptors for capturing a specific region of a frame using an activation map. In contrast, low-level descriptors may be mapping patterns utilizing less-structured activation patterns that are useful when it is uncertain which portions of a sensor frame may correspond to known or important features.

One example of a high level descriptor is a combination feature and location descriptor. This descriptor applies feature location elements at a particular coordinate location of an image frame to form an activation map. Given a specific pixel/coordinate location, a feature descriptor may be applied using the location. For example, activation maps may generated using this descriptor may contain activation regions (regions in which an activation map specifies that a pixel cell should be enabled) for a scale-invariant feature transform (SIFT), Oriented FAST and Rotated BRIEF), and/or Harris corner region centered around the pixel/coordinate location. The activation map may be further compressed to form the final descriptor.

Another example of a high level descriptor is a combination region of interest and sub-sampling descriptor. This descriptor specifies one or more regions of interest within the activation map, often represented by several two-dimensional coordinate points that form a rectangular region of interest. Within the region of interest, several sub-sampled regions (smaller rectangular periodically generated throughout the region of interest form the activation regions. The activation map may be further compressed to form the final descriptor.

Yet another example of a high level descriptor is a combination logical operator descriptor. This descriptor specifies one or more logical operations performed on other descriptors, such as regions of interest, to form the activation region. For example a logical XOR operator may be applied to two rectangular regions of interest to form an exclusive region of interest that will be the activation region in the activation map. The activation map may be further compressed to form the final descriptor.

In some embodiments, different uncompressed representations of the activation map may be used as low-level descriptors for generating the activation map. Examples of uncompressed low-level descriptors include bit-map dimensional maps, bit-map dimensional maps including one or more regions of interest, and/or sets of activation vectors defining activation region patterns for subsets of pixel rows.

In some embodiments, different compressed/encoded representations of the activation map may be used as low-level descriptors, including, individually and in combination, row-by-row ordered representations compressions, inter-row compressions, and/or intra-row compressions. Row-by-row ordered compression of an activation map may include decomposition of an activation map into ordered sequences of rows that may be individually encoded. Inter-row compression of an activation map may include generating representations of the activation map as combinations of multiple rows that may be skipped, bundled, or derived from a "baseline" row.

In various embodiments, combinations of high-level descriptors and low-level descriptors may be used to generate compressed activation map data that will be sent to a smart sensor. It will be appreciated that any combination of high-level and low-level descriptors may be used to perform the embodiments described herein. An example of activation map data generated using multiple descriptors and compressed to several degrees is given below, with reference to FIGS. 14A-14C.

In various embodiments, a component, such as pattern determination subsystem 1204, may determine one or more descriptors to represent the activation map(s) to be sent to the smart sensor. In various embodiments, pattern determination subsystem 1204 may comprise a generative model or CNN configured to intake, as input, image data or feature data related to a previous digital image received from one or more smart sensors and output a prediction for descriptors to represent an activation map. In various embodiments, a CNN or generative model trained using machine learning methods may be utilized to select both the activation map and a compression scheme to form the final descriptor to send to the smart sensor. Compression scheme may include, for example, bit-map transformations, coordinate transformations, data compression, etc.

In various embodiments, a descriptor describes a compressed activation map for foveated sensing. A foveated sensing activation map corresponding to a ROI of interest or multiple combinations of regions of interest, each with a unique sub-sampling activation factor. A center of foveated regions can be defined by application-derived information, such as a user vision-based vector. In various embodiments, an algorithm such as SLAM or Kalman filters may be used to predict a feature or object location in a frame for which the activation map/descriptor will be generated. In various embodiments, machine learning approaches may be used to predict activation maps/descriptors to send to the smart sensor based on input image data. For example, digital image data previously received from a smart sensor may be input to a machine learning model to predict a bit-map of an activation map that will be compressed to form a descriptor.

Once the activation map and descriptors have been selected by pattern determination subsystem 1204, the activation map and descriptors are sent to compressor 1206. Compressor 1206 may be a component of sensor application 1202 configured to compress a representation of an activation map to form one or more descriptors. For example, the compressor 1206 may take an input an activation map and output a descriptor/descriptor data that will be serialized and sent to smart sensor 1000.

Sensor application 1202 further includes serializer 1208. Serializer 1208 may be a component of sensor application 1202 configured to receive non-serialized activation map data/descriptor output from compressor 1206 and generate serialized activation map data. The serialized activation map data may then be sent to smart sensor 1000. In various embodiments, the activation map data sent to smart sensor 1000 may include one or more indications of the activation map type or type of compression scheme used to generate the activation map data.

Smart sensor 1000 includes deserializer 1210 and decompressor 1212. In various embodiments, deserializer 1210 and decompressor 1212 are implemented as components of on-sensor controller 1008. Deserializer 1210 may be a component of smart sensor 1000 configured to deserialize the activation map data sent from serializer 1208 of sensor application 1202. The deserialized data may then be sent to decompressor 1212 to decompress the compressed activation map data and generate activation map data to be used as part of the image data generation processes at the smart sensor 1000. The activation map data may then be sent to readout and mapping controller 1112 of on-sensor controller 1008.

Readout and mapping controller 1112 may send the activation map data to pixel array 1004, ADC 1006, etc. as described with reference to FIG. 11. Based on the activation map data, densifier 1106 of on-sensor controller 1008 may output dense data. The dense data may be forwarded to a serializer 1216 of smart sensor 1000 configured to serialize the dense data and generate dense image data 1218. Dense image data 1218 may be sent from the serializer 1216 to a deserializer 1220 of sensor application 1202. The deserializer 1220 may be configured to deserialize the dense image data 1218 to generate digital image data. The digital image data may be forwarded to a parsing subsystem 1222 of sensor application 1202.

Parsing subsystem 1222 may be a subsystem configured to parse digital image data received from deserializer 1220 and extract one or more image features, similar to feature extractions circuit 772 of FIG. 7E. In various embodiments, parsing subsystem 1222 may send extracted features of the digital image data to pattern determination subsystem 1204. For example, parsing subsystem 1222 may send extracted features and/or image data to pattern determination subsystem 1204 to determine a new activation map and one or more new descriptors based on the data. The new activation map and one or more new descriptors will be utilized to generate one or more new frames by the smart sensor 1000 according to the embodiments described herein.

Parsing subsystem 1222 may also send extracted features and/or image data to frame buffer 1224. Frame buffer 1224 may be a component of sensor application 1202 configured to generate a digital image using digital image data and features received from parsing subsystem 1222. Frame buffer 1224 may be, for example, a buffer component configured to interact with a digital display to display a digital image on a screen as part of the application of application system 1202.

Figure 13:
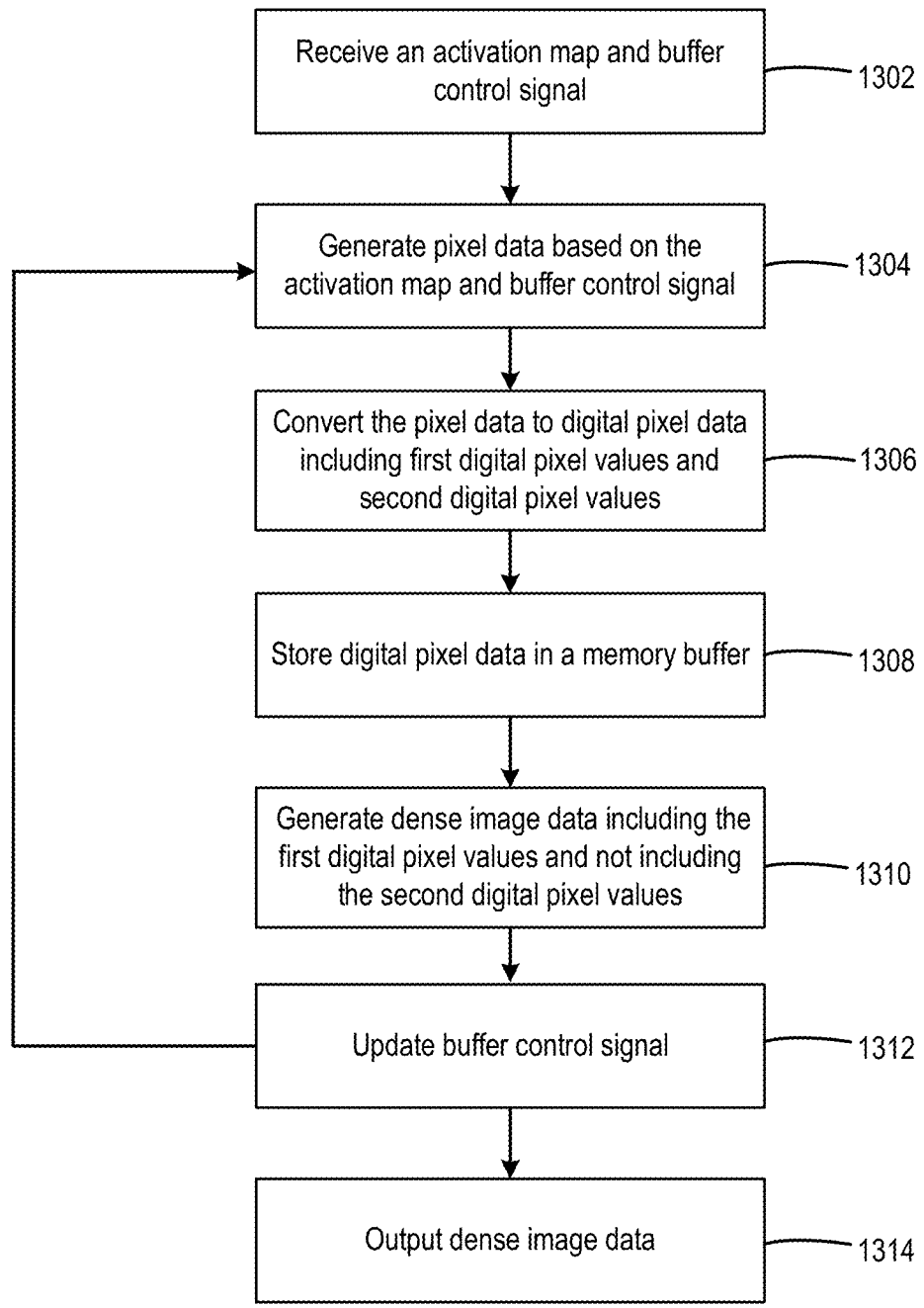
FIG. 13 depicts an example process for outing dense image data from a smart sensor using an activation map and buffer control signal according to certain embodiments.

FIG. 13 depicts an example process for outputting dense image data from a smart sensor using an activation map/descriptor and buffer control signal according to certain embodiments. Specifically, FIG. 13 depicts a flowchart for generating and outputting dense image data using adaptive readout techniques according to the embodiments described herein. Process 1300 begins at 1302 when an activation map and buffer control signal is received. The activation map may include activation map data in a compressed or uncompressed format. The buffer control signal may include a value or signal data corresponding to an indication of whether a pixel array should capture a frame of image data.

In an example embodiment, an activation map is received comprising an array of map values. The array of map values includes a first plurality of map values corresponding to pixel cells to be enabled and a second plurality of map values corresponding to pixel cells to be disabled during a frame capture by a smart sensor. A control signal is received to proceed with capturing, by a smart sensor, an image frame. For example, the control signal may include a binary value indicating the command to proceed with capturing an image frame.

At 1304 the process includes generating pixel data based on the activation map and buffer control signal. The pixel data may be generated by a pixel array of a smart sensor by converting light received at pixel cells of the pixel array into an array of analog voltages. The array of voltages are generated based on the activation map and buffer control signal received.

In an example embodiment, the pixel array utilizes the activation map and buffer control signal received in 1302 to generated the pixel data. The pixel array may first determine that the binary value of the buffer control signal corresponding to an indication that the pixel array should capture the frame of image data. The pixel array may then determine a mapping between the mapping values of the activation map and the pixel cells of the pixel array. The pixel array may enable a first subset of pixel cells to generate charge values corresponding to the first plurality of map values and disable a second subset of pixel cells to prevent generation of charge values corresponding to the second plurality of map values. The resulting pixel data, including an array of null (charges not quantized) values and non-null (charges are quantized) values is generated.

At 1306 the process includes converting the pixel data to digital pixel data including first digital pixel values and second digital pixel values. The pixel data is converted to digital pixel data by an analog to digital converter (ADC). The digital pixel data includes a plurality of digital pixel values, including first digital pixel values (such as converted pixel values corresponding to pixel cells for which a non-null voltages charge values was generated in 1304) and second digital pixel values (such as converted pixel values corresponding to pixel cells for which no voltage charge values was generated in 1304).

In an example embodiment, the array of voltages are sent to corresponding ADCs to convert the pixel data to digital pixel data. The ADC will parse the array of voltages and quantize the analog values to digital values. Null pixel values for voltage may be converted to corresponding null digital pixel values as part of the transformation. The resulting digital pixel data includes first digital pixel data including non-null digital pixel values and second digital pixel data including null digital pixel values. The first digital pixel data may correspond to important features captured in the frame based on the activation map received in 1302 and quantized. The second digital pixel data may correspond to non-important features captured in the frame based on the activation map and not quantized.

At 1308 the process includes storing digital pixel data in a memory buffer. In some embodiments, the digital pixel data may be stored in a memory buffer, such as row buffer 1104. In some embodiments, the digital pixel data is stored in a memory buffer of densifier 1106 prior to densification of the digital pixel data.

At 1310 the process includes generating dense image data including the first pixel values and not including the second pixel values. In some embodiments, generating the dense image data comprises removing null values from the first digital pixel data. In some further embodiments, the first digital pixel data may be compressed after the null values are removed to the first digital pixel data. In some embodiments, generating the dense image data comprises generating second digital pixel data and populating the second digital pixel data only with non-null values from the first digital pixel data.

At 1312 the process includes updating the buffer control signal. In some embodiments, the densifier determines an updated buffer control signal based on a determination of an amount of data in the memory buffer. In some embodiments, the densifier determines a rate at which the dense image data is generated. In some embodiments, the densifier or an on-sensor controller determines rates associated with each of blocks 1304, 1306 and 1310 to determine a buffer control signal. For example, the buffer control signal may be updated to a value that causes the pixel array to capture a frame if the rate of frame capture is slower than the rate of data densification. In contrast, the buffer control signal may be updated to a value that causes the pixel array to temporarily disable all pixel cells in the pixel array and save power if the rate of densification is slower than the rate of frame capture. The updated buffer control signal may be sent to the pixel array to repeat step 1304. The process may then continue iteratively.

At 1314 the process includes outputting the dense image data. Specifically, the dense image data generated in 1310 by the densifier may be output to an off-sensor receiving entity.

Figure 14A:
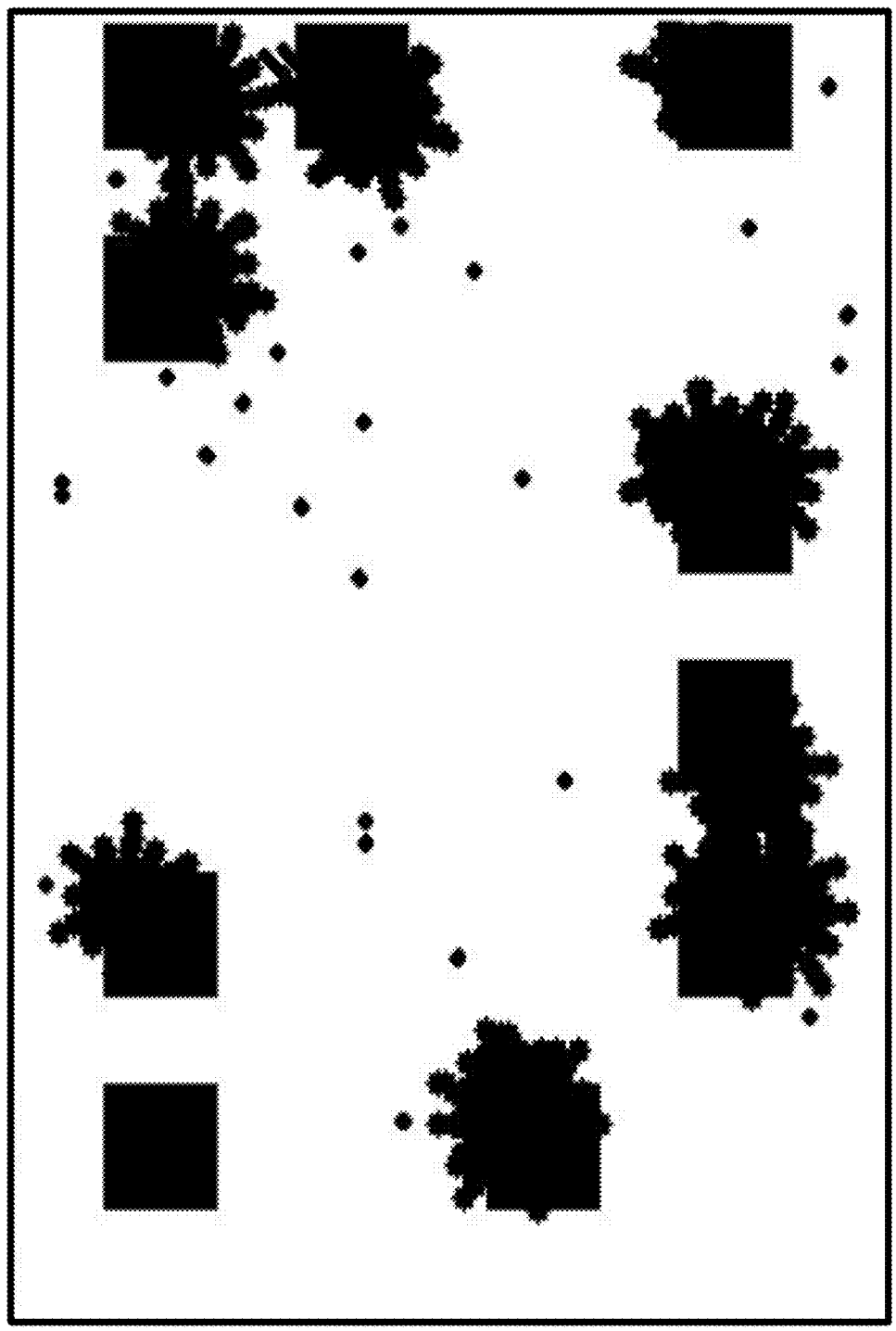
FIG. 14A, FIG. 14B, and FIG. 14C illustrate generation of image data using regions of interest based on activation maps.
Figure 14B:
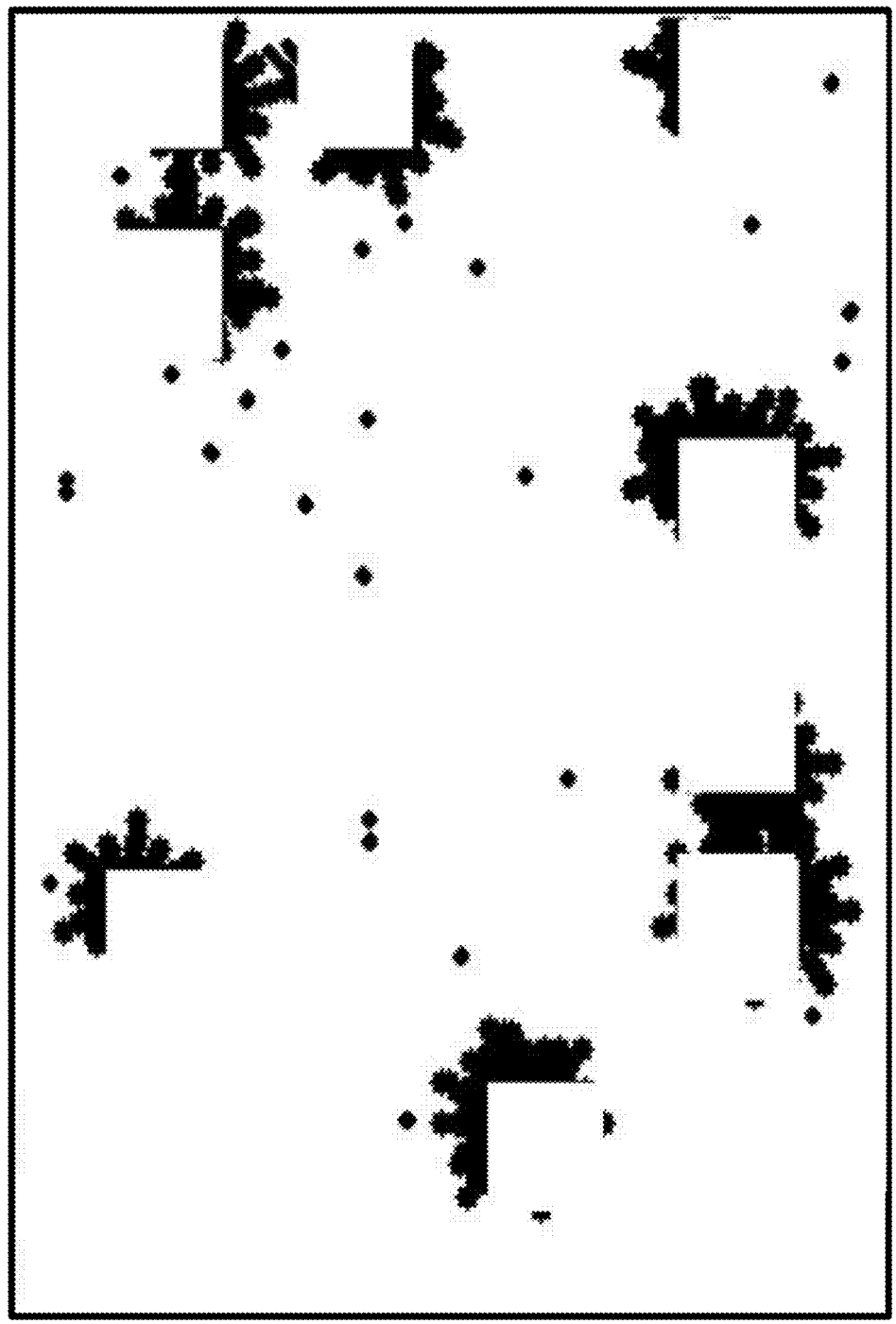
Figure 14C:
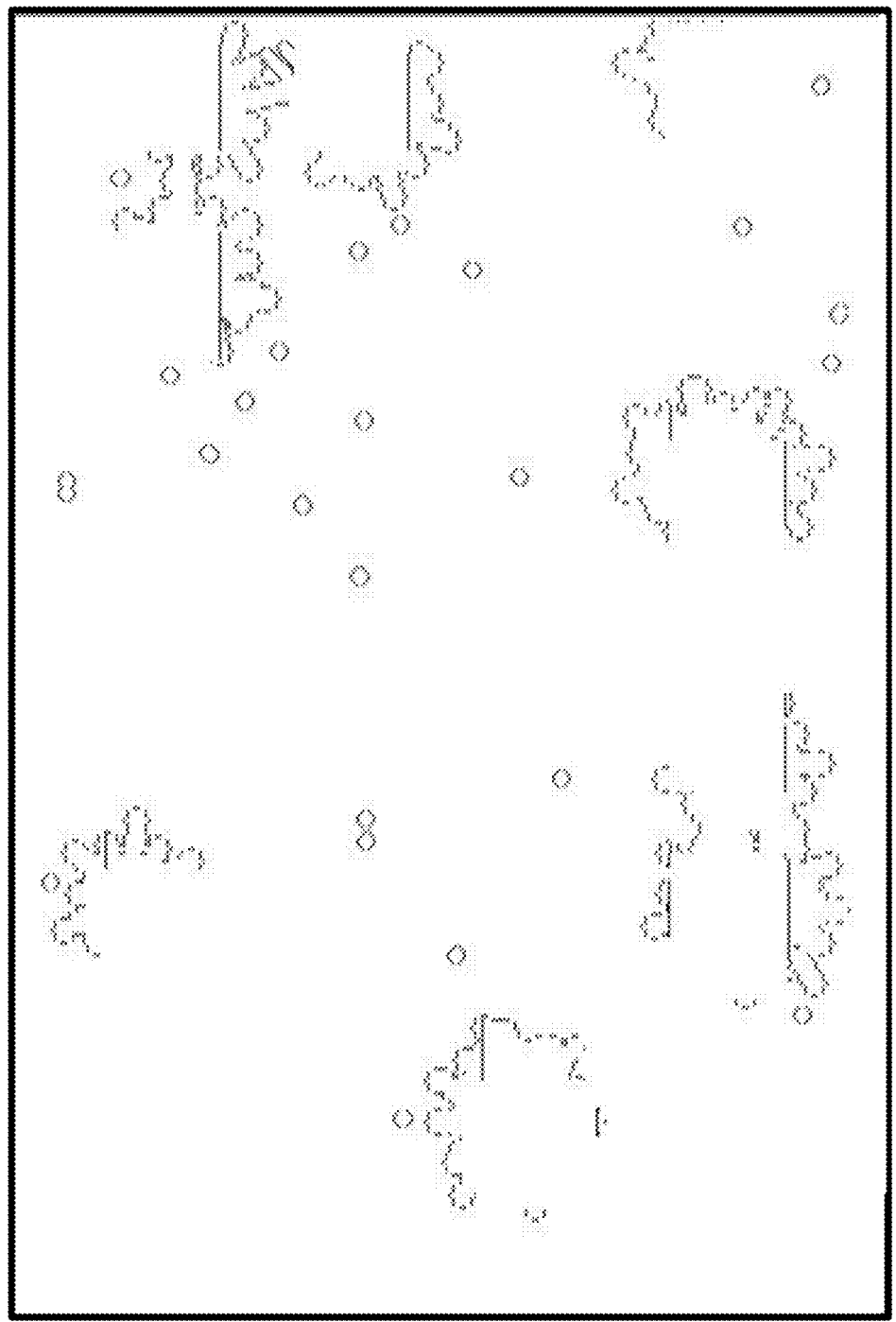

FIG. 14A, FIG. 14B, and FIG. 14C illustrate a visual activation map/descriptor using regions of interest and row caching. Specifically, FIG. 14A depicts uncompressed activation map 1400. As depicted in FIG. 14, uncompressed activation map 1400 represents an activation map including several regions of interest (depicted as squares in the activation map, and several fractal sub-sampling branches attached to the regions of interest. The uncompressed activation map 1400 may be compressed prior to sending the activation map to a smart sensor.

FIG. 14B depicts partially-compressed activation map 1402. As depicted in FIG. 14B, the partially-compressed activation map 1402 is similar to activation map 1400, except the regions of interest have been removed from the map. A smart sensor is capable of reconstructing the regions of interest in partially-compressed activation map 1402 to generate uncompressed activation map 1400. For example, using the configuration of the remaining fractal sub-sampling patterns, a smart sensor may determine and regenerate the square regions of interest.

FIG. 14C depicts fully-compressed activation map 1404. As depicted in FIG. 14C, fully compressed activation map 1404, which may be a final descriptor to be sent to a smart sensor, is similar to partially-compressed activation map 1402, expect regions within the fractal patterns are removed from the map. A smart sensor is capable of reconstructing the fractal regions in fully-compressed activation map 1404 to generate partially-compressed activation map 1402, and/or uncompressed activation map 1400. For example, using the fractal outlines, a smart sensor may determine and regenerate the fractal patterns and therefore also the square regions of interest. It will be appreciated that the fully-compressed activation map contains the same information as uncompressed activation map 1400 in a compressed descriptor format.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may include a general-purpose computing device selectively activated or reconfigured by a computer program stored in the computer. Such a computer program may be stored in a non-transitory, tangible computer-readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may include information resulting from a computing process, where the information is stored on a non-transitory, tangible computer-readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A sensor apparatus comprising:
an array of pixel cells configured to generate an array of voltages, each pixel cell of the array of pixel cells including one or more photodiodes configured to generate a charge in response to light and a charge storage device to convert the charge to a voltage;
one or more analog-to-digital converters (ADC) configured the convert the array of voltages to first digital pixel data comprising one or more pixel values; and
a processor configured to:
 receive the first digital pixel data from the ADC;
 receive activation map data, the activation map data comprising (i) one or more feature descriptors associated with one or more corresponding pixel cells or (ii) one or more subsampling factors associated with one or more corresponding regions of interest;
 determine, based on the one or more pixel values and the activation map data, one or more first pixel values and one or more second pixel values;
 generate second digital pixel data, the second digital pixel data comprising the one or more first pixel values and not the one or more second pixel values; and send, from the sensor apparatus to a separate receiving apparatus, the second digital pixel data.

2. The sensor apparatus of claim 1, wherein:
the activation map data comprises an array of map values corresponding to the array of pixel cells; and wherein the processor is further configured to process the activation map data to determine the array of map values.

3. The sensor apparatus of claim 2, wherein converting the charges to voltages is based at least in part on the array of map values.

4. The sensor apparatus of claim 2, wherein the one or more ADC convert the array of voltages to first digital pixel data based at least in part on the array of map values.

5. The sensor apparatus of claim 2, wherein the processor generates the second digital pixel data based at least in part on the array of map values.

6. The sensor apparatus of claim 2, wherein the array of map values comprises one or more first map values corresponding to the one or more first pixel values and one or more second map values corresponding to the second pixel values.

7. The sensor apparatus of claim 6, wherein the first map values represent enabled pixels of the array of pixel cells that will be included in the second digital pixel data as the one or more first pixel values and the second map values represent disabled pixels of the array of pixels cells that will not be included in the second digital pixel data.

8. The sensor apparatus of claim 2, wherein:
the separate receiving apparatus is an application system communicatively coupled to the sensor apparatus;
the activation map data is received from the application system.

9. The sensor apparatus of claim 8, wherein the activation map data is a compressed representation of an activation map, the activation map data generated based at least on a compression scheme.

10. The sensor apparatus of claim 8, wherein the activation map data is a representation of a combined activation map, the combined activation map based on a combination of a first activation map and a second activation map.

11. The sensor apparatus of claim 10, wherein:
the combined activation map is generated by a generative model of the application system previously trained by a machine learning model to generate activation maps;
the second activation map is generated by the application system based on the first activation map.

12. The sensor apparatus of claim 11, wherein the first activation map is a region of interest map comprising one or more regions of interest and the second activation map is a sub-sampling map of each of the one or more regions of interest in the first activation map.

13. The sensor apparatus of claim 8, wherein the application system is configured to process the second digital pixel data to extract one or more image features from the second digital pixel data.

14. The sensor apparatus of claim 2, wherein:
the activation map data is serialized activation map data;
the processor is further configured to deserialize the activation map data prior to processing the activation map data to determine the array of map values.

15. The sensor apparatus of claim 1, wherein the one or more photodiodes are configured to generate the charge in response to receiving a control signal indicating to generate the charge.

16. The sensor apparatus of claim 15, wherein the processor is further configured to send, to the array of pixel cells and in response to sending the second digital pixel data to the separate receiving apparatus, the control signal indicating to generate the charge.

17. The sensor apparatus of claim 16, wherein:
the processor is configured to determine a dispatch rate corresponding to a rate at which the processor sends the second digital pixel data to the separate receiving apparatus;
the control signal comprises the dispatch rate;
the one or more photodiodes are configured to generate the charge based at least in part on the dispatch rate.

18. The sensor apparatus of claim 1, wherein the processor is further configured to serialize the second digital pixel data prior to sending the second digital pixel data to the separate receiving apparatus.

19. The sensor apparatus of claim 1, wherein the one or more second pixel values are one or more null pixel values corresponding to non-quantized voltages.

20. A method comprising:
operating each pixel cell of an array of pixel cells to generate a charge in response to light, and to convert the charge to output a voltage of an array of voltages;
converting an array of voltages to first pixel data comprising one or more pixel values;
receiving activation map data, the activation map data comprising (i) one or more feature descriptors associated with one or more corresponding pixel cells or (ii) one or more subsampling factors associated with one or more corresponding regions of interest;
determining, based on the one or more pixel values and the activation map data, one or more first pixel values and one or more second pixel values;
generating second digital pixel data, the second digital pixel data comprising the one or more first pixel values and not the one or more second pixel values; and
sending, the second digital pixel data to a receiving system.

* * * * *